US008060468B2

(12) United States Patent  (10) Patent No.: US 8,060,468 B2
Deguchi et al.                (45) Date of Patent:    Nov. 15, 2011

(54) STORAGE SYSTEM AND DATA RECOVERY METHOD

(75) Inventors: Akira Deguchi, Yokohama (JP);
Tomohiro Kawaguchi, Yokohama (JP);
Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 715 days.

(21) Appl. No.: 12/007,585

(22) Filed: Jan. 11, 2008

(65) Prior Publication Data
US 2008/0243946 A1 Oct. 2, 2008

(30) Foreign Application Priority Data
Mar. 29, 2007 (JP) ................................ 2007-086766

(51) Int. Cl.
G06F 7/00 (2006.01)
G06F 17/00 (2006.01)
(52) U.S. Cl. ..................... 707/610; 707/640; 707/674
(58) Field of Classification Search ............... None
See application file for complete search history.

(56) References Cited

U.S. PATENT DOCUMENTS

| 6,732,293 | B1 * | 5/2004 | Schneider ............. 714/15 |
| 6,978,282 | B1 * | 12/2005 | Dings et al. ............. 707/610 |
| 7,055,059 | B2 * | 5/2006 | Yanai et al. ............. 714/7 |
| 2005/0015416 | A1 * | 1/2005 | Yamagami ............. 707/204 |
| 2005/0028022 | A1 * | 2/2005 | Amano ............. 714/2 |
| 2005/0076264 | A1 * | 4/2005 | Rowan et al. ............. 714/6 |
| 2005/0086443 | A1 * | 4/2005 | Mizuno et al. ............. 711/162 |
| 2005/0182888 | A1 * | 8/2005 | Murotani et al. ............. 711/1 |
| 2006/0117216 | A1 * | 6/2006 | Ikeuchi et al. ............. 714/6 |
| 2007/0112883 | A1 | 5/2007 | Asano et al. |
| 2008/0059412 | A1 * | 3/2008 | Tarin ............. 707/2 |

FOREIGN PATENT DOCUMENTS
JP 2007-140746 11/2005
* cited by examiner

Primary Examiner — Kuen Lu
Assistant Examiner — Tuan A Pham
(74) Attorney, Agent, or Firm — Volpe and Koenig, P.C.

(57) ABSTRACT

Proposed are a storage system and a data recovery method capable of guaranteeing data recovery processing at a service level sought by a user. This storage system and data recovery method uses one or more data recovery candidate points and specifies a section containing the journal and the replication of write data, checks a redundancy relation of a write range in the volume of write data written from host into the volume contained in the journal regarding one or more journals in the section, and executes redundancy elimination processing of merging a plurality of the replications of write data or a plurality of the journals into a single replication of write data or a single journal based on the check result.

15 Claims, 34 Drawing Sheets

| BASE VOLUME NUMBER | CREATION TIME | RESTORED WRITE SEQUENCE NUMBER | CORRESPONDING OPERATION VOLUME NUMBER |
|---|---|---|---|
| 1 | 2006/12/11 | 0 | 20 |
| 2 | 2007/01/01 | 300 | 21 |
| 3 | 2007/02/24 | 460 | 22 |

| JOURNAL VOLUME NUMBER | SIZE | VOLUME UTILIZATION | OVERALL UTILIZATION |
|---|---|---|---|
| 10 | 5GB | 60% | 70% |
| 11 | 5GB | 70% | |
| 12 | 5GB | 80% | |

| BASE VOLUME NUMBER | ACQUISITION TIME | RESTORED WRITE SEQUENCE NUMBER | CORRESPONDING VOLUME NUMBER |
|---|---|---|---|
| 1 | 2006/12/11 | 0 | 20 |
| 2 | 2007/01/01 | 3 | 20 |
| 3 | 2007/01/11 | 7 | 20 |

FIG.20

| 900 |
|---|
| WRITE SEQUENCE NUMBER |
| TIME |
| TYPE |
| VOLUME NUMBER |
| DATA PORTION START ADDRESS |
| DATA PORTION END ADDRESS |
| DATA LENGTH |
| DATA |

FIG.21

| RECOVERY POINT NUMBER | WRITE SEQUENCE NUMBER | CDP GROUP NUMBER |
|---|---|---|
| 1 | 54 | CDP GROUP 1 |
| 2 | 259 | CDP GROUP 1 |
| 3 | 543 | CDP GROUP 1 |
| 4 | 697 | CDP GROUP 1 |
| ... | ... | ... |

950

FIG.22A
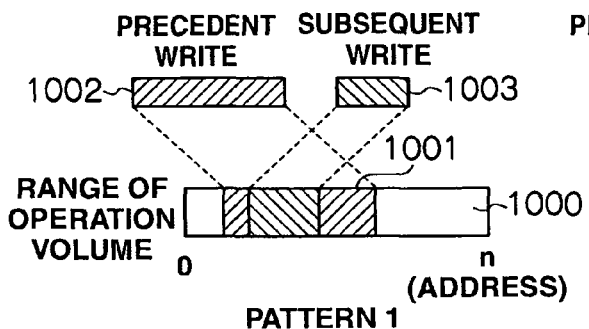
PATTERN 1
FIG.22B
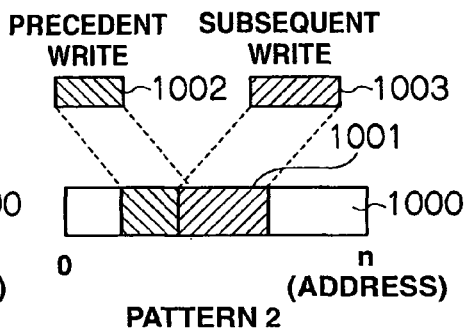
PATTERN 2
FIG.22C
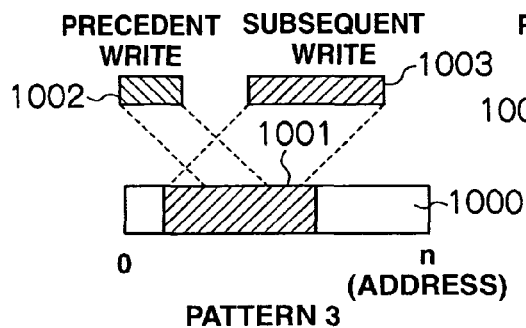
PATTERN 3
FIG.22D
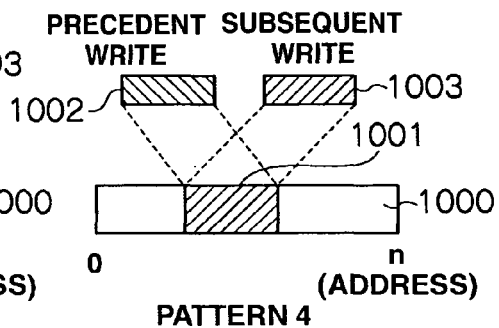
PATTERN 4
FIG.23
| SECTION NUMBER | START RECOVERY POINT NUMBER | END RECOVERY POINT NUMBER | REDUNDANCY ELIMINATED FLAG |
|---|---|---|---|
| 1 | 1 | 2 | REDUNDANCY ELIMINATED |
| 2 | 2 | 3 | REDUNDANCY ELIMINATED |
| 3 | 4 | 5 | REDUNDANCY NOT ELIMINATED |
| ... | ... | ... | ... |

| CHUNK NUMBER | CHUNK SIZE | START ADDRESS | END ADDRESS | STATUS | ALLOCATION DESTINATION |
|---|---|---|---|---|---|
| 1 | 1GB | 0 | 99 | ALLOCATED | VOLUME 2 |
| 2 | 2GB | 100 | 299 | ALLOCATED | VOLUME 1 |
| 3 | 512MB | 300 | 349 | ALLOCATED | VOLUME 1 |
| 4 | 3GB | 350 | 694 | UNALLOCATED | - |

| JOURNAL VOLUME | SIZE | VOLUME UTILIZATION | OVERALL UTILIZATION | CHUNK NUMBER | SUBSEQUENT CHUNK |
|---|---|---|---|---|---|
| 1 | 5GB | 50% | 35% | CHUNK 3 | CHUNK 2 |
| | | | | CHUNK 2 | - |
| 2 | 5GB | 20% | | CHUNK 1 | - |

FIG.39

CDP PARAMETER SETTING SCREEN — 1510

- CDP GROUP NUMBER: 1 (1511)    PRIORITY INFORMATION
- SPECIFIED RTO: 30 MINUTES (1512)    1 (1516A)
- SPECIFIED PROTECTION PERIOD: 10 DAYS (1513)    3 (1516B)
- SPECIFIED CAPACITY: 300 GB (1514)    2 (1516C)
- REDUNDANCY ELIMINATION INFORMATION: ● YES (1515A)  ○ NOR (1515B)    [EXECUTE] (1517)

CDP INFORMATION DISPLAY SCREEN — 1520

- CDP GROUP NUMBER: 1 (1521)
- PRESENT RTO: 30 MINUTES (1522)
- PRESENT PROTECTION PERIOD: 10 DAYS (1523)
- PRESENT USED CAPACITY: 250 GB (1524)

RECOVERY POINT CREATION SCREEN — 1530

- CDP GROUP NUMBER: 2 (1531)    [EXECUTE] (1532)

RECOVERY POINT DELETION SCREEN — 1540

- CDP GROUP NUMBER: 3 (1541)
- RECOVERY POINT NUMBER: 5 (1542)    [EXECUTE] (1543)

(1500)

STORAGE SYSTEM AND DATA RECOVERY METHOD

CROSS REFERENCES

This application relates to and claims priority from Japanese Patent Application No. 2007-086766, filed on Mar. 29, 2007, the entire disclosure of which is incorporated herein by reference.

BACKGROUND

The present invention generally relates to a storage system and a data recovery method, and in particular relates to backup and recovery technology of data.

Storage systems that store data of enterprise information systems have conventionally played the role of protecting data. From the needs of data protection and the like, in the field of storage systems, there have been proposed a replication function and a CDP (Continuous Data Protection) function of creating a replication of operation data without stopping the enterprise information system and instantaneously recovering operation data from such replication when a disaster or an operation error occurs.

The replication function is a function where the storage system, upon receiving a replication command from the host computer, copies data stored in a volume to be replicated at that time (hereinafter referred to as the "target volume") to another volume, and thereby creates a replication of the target volume. As a result of periodically executing the replication function, it is possible to discretely acquire the replication of the target volume. The point that can be recovered with the replication function is the point in time when the storage system creates a replication of the target volume.

The CDP function is a function where, when used simultaneously with the replication function, recovery to numerous points from few replications is enabled (for instance, refer to the specification of US Patent Application No. 2005/0028022A1; "Patent Document 1").

In actuality, with the CDP function, when a storage system receives write request is received from the host computer, it creates a journal from the various types of control information (write destination address of write data and data length of write data) contained in the write request and the write data, and stores this journal. Subsequently, upon recovery, the storage system sequentially overwrites the write data contained in the journal to the replication of the target volume (hereinafter referred to as the "base volume") acquired with the replication function (hereinafter referred to as the "journal application").

According to this kind of CDP function, by selecting the journal to be applied to the replication of the target operation data, it is possible to recover the contents of the target volume other than the time the replication of the target volume was acquired.

In order to recover data at a point in time when the software running on the host computer is in a resting state, a point referred to as a recovery point to become the reference for recovering data is created. Here, after the host computer enters the software in a resting state, it issues a recovery point creation request to the storage system notifying a certain point in time as the recovery point.

Incidentally, by creating a special journal, the storage system that received the recovery point creation request is able to differentiate the journals created before the issue of the recovery point creation request and the journals created after the issue of the recovery point creation request. When the storage system thereafter receives a recovery request to the recovery point from the host computer, it recovers data of the recovery point by sequentially applying journals, up to the recovery point from the oldest journal, to the base volume.

SUMMARY

Patent Document 1 discloses preparing a volume for storing such journals (hereinafter referred to as a "journal volume") in a storage system, creating a new base volume using a base volume and a journal when a new journal can no longer be stored in the journal volume, and thereafter destroying the journals prior to such base volume.

Meanwhile, among users using this kind of storage system, there are users who give priority to the temporal range for retaining the journal rather than the size of the journal volume; that is, the temporal range in which the target volume can be recovered based on the CDP function (hereinafter referred to as the "recovery range"), or the time required for recovering the past status of the target volume (hereinafter referred to as the "recovery time"), or the capacity in the storage system to be used in the recovery processing.

In the foregoing case, with the technology disclosed in Patent Document 1, the recovery time and recovery range are decided depending on the capacity of the journal volume set by the user. Thus, for example, when the journal volume to be applied to the base volume upon recovering the past status of the target volume is too large, there are cases when it is not possible to perform recovery at the service level sought by the user regarding the recovery time (hereinafter referred to as the "RTO (Recovery Time Objective)"), recovery range and/or capacity.

The present invention was made in view of the foregoing points. Thus, an object of the present invention is to propose a storage system and a data recovery method capable of guaranteeing data recovery processing at a service level sought by a user.

In order to achieve the foregoing object, the present invention provides a storage system comprising a replication creation unit for creating a replication of write data written from a host computer (hereinafter "host") into a volume as necessary, a journal creation unit for creating a journal containing the write data and control information concerning the writing of the write data in the volume each time the write data is written in the volume, a recovery unit for recovering a past status of the write data based on the replication of write data and the journal, a creation and management unit for creating and managing information representing a data recovery candidate point as a candidate of a point in time for recovering the write data, and a redundancy elimination unit for using one or more data recovery candidate points and specifying a section containing the journal and the replication of write data, checking a redundancy relation of a write range in the volume of write data written from host into the volume contained in the journal regarding one or more the journals in the section, and executing redundancy elimination processing of merging a plurality of the replications of write data or a plurality of the journals into a single replication of write data or a single journal based on the check result.

With this storage system, since it is possible to eliminate redundant journals, it is possible to reduce the number of journals to be applied to the replication of write data during data recovery processing. Thereby, it is possible to shorten the time required for data recovery processing, and perform such data recovery processing within the data recovery time demanded by the user.

Further, the present invention provides a data recovery method of creating a replication of write data written from a host into a volume as necessary, creating a journal containing the write data and control information concerning the writing of the write data in the volume each time the write data is written in the volume, and recovering a past status of the write data based on the replication of write data and the journal. This data recovery methods comprises a first step for creating and managing information representing a data recovery candidate point as a candidate of a point in time for recovering the write data, and a second step for using one or more data recovery candidate points and specifying a section containing the journal and the replication of write data, checking a redundancy relation of a write range in the volume of write data written from host into the volume contained in the journal regarding one or more the journals in the section, and executing redundancy removal processing of merging a plurality of the replications of write data or a plurality of the journals into a single replication of write data or a single journal based on the check result.

With this data recovery method, since it is possible to eliminate redundant journals, it is possible to reduce the number of journals to be applied to the replication of write data during data recovery processing. Thereby, it is possible to shorten the time required for data recovery processing, and perform such data recovery processing within the data recovery time demanded by the user.

Moreover, the present invention provides a storage system comprising a replication creation unit for creating a replication of write data written from a host into a volume as necessary, a journal creation unit for creating a journal containing the write data and control information concerning the writing of the write data in the volume each time the write data is written in the volume, a recovery unit for recovering a past status of the write data based on the replication of write data and the journal, a storage unit for storing a target data recovery time required for recovering a predetermined past status of the write data, a retention period of a predetermined target journal, and a target capacity to be used in data recovery processing for recovering a predetermined past status of the write data, and a write data recovery unit for recovering the past status of write data based on the replication of write data and the journal so as to guarantee at least one among the target data recovery time, the target journal retention period and the target capacity.

With this storage system, it is possible to perform data recovery processing that guarantees at least one among the data recovery time, data recovery range and capacity to be used in data recovery processing.

In addition, the present invention provides a data recovery method of creating a replication of write data written from a host into a volume as necessary, creating a journal containing the write data and control information concerning the writing of the write data in the volume each time the write data is written in the volume, and recovering a past status of the write data based on the replication of write data and the journal. This data recovery method comprises a first step for storing a target data recovery time required for recovering a predetermined past status of the write data, a retention period of a predetermined target journal, and a target capacity to be used in data recovery processing for recovering a predetermined past status of the write data, and a second step for recovering the past status of write data based on the replication of write data and the journal so as to guarantee at least one among the target data recovery time, the target journal retention period and the target capacity.

With this data recovery method, it is possible to perform data recovery processing that guarantees at least one among the data recovery time, data recovery range and capacity to be used in data recovery processing.

According to the present invention, realized are a storage system and a data recovery method capable of guaranteeing data recovery processing at a service level sought by a user.

DESCRIPTION OF DRAWINGS

FIG. 20 is a diagram showing a journal format according to another embodiment of the present invention;

FIG. 21 is a chart explaining a recovery point management table;

FIG. 22A to FIG. 22D are conceptual diagrams explaining journal redundancy elimination;

FIG. 23 is a conceptual diagram explaining recovery point section information;

FIG. 35 is a conceptual diagram explaining chunk information;

FIG. 36 is a conceptual diagram explaining journal amount information according to yet another embodiment of the present invention;

FIG. 39 is a schematic diagram schematically showing a GUI screen displayed on the host 100 regarding CDP control.

DETAILED DESCRIPTION

An embodiment of the present invention is now explained in detail with reference to the attached drawings. Incidentally, the embodiments described below merely illustrate an example, and the present invention shall not be limited thereto.

(1) First Embodiment (1-1) Configuration of Information Processing System in Present Embodiment The first embodiment is now explained with reference to FIG. 1 to FIG. 14. Foremost, the system configuration is explained with reference to FIG. 1 and FIG. 2. Subsequently, the CDP function is explained with reference to FIG. 3, and control information and programs required for controlling the CDP are explained with reference to FIG. 4 and FIG. 5. Processing for beginning the CDP (hereinafter referred to as the "CDP beginning processing") is thereafter explained with reference to FIG. 6 and FIG. 7. In addition, two CDP control methods for guaranteeing RTO specified by the user are explained with reference to FIG. 8 to FIG. 14.

Figure 1:
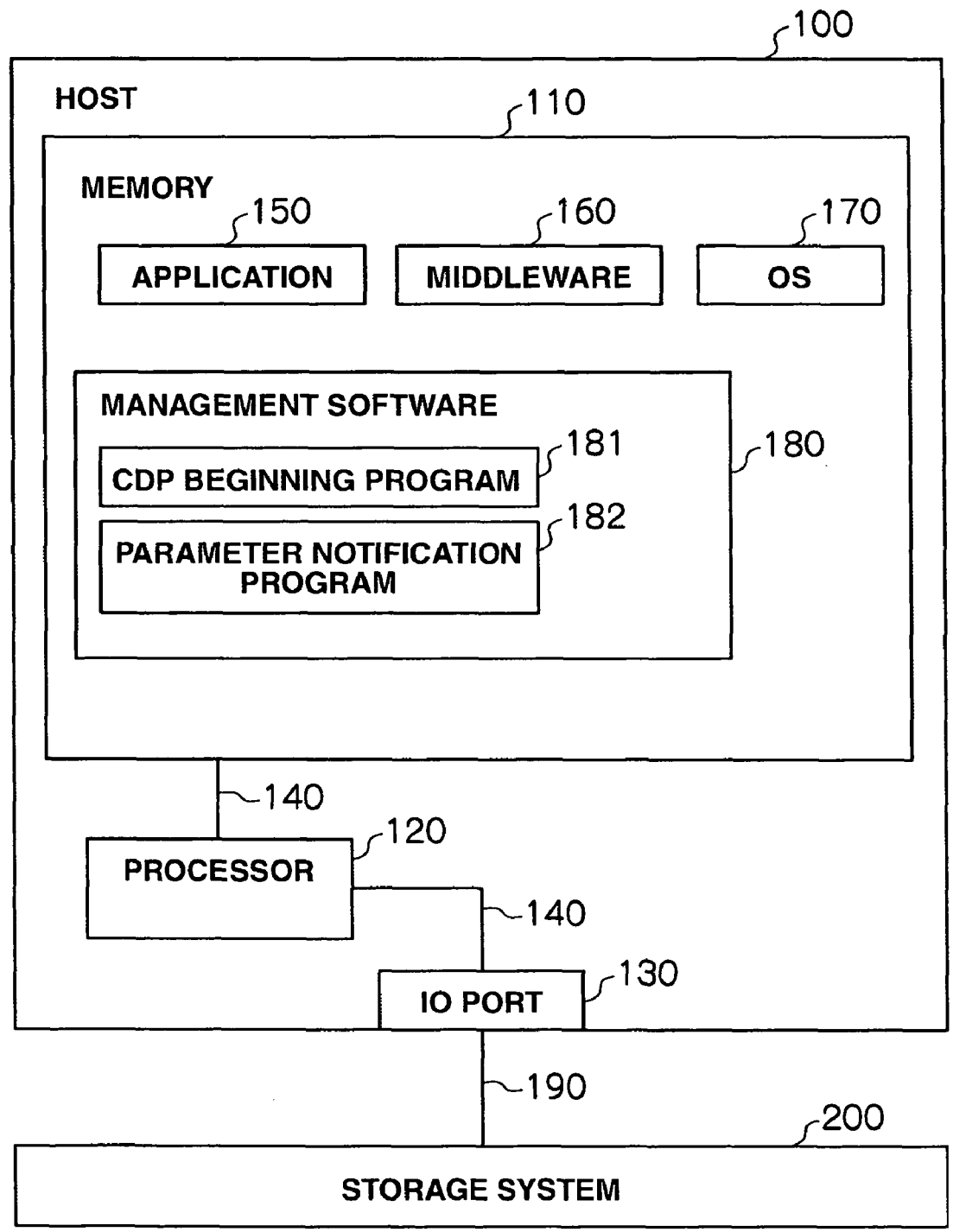
FIG. 1 is a block diagram showing the configuration of an information processing system and a host according to an embodiment of the present invention.
Figure 2:
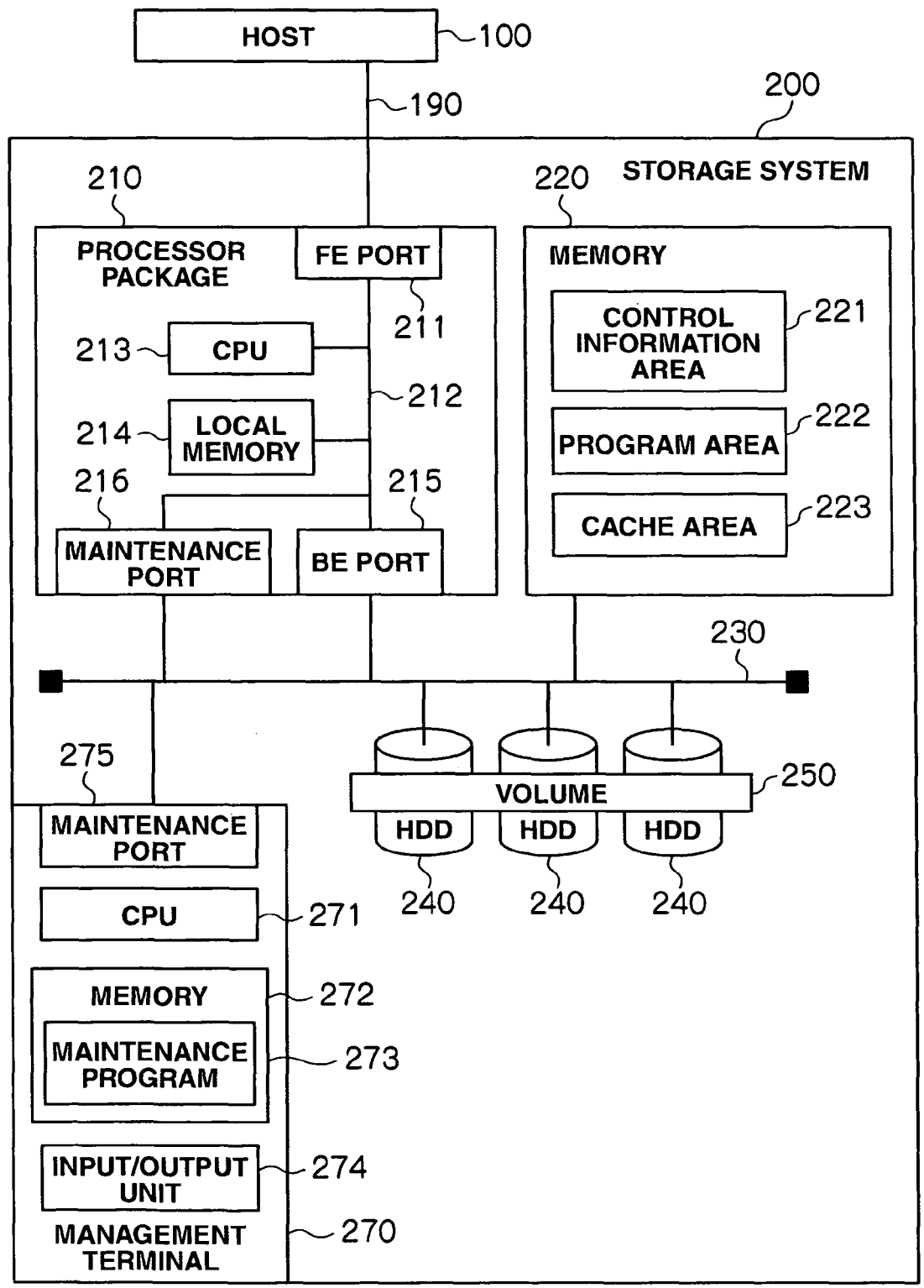
FIG. 2 is a diagram showing an example of the configuration of an information processing system and a storage system according to an embodiment of the present invention.

FIG. 1 and FIG. 2 show the overall information processing system 1 according to the present embodiment. The information processing system 1 is configured by a host 100 and a storage system 200 being connected via a network 190.

The host 100 is a device that performs prescribed operation processing based on software such as applications and database management system (hereinafter referred to as "DBMS"). The host 100 stores and retain all or a part of the data to be used for the operation processing in the storage system 200.

As shown in FIG. 1, the host 100 comprises an I/O port 130, a memory 110 and a processor 120 connected via network 140. The host 100 is able to send and receive I/O requests and associated data to and from the storage system 200 through the I/O port 130. Incidentally, a plurality of I/O ports 130 may be provided to the host 100.

The memory 110 stores software such as an OS (Operating System) 170, middleware 160, application 150, and management software 180. The processor 120 reads and executes the foregoing software from the memory 110 via the network 140. A CDP beginning notification program 181 and a parameter notification program 182 described later configure a part of the management software 180. The processing contents of the host based on the CDP beginning notification program 181 and the parameter notification program 182 will be described later.

The storage system 200 is a device for storing the data to be used in the operation processing to be executed by the host 100 as described above. The storage system 200 includes a processor package 210, a memory 220, an HDD (Hard Disk Drive) 240 and a management terminal 270, and is configured by these components being mutually connected via the network 230. Incidentally, the management terminal 270 may be provided separately from the storage system 200. Nevertheless, the management terminal 270 is built in the storage system 200 in this embodiment. Further, the network 230 may be physically separated into a maintenance network that connects the maintenance port 216 and the maintenance port 275, and an I/O network that connects the backend port 215 and the HDD 240.

The processor package 210 comprises a frontend port 211 (abbreviated as "FE port" in FIG. 2), a CPU (Central Processing Unit) 213, a local memory 214, a maintenance port 216, and a backend port 215 (abbreviated as "BE port" in FIG. 2). These components are mutually connected via the network 212.

The frontend port 211 is connected to the I/O port 130 of the host 100, and is able to receive write requests and read requests from the host 100. Incidentally, the I/O port 130 of the host 100 and the frontend port 211 do not need to be connected directly, and may also be connected indirectly using a switch or the like.

The CPU 213 executes various types of processing such as write, read, backup and recovery from the host 100 by executing the programs stored in the program area 222 of the memory 220.

The local memory 214 is used for temporarily storing programs to be executed by the CPU 213, and also used for temporarily storing data (control information, operation data, programs and the like) stored in the memory 220 and the HDD 240. Since the distance of local memory 214 is relatively close from the CPU 213 in comparison to the memory 220 and the HDD 240, the CPU 213 is able to access such data at high speed.

The backend port 215 is connected to the HDD 240 via the network 230, and is used for writing data in the HDD 240 according to the write request from the host 100, and reading corresponding data from the HDD 240 according to the read request from the host 100.

The maintenance port 216 is connected to a maintenance port 275 of the management terminal 270 via the network 230, and is used for sending operation information of the processor package 210 to the management terminal 270, and receiving the maintenance operation from the management terminal 270.

Incidentally, the number of frontend ports 211, CPUs 213, local memories 214, backend ports 215 and maintenance ports 216 to be provided to the processor package 210 may be one or more. The storage system 200 may also be provided with one or more processor packages 210.

The memory 220 is able to store various types of data. In actuality, the storage area provided by the memory 220 is separated into a control information area 221, a program area 222 and a cache area 223 according to the type of data to be stored.

The program area 222 stores various types of programs for realizing the functions to be provided by the storage system 200, and the control information area 221 stores control information to be used by the programs. The programs and control information stored in the memory 220 are read by the CPU 213 of the processor package 210 via the network 230 and used in the various types of processing described later.

The cache area 223 temporarily stores data to be read from and written into the HDD 240. Since the memory 220 a high-speed storage medium in comparison to the HDD 240, by retaining in the cache area 223 frequently-used data stored in the HDD 240, processing speed of read requests and write requests from the host 100 can be increased in comparison to cases where all data are constantly stored in the HDD 240. Incidentally, the memory 220 may be mirrored in order to avoid the loss of data during the occurrence of a failure.

The HDD 240 stores data to be used by the software to be executed in the host 100. Incidentally, one or more HDDs 240 may be merged into a unit referred to as a parity group and operated with a RAID (Redundant Arrays of Inexpensive Disks) system. It is thereby possible to seek improvement in the reliability of data protection. Further, a parity group configured from one or more HDDs 240 can be partitioned into one or more logical areas, and treat each logical area as a logical storage device. In the ensuing explanation, this kind of logical storage device is referred to as a volume 250. Incidentally, although an HDD 240 was used as the physical storage medium in this embodiment, a storage medium such as a flash memory or DVD may be used in substitute for the HDD 240.

The management terminal 270 comprises a CPU 271, a memory 272, an input/output unit 274 and a maintenance port 275.

The CPU 271 is a processor that governs the operational control of the overall management terminal 270. The maintenance described later is implemented by the CPU 271 reading and executing the maintenance program 273 stored in the memory 272.

The memory 272 is used for storing the foregoing maintenance program 273, and also used as a work memory of the CPU 271. Further, the memory 272 is also able to store information obtained from the processor package 210. Incidentally, the memory 272 of the management terminal 270 may also store the same programs as the CDP beginning notification program 181 and the parameter notification program 182 of the management software 180 stored in the memory 10 of the host 100.

The input/output unit 274 is configured from a keyboard, a mouse, a monitor and so on for receiving operations from the user and displaying operation information of the storage system 200 to the user. Further, the maintenance port 275 is connected to the maintenance port 216 of the processor package 210 as described above, and is used for acquiring operation information from the processor package 210, and sending maintenance operation to the processor package 210.

Incidentally, the storage system 200 is provided with a power supply unit (not shown) for supplying power to the memory 220, the processor package 210, the management terminal 270 and the HDD 240.

(1-2) CDP Function of Present Embodiment

The CDP function is now explained with reference to FIG. 3. An operation volume 301 storing data to be used in the operation processing to be executed by the host 100 is defined in the storage system 200. An arrow 305 shows that the operation data is written from the host 100 to the operation volume 301. The CDP function is a function for recovering data of this operation volume 301 at a certain point in time in the past (recovery point).

The base volume 302 is a replication of a past operation volume 301. For example, the base volume 302 stores data of the operation volume 301 of one hour ago. An arrow 307 shows that the base volume 302 is a replication of the operation volume 301.

A journal volume 303 is a volume for storing journals configured from control information (write address, write data length, write time, write sequence number and the like) concerning the writing of data and the write data when such data is written from the host 100 into the operation volume 301. An arrow 306 shows that when data is written from the host 100 into the operation volume 301, the storage system 200 creates a journal, and stores such journal in the journal volume 303. Incidentally, the foregoing write sequence number represents the sequence in which the write data was written from the host 100 into the storage system 200.

A recovery volume 304 is a volume for storing data that was recovered using the CDP function. When recovery designating the recovery point is notified from the host 100, data of the base volume 302 is copied to the recovery volume 304. Thereafter, journals up to the recovery point are applied to the recovery volume 304 journal application).

Here, journals are applied in ascending order of the write sequence number. This is in order to prevent data recovered at a certain address becoming old data when the application sequence of journals to the same address is switched. For example, let it be assumed that a journal of write sequence number 1 contains data A written in address A at 9:55 AM, and a journal of write sequence number 3 contains data B written in address A at 9:56 AM. When recovering data at 10:00 AM, data B, and not data A, must be written in address A. As a result of writing data in ascending order of the write sequence number, it is possible to guarantee that data B is written in address A.

As described above, it is possible to recover data at the recovery point designated by the host 100.

An arrow 308 shows the replication of the base volume 302 into the recovery volume 304, and an arrow 309 shows the application of a journal to the recovery volume 304. Further, an arrow 310 shows that the host 100 is accessing (read/write) the recovery volume 304.

Figure 3:
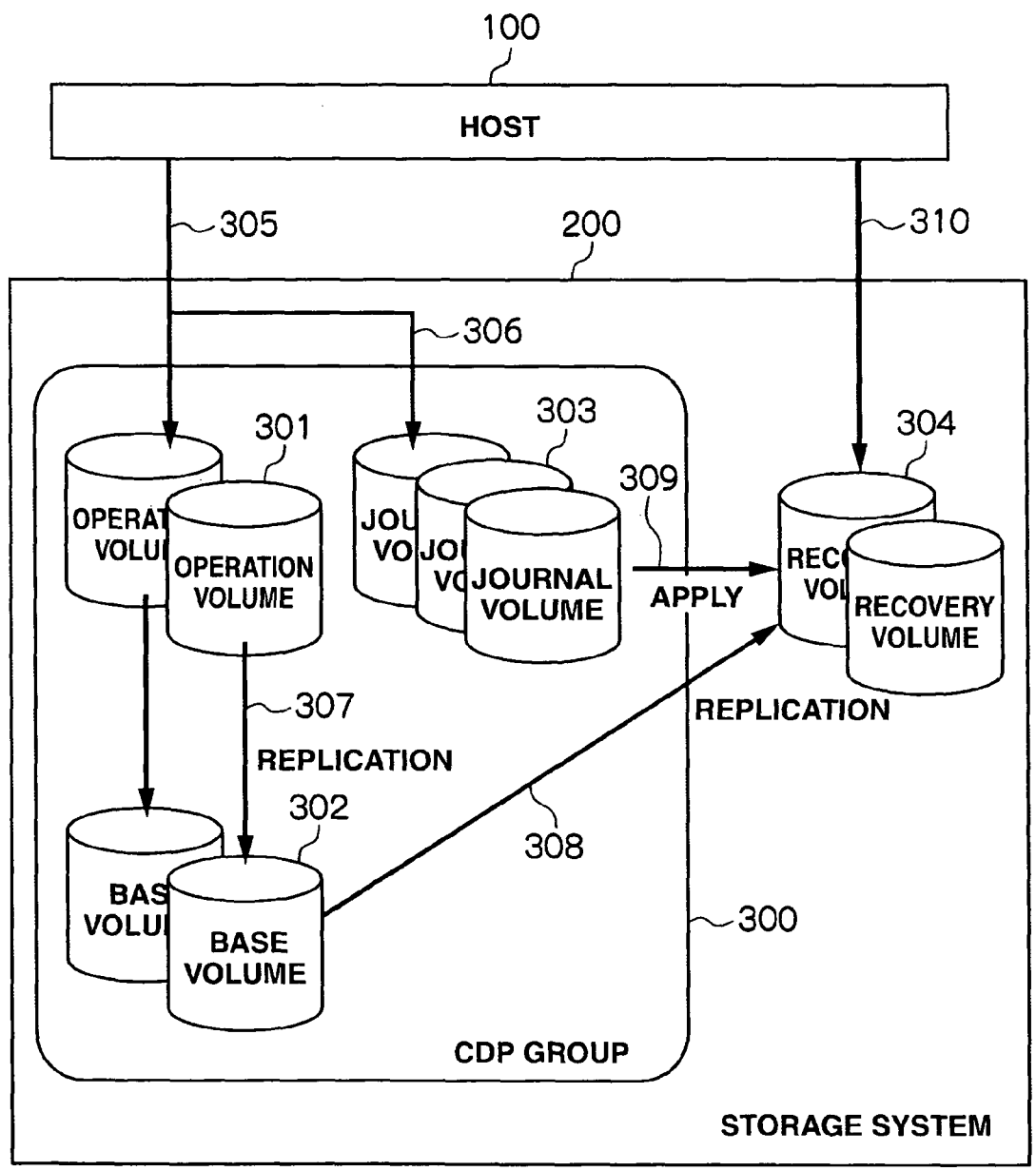
FIG. 3 is a conceptual diagram showing the outline of a CDP function.

In the example illustrated in FIG. 3, one CDP group 300 is configured from two operation volumes 301, base volumes 302 corresponding to the two operation volumes 301, and three journal volumes 303. As a result of adopting the concept of a CDP group, it is possible to use the CDP group unit and recover data of a recovery point in the past. Incidentally, it is also possible to recover only data of a specific operation volume 301 belonging to the CDP group 300. Further, a plurality of CDP groups 300 may exist in the storage system 200.

Incidentally, the operation volume 301 can be applied as the recovery volume 304 (that is, to return the contents of the operation volume 301 to the status of the recovery point). Accordingly, it is possible to inhibit the consumption of the volume quantity in the storage system 200. Further, the base volume 302 may be applied as the recovery volume 304. Here, the copying from data from the base volume 302 to the recovery volume 304 described above will no longer be required.

In the foregoing explanation, although all data of the operation volume 301 was copied to the base volume 302 when creating the base volume 302, and all data of the base volume 302 was copied to the recovery volume 304 when creating the recovery volume 304, the base volume 302 and the recovery volume 304 may also be created according to the methods described below (first replication method and second replication method). In the following description, although a case is explained of using data of the operation volume 301 in creating the base volume 302, the same applies to cases of using data of the base volume 302 in creating the recovery volume 304.

The first replication method is foremost explained. In the first replication method, when creating the base volume 302, data is not copied from the operation volume 301 to the base volume 302 until data is written in the operation volume 301.

When creating the base volume 302, a pointer to the same address of the operation volume 301 for each address of the base volume 302 is created as the control information thereof. When reading data from the base volume 302, the storage system 200 uses this pointer to read data from the operation volume 301.

When a write request is issued from the host 100 to the operation volume 301, data stored in the address designated as the write destination of data in the write request is copied to the base volume 302, and write data is written from the host 100 into the operation volume 301 after the copy is complete. Further, regarding this address, the pointer from the base volume 302 to the operation volume 301 is deleted.

In the foregoing processing, the read request of data in the base volume 302 corresponding to the address to which the write request was issued from the operation volume 301 is issued to the base volume 302, and not to the operation volume 301.

The second replication method is now explained. With the second replication method, in addition to the first replication method, a storage area is allocated to the base volume 302 only when actually writing data therein.

Specifically, foremost, a storage area to be allocated to a plurality of base volumes 302 is created in the storage system 200 as necessary. This storage area is referred to as a pool volume (not shown). When a write request is issued from the host 100 to the operation volume 301, the storage system 200 allocates a storage area from the pool volume to the base volume 302 in a required capacity.

Further, the storage system 200 copies data stored in the address designated as the write destination of data in the write request to the storage area allocated from the pool volume to the base volume 302, and writes the write data from the host 100 into the operation volume 301 after the copy is complete. Here, the base volume 302 becomes the pointer to the operation volume 301 or the pool volume.

The present invention can also be implemented with the base volume 302 and the recovery volume 304 logically created as described above. As a result of creating the base volume 302 and the recovery volume 304 according to the first replication method and the second replication method as described above, it is possible to reduce the storage area that needs to be consumed for the base volume 302 and the recovery volume 304. Incidentally, the present invention can also be implemented with the replication function not described in this embodiment.

Figure 4:
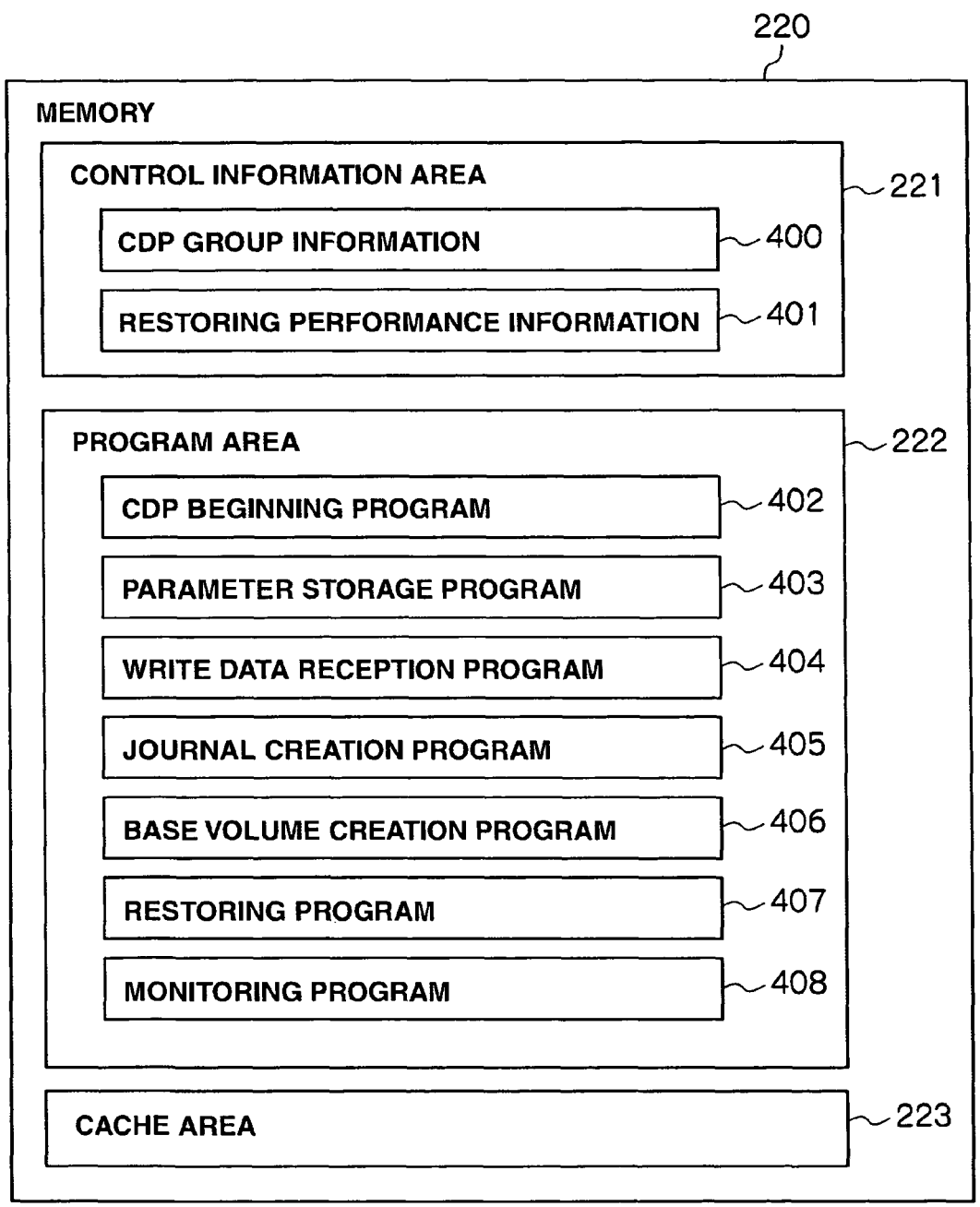
FIG. 4 is a conceptual diagram explaining the various types of control information and various programs stored in a memory of the storage system.

An example of the control programs and control information for controlling the CDP is shown in FIG. 4 to FIG. 8. FIG. 4 shows the details of the control information and the control programs to be respectively stored in the control information area 221 and the program area 222 in the memory 220 of the storage system 200. The control information area 221 stores CDP group information 400 and restoring performance information 401 as control information concerning the CDP function. The CDP group information 400 will be explained with reference to FIG. 5. The restoring performance information 401 is information showing the performance of the storage system 200 in applying journals to the recovery volume 304 (FIG. 3). Incidentally, details regarding the various types of programs stored in the program area 222 will be described later.

Figure 5:
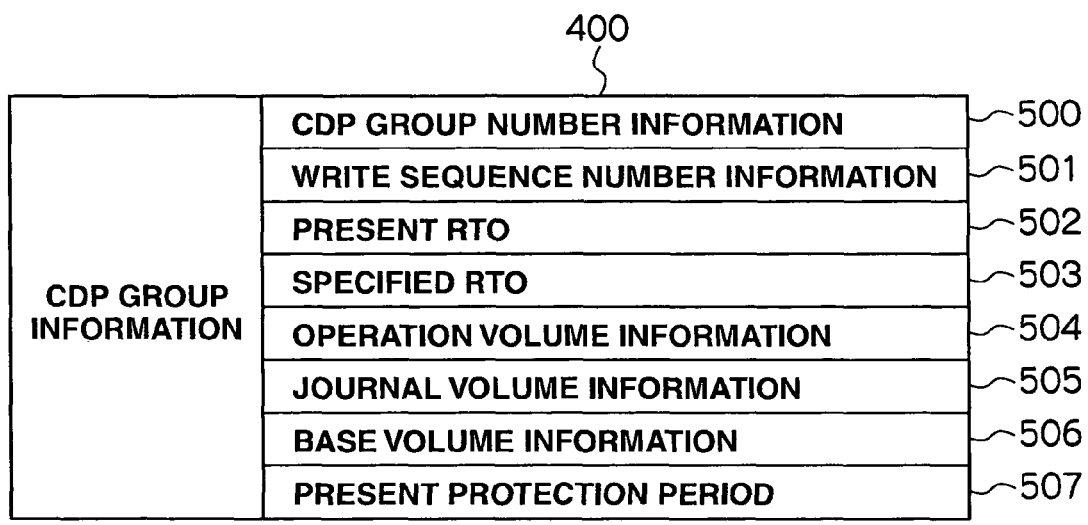
FIG. 5 is a conceptual diagram explaining CDP group information.

FIG. 5 shows the details of the CDP group information 400. CDP group number information 500 is information representing an identification number (hereinafter referred to as the "CDP group number") given to the corresponding CDP group 300 in the storage system 200 for uniquely identifying the CDP group 300. Write sequence number information 501 is information representing a write sequence number allocated to the journal created upon receiving a write request from the host 100. Upon creating a journal, the storage system 200 allocates the value of the write sequence number information 501 at such time as the write sequence number to the journal, and thereafter increments (adds 1 to) the value of the write sequence number information 501 in order to prepare a write sequence number to the allocated to the subsequent journal.

Operation volume information 504 is information for managing the operation volume 301 belonging to the corresponding CDP group 300. Specifically, the operation volume information 504 is configured from information such as a volume number and a volume size.

Further, base volume information 506 is information for managing the base volume 302 belonging to the corresponding CDP group 300. A detailed example of the base volume information 506 is shown in FIG. 6.

Figure 6:
FIG. 6 is a conceptual diagram explaining base volume information.

In FIG. 6, "base volume number" represents the identification number given to the corresponding base volume 302, "creation time" represents the time that the base volume 302 was created. Further, "restored write sequence number" represents the write sequence number of the last journal that was applied to the base volume 302. Moreover, "corresponding operation volume number" represents an operation volume number of the operation volume 301 to become the replication source of the base volume 302.

Journal volume information 505 is information for managing the journal volume 303 (FIG. 3) belonging to the corresponding CDP group 300. A detailed example of the journal volume information 505 is shown in FIG. 7.

Figure 7:
FIG. 7 is a conceptual diagram explaining journal amount information.

In FIG. 7, "journal volume number" is a number of the corresponding journal volume 303, "size" represents the size of the journal volume 303. Further, "volume utilization" shows the utilization of the journal volume 303 identified by the "journal volume number." When a journal is deleted, the utilization will decrease. "Overall utilization" shows the utilization of the journal volume 303 in the CDP group unit identified by the CDP group number. In the case of FIG. 7, the three journal volumes 303 belonging to the CDP group 300 all have a capacity of "5 GB," and the utilizations there of are 60%, 70% and 80%, respectively. Thus, the CDP group unit has a capacity of 15 GB, and 70% thereof is being used. Thus, the "overall utilization" in this case will be 70%.

The additional items of "present RTO" 502, "specified RTO" 503, and "present protection period" 507 will be described later together with the explanation on the processing using such information.

Incidentally, data (control information, operation data, programs and the like) stored in the memory 220 and the volume 250 may also be temporarily stored in the local memory 214. Further, specific data may also be managed only with the local memory 214. Moreover, the copy of specific data stored in the memory 220 and the volume 250 may also be constantly stored in the local memory 214. The same applies to the processor 120 of the host 100. In other words, the processor 120 of the host 100 may also store the various types of data stored in the memory 110 into a local memory not shown provided to the host 100.

Figure 8:
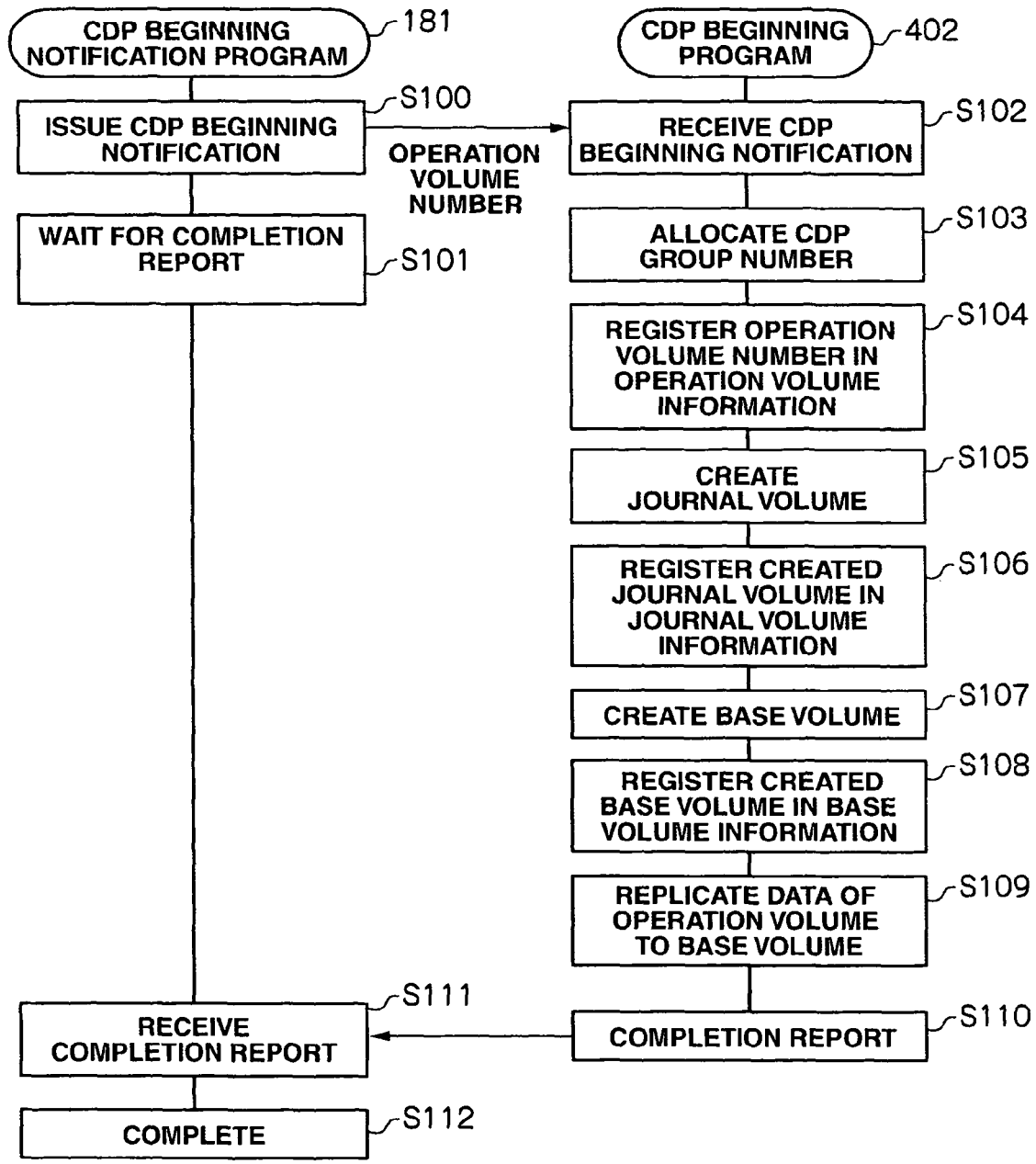
FIG. 8 is a flowchart explaining CDP beginning processing.

An example of processing (hereinafter referred to as the "CDP beginning processing") for starting CDP is now explained with reference to FIG. 8. The CDP beginning processing is performed by the processor 120 of the host 100 executing the CDP beginning notification program 181 stored in the memory 110, and the CPU 213 of the storage system 200 executing the CDP beginning program 402 stored in the memory 220. Incidentally, in the ensuing description, although the processing subject of the various types of processing is explained as a "program," in actuality, it goes without saying that the processor 120 (FIG. 1) of the host 110 and the CPU 213 of the processor package 210 in the storage system 200 execute the corresponding processing based on the relevant program.

Foremost, the CDP beginning notification program 181 of the host 100 sends a CDP beginning notification to the CDP beginning program 402 of the storage system 200 (S100), and waits for a reply from the CDP beginning program 402 (S101). Moreover, when sending the CDP beginning notification, the CDP beginning notification program 181 notifies the operation volume number of the target operation volume 301 to the CDP beginning program 402. Incidentally, the CDP beginning notification program 181 may also execute processing of receiving the CDP beginning notification from the user immediately before step S100.

When the CDP beginning program 402 receives the CDP beginning notification and the operation volume number from the CDP beginning notification program 181 (S102), it allocates the CDP group number to the target CDP group 300, and stores the allocated CDP group number in the storage area secured for the CDP group number information 500 in the memory as the CDP group number information 500 in the corresponding CDP group information 400 (S103). Further, the CDP beginning program 402 stores the notified operation volume number in the storage area secured for the operation volume information 504 in the memory 220 as the operation volume information 504 in the CDP group information 400 (S104). Incidentally, in this embodiment, the storage system 200 is managing unused CDP group numbers.

Subsequently, the CDP beginning program 402 creates a journal volume 303 (S105), and stores the journal volume number, size, volume utilization and overall utilization of the created journal volume 303 in the storage area secured for the journal amount information 505 in the memory 220 as the journal amount information 505 in the CDP group information 400 (S106). Incidentally, "creation of journal volume 303" refers to the processing of searching a volume to be used as the journal volume 303 internally from the storage system 200, and initializing such volume.

The CDP beginning program 402 thereafter creates a base volume 302 (S107), and stores the base volume number, creation time, restored write sequence number and corresponding operation volume number of the created base volume 302 in the storage area secured for the base volume information 506 in the memory 220 as the base volume information 506 in the CDP group information 400 (S108). Thereupon, the CDP beginning program 402 stores "0" as the restored write sequence number of the base volume information 506 in the memory 220. Further, since the base volume 302 is a replication of the operation volume 301, the CDP beginning program 402 copies all data of the operation volume 301 to the base volume 302 (S109). The copy method will be described later.

Thereafter, the CDP beginning program 402 reports the completion to the CDP beginning notification program 181 of the host 100 (S110). The CDP beginning program 402 that received the completion report ends this processing (S111, S112).

The flow of copy processing of copying data of the operation volume 301 to the base volume 302 at foregoing step S109 is now explained.

Here, the CDP beginning program 402 sequentially reads data from the top address of the operation volume 301 toward the end of the operation volume 301, and writes such data in the base volume 302. Once copy is complete to the end of the operation volume 301, the status becomes copy complete.

Nevertheless, in order to create a copy of the operation volume 301 at a certain point in time with the foregoing operation, it is necessary to replicate data by once stopping the writing of data from the host 100 into the operation volume 301. As a method of avoiding this drawback and replicating data while receiving the writing of data from the host 100, the storage system 200 retains a copied bitmap (not shown). The copied bitmap is a bitmap for managing whether the data stored in the address has been copied in the base volume 302 for each address in the operation volume 301. Here, copied is represented when the value of the bit corresponding to the address in the copied bitmap is "OFF," and not copied is represented when the value of the bit corresponding to the address in the copied bitmap is "ON."

When the CDP beginning program 402 starts the copy processing from the operation volume 301 to the base volume 302, it turns "ON" all bits of the copied bitmap. The CDP beginning program 402 changes the bit value of the copied bitmap corresponding to the copied address to "OFF" while the copy processing is being executed.

The CDP beginning program 402 also refers to the copied bitmap upon receiving a write request from the host 100 to the operation volume 301, copies the data of such address from the operation volume 301 to the base volume 302 at that point in time when the bit value of the copied bitmap corresponding to the write destination address of the write data is "ON," and changes the copied bitmap to "OFF." After this copy is complete, the CDP beginning program 402 writes the write data from the host 100 into the operation volume 301.

Thereby, it is possible to create a replication of the operation volume 301 at a certain point in time while receiving the writing of data from the host 100.

Incidentally, the host 100 may also decide the volume to be used as the base volume 302 in the target CDP group 300 and the volume to be used as the journal volume 303 and notify the CDP group number of the target CDP group 300 and the volume numbers (base volume number and journal volume number) of the foregoing volumes, together with the CDP beginning notification, to the CDP beginning notification program 181. Further, the host 100 may notify in advance the volumes to be used as the base volume 302 and journals volume 303 to the storage system 200, the storage system 200 may manage a list of volumes that can be used as the base volume 302 and the volumes that can be used as the journal volume 303, and the CDP beginning program 402 may select the base volume 302 and journals volume 303 from the foregoing list.

Further, since much time is required for copying data from the operation volume 301 to the base volume 302, after the CDP beginning program 402 starts the copy at step S109, the routine may proceed to the processing at step 110 without for waiting for the completion of such copy. Thereby, it is possible to shorten the time spent by the CDP beginning notification program 181 waiting for the completion report from the CDP beginning program 402.

Further, the base volume 302 may also be created according to the first replication method or the second replication method described above.

Two types of CDP control methods (first CDP control method and second CDP control method) for guaranteeing the RTO (target recovery time) sought by the user are now explained. Specifically, the user notifies the RTO to the storage system 200 in advance. Then, the storage system 200 controls the CDP so that it does not exceed the designated RTO.

The first CDP control method is foremost explained. In the first CDP control method, on journals in an amount applicable to the RTO designated by the user are retained in the journal volume 303. Thereby, when recovering the data, even if it is necessary to apply all journals stored in the journal volume 303 to the recovery volume 304, it will be possible to complete the processing within the RTO.

For instance, let it be assumed that the RTO designated by the user is 10 minutes, and the number of applicable journals in 10 minutes is 1,000,000 journals. In this case, only the latest 1,000,000 journals are stored in the journal volume 303, and journals that are older than the foregoing latest journals are sequentially applied to the base volume 302.

As a result of applying journals to the base volume 302 (journal application), the base volume 302 will become a replication of the operation volume 301 of a newer point in time. Thus, with this first CDP control method, there is a drawback in that the range of the recovery point that can be designated by the user will be small. Incidentally, in the ensuing explanation, the range of the recovery point that can be designated by the user is referred to as a "protection period."

In the first CDP control method, the present RTO 502 (FIG. 5), the specified RTO 503 (FIG. 5) and the present protection period 507 (FIG. 5) in the CDP group information 400 are used. Foremost, the present RTO 502, the specified information RTO 503 and the present protection period 507 are explained.

The present RTO 502 is information representing the worst value of the time required for the storage system 200 to recover data at a certain point in time in the past; that is, the worst value of RTO (hereinafter referred to as the "present RTO"). The specified RTO 503 is information representing an RTO designated by the user RTO (hereinafter referred to as the "specified RTO"). The storage system 200 controls the CDP so that the present RTO will not exceed the specified RTO. The present protection period 507 is information representing the range of the recovery point that can be designated by the user (hereinafter referred to as the "present protection period"). By periodically notifying the value (that is, the present protection period) stored as the present protection period 507 to the host 100, it is possible to confirm the protection period that is currently set by the user. Incidentally, a method of the host 100 inquiring the value of the present protection period 507 to the storage system 200 can also be applied.

Figure 9:
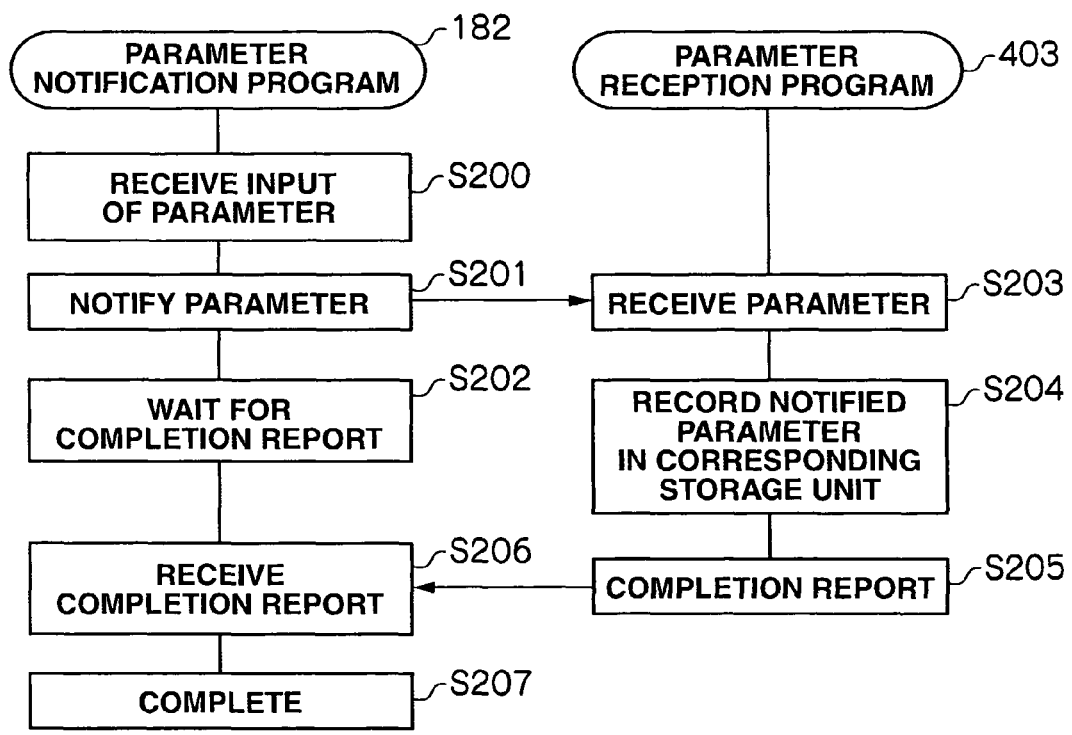
FIG. 9 is a flowchart explaining a first CDP control method.

An example of the processing for storing the specified RTO as the specified RTO 503 of the storage system 200 in the memory 220 (hereinafter referred to as the "specified RTO processing") is now explained with reference to FIG. 9. This specified RTO processing is performed by the processor 120 of the host 100 executing the parameter notification program 182 (FIG. 1) stored in the memory 110, and the CPU 213 of the storage system 200 executing the parameter reception program 403 (FIG. 4) stored in the memory 220.

Foremost, the parameter notification program 182 of the host 100 receives the input of a parameter from the user (S200), and notifies the received parameter to the parameter reception program 403 of the storage system 200 (S201). Thereafter, the parameter notification program 182 waits for a reply from the parameter reception program 403 (S202).

When the parameter reception program 403 receives the parameter (S203), it stores the notified parameter in the corresponding storage area (S204). For example, when the RTO is specified by the user, the parameter reception program 403 stores the parameter in the storage area secured for the specified RTO 503 in the memory 220 as the specified RTO 503 in the CDP group information 400 in the storage area secured for the specified RTO 503 in the memory 220.

Subsequently, the parameter reception program 403 sends a completion report to the parameter notification program 182 of the host 100 (S205), and the parameter notification program 182 that received the completion report ends this processing (S206, S207).

In the first CDP control method, journals are applied to the base volume 302 when it is not possible to satisfy the specified RTO (when the present RTO exceeds the specified RTO).

An example of determination processing for determining whether the present RTO exceeds the specified RTO and the processing for applying journals to the base volume 302 are now explained with reference to FIG. 10 to FIG. 12. In this example, determination processing is implemented in the journal creation processing.

Prior to explaining the journal creation processing, a format of a journal (hereinafter simply referred to as the "journal format") is explained. FIG. 10 shows an example of a journal format created by the journal creation program 405.

Figure 10:
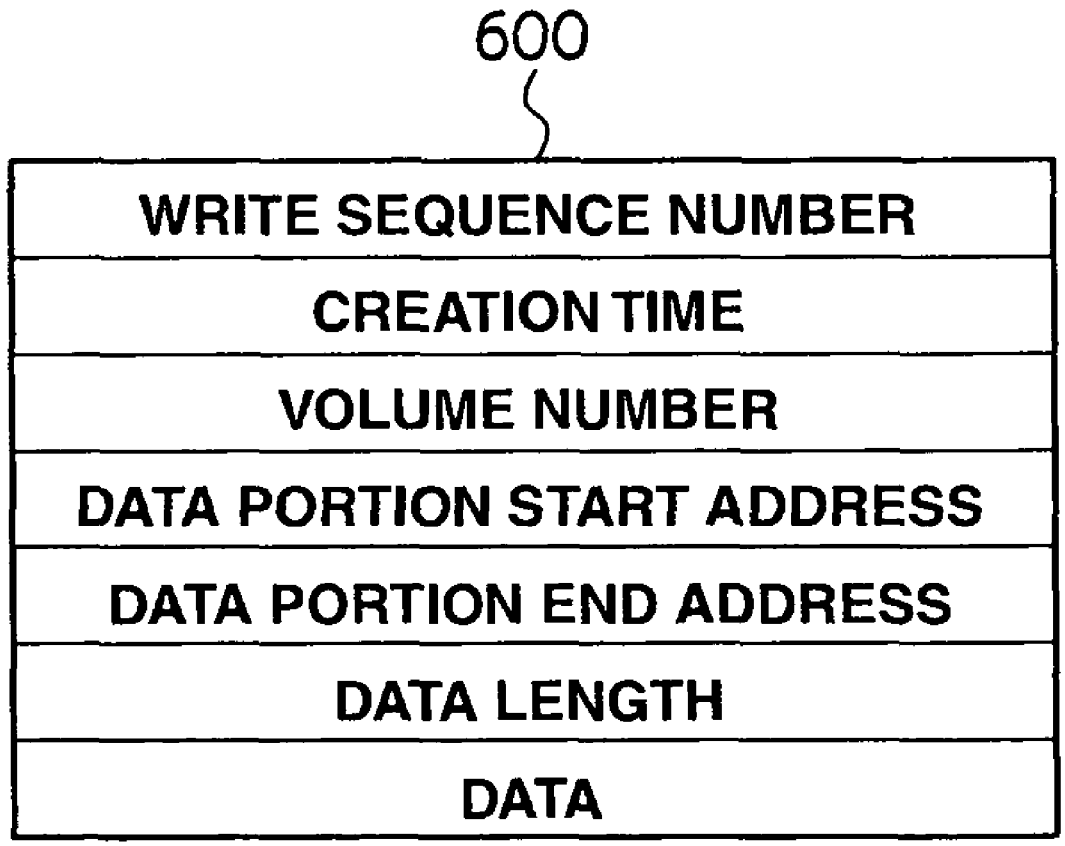
FIG. 10 is a conceptual diagram showing a journal format according to an embodiment of the present invention.

In FIG. 10, "write sequence number" represents the sequence in which the write data was written from the host 100. As a result of referring to the "write sequence number," it will be possible to apply journals to the base volume 302 and the recovery volume 304 (FIG. 3) in the sequence written from the host 100. "Creation time" represents the time that the journal was created. Further, "volume number" represents that the journal is a journal in relation to the writing of data in the operation volume 301 of that volume number.

"Data portion start address" and "data portion end address" respectively represent the start address and the end address of the storage area in the operation volume 301 written with data. By using the start address and end address, it will be possible to write data in the journals to the correct address upon applying journals to the base volume 302 and the recovery volume 304. "Data length" shows the size of the write data, and "data" shows the write data itself. Incidentally, since "data portion end address" can be calculated by using the "data portion start address" and the "data length," it is not necessarily essential information.

An example of processing for creating data (hereinafter referred to as the "journal creation processing") to be performed during the writing of data is now explained with reference to FIG. 11. This journal creation processing compares the present RTO and the specified RTO, and activates the restoring program 407 (FIG. 4) for applying journals to the base volume 302 when the present RTO exceeds the specified RTO.

The restoring program 407 applies journals to the base volume 302, and deletes the applied journals from the journal volume 303. Thereby, since the journal amount will decrease, the present RTO will decrease.

The foregoing processing routines are performed by the processor 120 of the host 100 executing the OS 170 stored in the memory 110, and the CPU 213 of the storage system 200 executing the write data reception program 404 and the journal creation program 405 stored in the memory 220.

Figure 11:
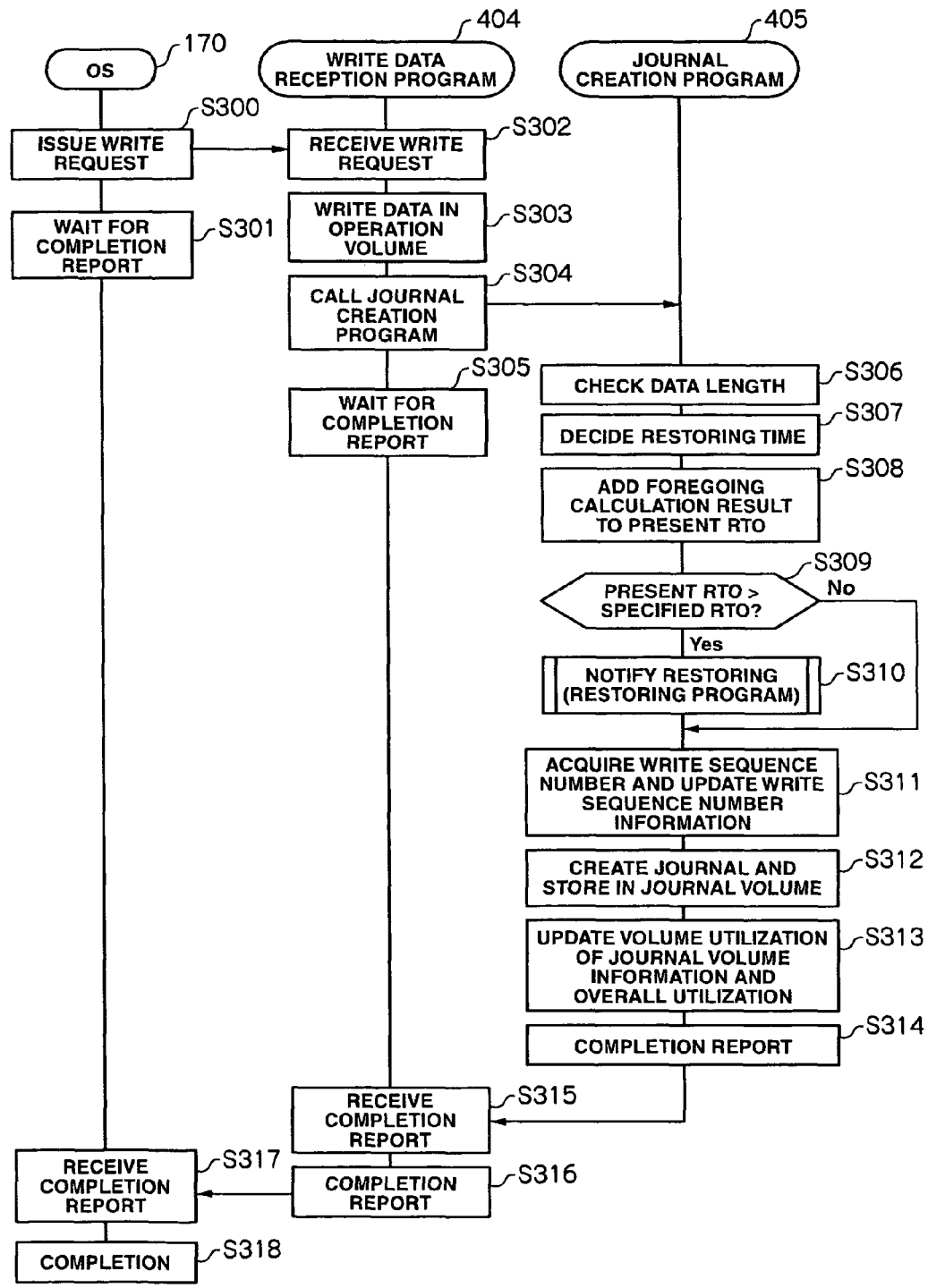
FIG. 11 is a flowchart explaining journal creation processing.
Figure 12:
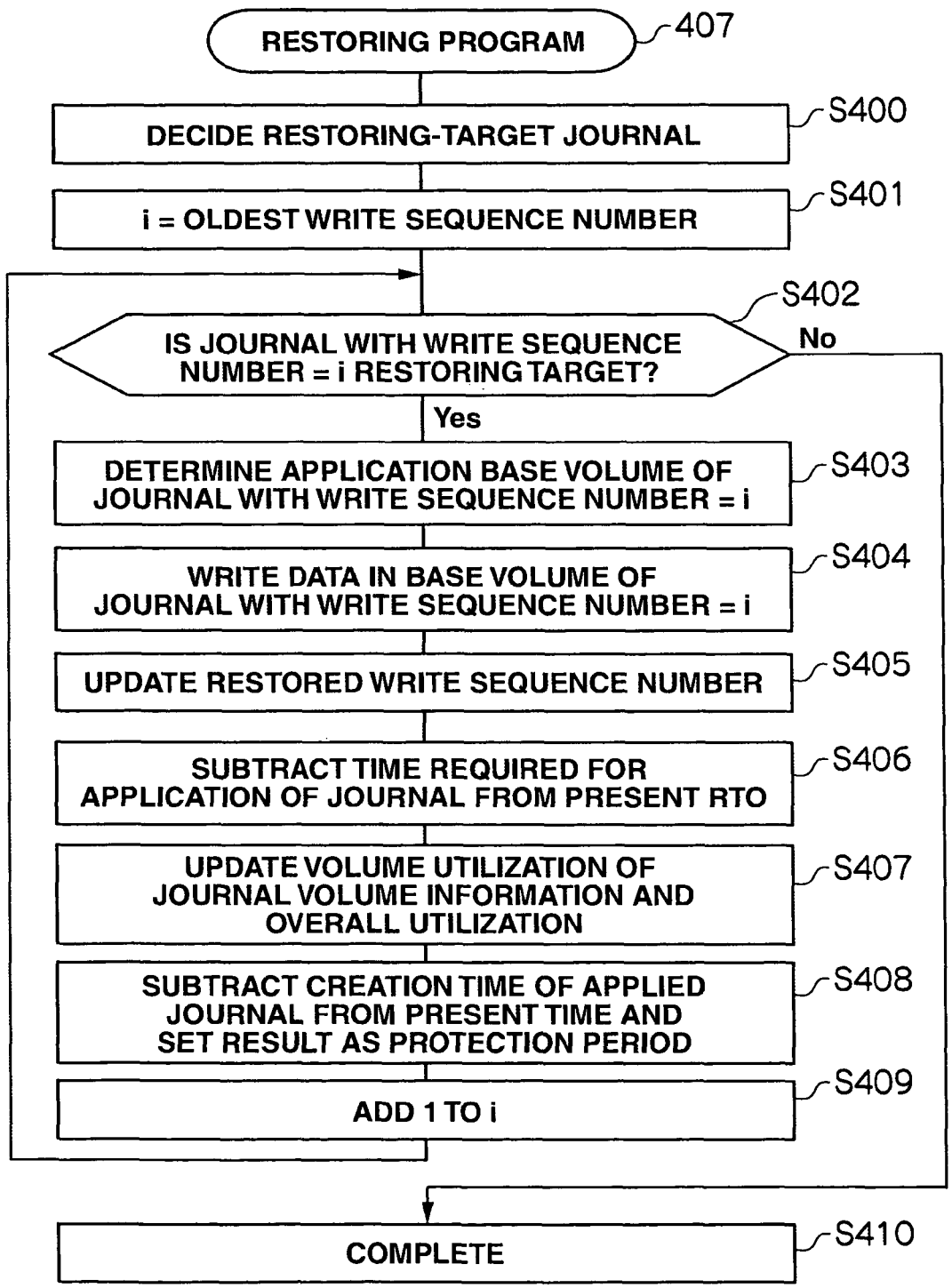
FIG. 12 is a flowchart explaining journal application processing.

Specifically, as shown in FIG. 11, foremost, the OS 170 in the host 100 issues a write request to the storage system 200 (S300), and waits for a write completion report from the storage system 200 (S301).

When the write data reception program 404 of the storage system 200 receives the write request (S302), it writes the write data in the write-target volume (S303). Subsequently, the write data reception program 404 activates the journal creation program 405 (S304), and waits for a completion report from the journal creation program 405 (S305).

The activated journal creation program 405 checks the write length of the write data (S306), estimates the restoration time (S307), and adds the estimated value to the present RTO (S308).

Further, the journal creation program 405 compares the present RTO and the specified RTO (S309). The journal creation program 405 activates the restoring program 407 when the present RTO exceeds the specified RTO (S310), writes the journals in the base volume 302, and thereafter proceeds to the journal creation processing at step S311 onward.

Contrarily, when the present RTO does not exceed the specified RTO, the journal creation program 405 skips step S310 of activating the restoring program 407, and then proceeds to step S311. Incidentally, the specific processing contents of the restoring program 407 at step S310 will be described later.

Subsequently, the journal creation program 405 reads the write sequence number information 501 from the memory 220 on the one hand, it also updates the write sequence number information 501 so as to increment the write sequence number by 1 in order to prepare the write sequence number for the subsequent journal creation (S311).

The journal creation program 405 thereafter creates a journal based on the write sequence number recognized from the write sequence number information 501 read from the memory 220 at step S311 and the write data, and stores the created journal in the journal volume 303 (S312).

Further, since the utilization of the journal volume 303 will change as a result of the storage of the journal, the journal creation program 405 respectively updates the "volume utilization" and the "overall utilization" of the journal volume information 505 described with reference to FIG. 7 (S313). Subsequently, the journal creation program 405 sends a completion notice to the write data reception program 404 of the call source (S314).

The write data reception program 404 that received the completion report sends a write completion report to the host 100 (S315, S316). The host 100 that received the completion report completes the data write processing in the host 100 (S317, S318).

Incidentally, in the example of the foregoing journal creation processing, although the restoration time is estimated from the data length, the time required for the write processing of write data to the operation volume 301 at step S303 may also be used as the restoration time. Further, the host 100, the management server and the maintenance terminal 270 may register in advance the restoring performance (restoration data size per unit time or number of restorable journals per unit time) of the storage system 200 in the memory 220 as the restoring performance information 401 (FIG. 4) of the storage system 200, and calculate the time required for restoration based on the registered restoring performance information 401, and the total journal amount and total number of journals stored in the journal volume 303. Further, the restoring performance may be set at the stage of developing the program, and the storage system 200 may internally acquire the measured value of the restoring performance.

Incidentally, although the present RTO and the specified RTO were compared during journal creation in the foregoing example, these may also be compared at a timing other than during journal creation. For example, the monitoring program 410 may execute this periodically at step S309 and S310.

Further, the restoring program 407 may be executed when the difference between the present RTO and the specified RTO falls below a certain threshold value. For example, in a case where the value of the specified RTO 503 is 10 minutes and the threshold value is 3 minutes, the restoring program 407 will be activated when the value of the present RTO 502 becomes 7 minutes. As a result of setting a threshold value, it will be easier to guarantee the specified RTO even when writing exceeding the restoring performance of the storage system 200 is temporarily issued from the host 100. The threshold value may be set in advance by the host 100 or the management server or the management terminal 270 in the storage system 200, and, for instance, the storage system 200 may decide the threshold value such as 10% of the specified RTO based on the value (specified RTO) of the specified RTO 503.

The time required for recovering data in the CDP is the sum of the time required for copying the base volume 302 (FIG. 3) to the recovery volume 304 (FIG. 3), and the time required for applying journals to the recovery volume 304. Nevertheless, when the recovery volume 304 is the base volume 302, copy is not required. Further, when applying the first and second replication methods described above, the time required for creating the recovery volume is so short that it can be ignored. Thus, in the example of FIG. 11, the present RTO is calculated only from the time required for applying the journals to the recovery volume 304.

Further, it is also possible to give consideration to the time required for copying the data of the base volume 302 to the recovery volume 304. For example, by calculating the time required for copying the data of the operation volume 301 to the base volume 302, then the present RTO may be added thereto. Moreover, by calculating the time required for copying the data of the operation volume 301 to the base volume 302, then the specified RTO may be subtracted therefrom.

An example of the processing for applying journals to the base volume 302 (hereinafter referred to as the "journal application processing") is now explained with reference to FIG. 12. This journal application processing is performed by the CPU 213 of the storage system 200 executing the restoring program 407 stored in the memory 220.

Here, the restoring program 407 foremost decides the restoration-target journal (S400). However, the restoration-target journal is decided so that the write sequence number is continued from the old journal among the journals stored in the journal volume 303. For example, when there are journals from write sequence numbers 1 to 1000, journals with write sequence numbers 1 to 100 can be set as restoration-target journals. Nevertheless, journals with write sequence numbers 50 to 100 cannot be set as restoration-target journals. Moreover, journals with write sequence numbers 1 to 30 and journals with write sequence numbers 50 to 70 also cannot be set as restoration-target journals. This is because, as described above, it is not possible to obtain correct data unless the journals are applied in ascending order of the write sequence number.

Subsequently, the restoring program 407 substitutes the minimum value among the decided journal write sequence number with the variable i (S401). Incidentally, the variable i shall be temporarily stored in the local memory 214.

The restoring program 407 thereafter refers to the journals in the order of the write sequence number, and checks whether that journal is a restoration-target journal (S402). When the journal is not a restoration-target journal, the restoring program 407 ends the restoration processing (S410).

Contrarily, when the journal is a restoration-target journal, the restoring program 407 decides the application destination base volume 302 of the referenced journal (S403). The CDP group 300 contains a plurality of operation volumes 301, and base volumes 302 corresponding to such operation volumes 301. Thus, the processing at step S403 of deciding which journal should be applied to which base volume 302 becomes necessary. At step S403, the operation volume number is decided from the "volume number" (FIG. 10) in the journal. And by searched for the base volume information 506 with the decided operation volume number as the keyword, it is possible to specify the corresponding base volume 302.

When application destination base volume 302 of the journal is decided, the restoring program 407 applies the journal to that base volume 302 (S404), and replaces the "restored write sequence number" (FIG. 6) stored in the memory 220 as the base volume information 506 (FIG. 5) in the CDP group information 400 with the "write sequence number" of the applied journal (S405). Further, the restoring program 407 subtracts the time required for the journal application from the RTO (S406).

Meanwhile, the restored journal can be deleted from the journal volume 303. Thus, the restoring program 407 updates the "volume utilization" and the "overall utilization" of the journal volume information 505 (S407). Further, since the protection period will be shorted due to the application of the journal, the restoring program 407 sets the time from the journal application to the present time as the new protection period (S408). Thereafter, the restoring program 407 adds 1 to the variable i (S409), and returns to step S402 for processing the subsequent journal.

The processing of the journal creation program 405 and the restoring program 407 described above can be controlled so that present RTO should not exceed specified RTO.

Since the first CDP control method applies journals to the base volume 302, there is a drawback in that the range of the recovery point that can be specified by the user will be small. For example, when the restoring program 407 is executed and journals up to 9:30 AM are applied to the base volume 302, the user will not be able to recover data before 9:30 AM. As a method of avoiding this problem, a subsequent second CDP control method is now explained.

Figures 13A, 13B:
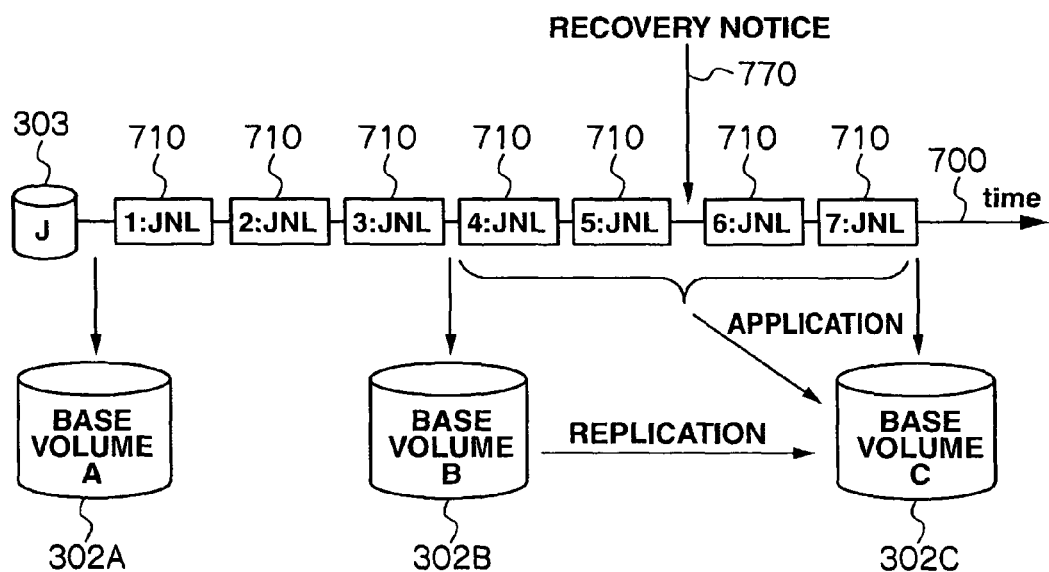
FIG. 13A and FIG. 13B are conceptual diagrams explaining a second CDP control method.

The second CDP control method is now explained with reference to FIG. 13. An arrow 700 in FIG. 13 shows the contents of the journal volume 303 storing the journals in a time series. The respective blocks 710 displayed over the arrow 700 are journals, respectively, and one block 710 corresponds to one journal. The numerical figure indicated in the block 710 shows the write sequence number of the corresponding journal. Further, "JNL" is the abbreviation of journal. In the example shown in FIG. 13, the journal volume 303 stores journals of write sequence numbers "1" to "7."

In the second CDP control method, the problem of the protection period becoming shortened is overcome by using a plurality of base volumes 302 (302A to 302C). A base volume 302A is a base volume at the CDP beginning, and no journal has been applied. A base volume 302B is a base volume where journals up to the write sequence number "3" were applied to the base volume 302A. The base volume 302C is a base volume to which journals up to the write sequence numbers "4" to "7" were applied to the base volume 302B.

In the second CDP control method, based on the specified RTO 503, the journal amount among any two base volumes 302A to 302C is made to be a restorable journal amount. For example, in a case where the storage system 200 receives a recovery notification 770 for recovering data up to immediately after the journal with the write sequence number "5," data is not recovered using the data of the base volume 302A and the journals of write sequence numbers "1" to "5," but rather data is recovered using the base volume 302B and the journals of write sequence numbers "4" and "5." Thereby, data can be recovered while satisfying the specified RTO.

Figure 14:
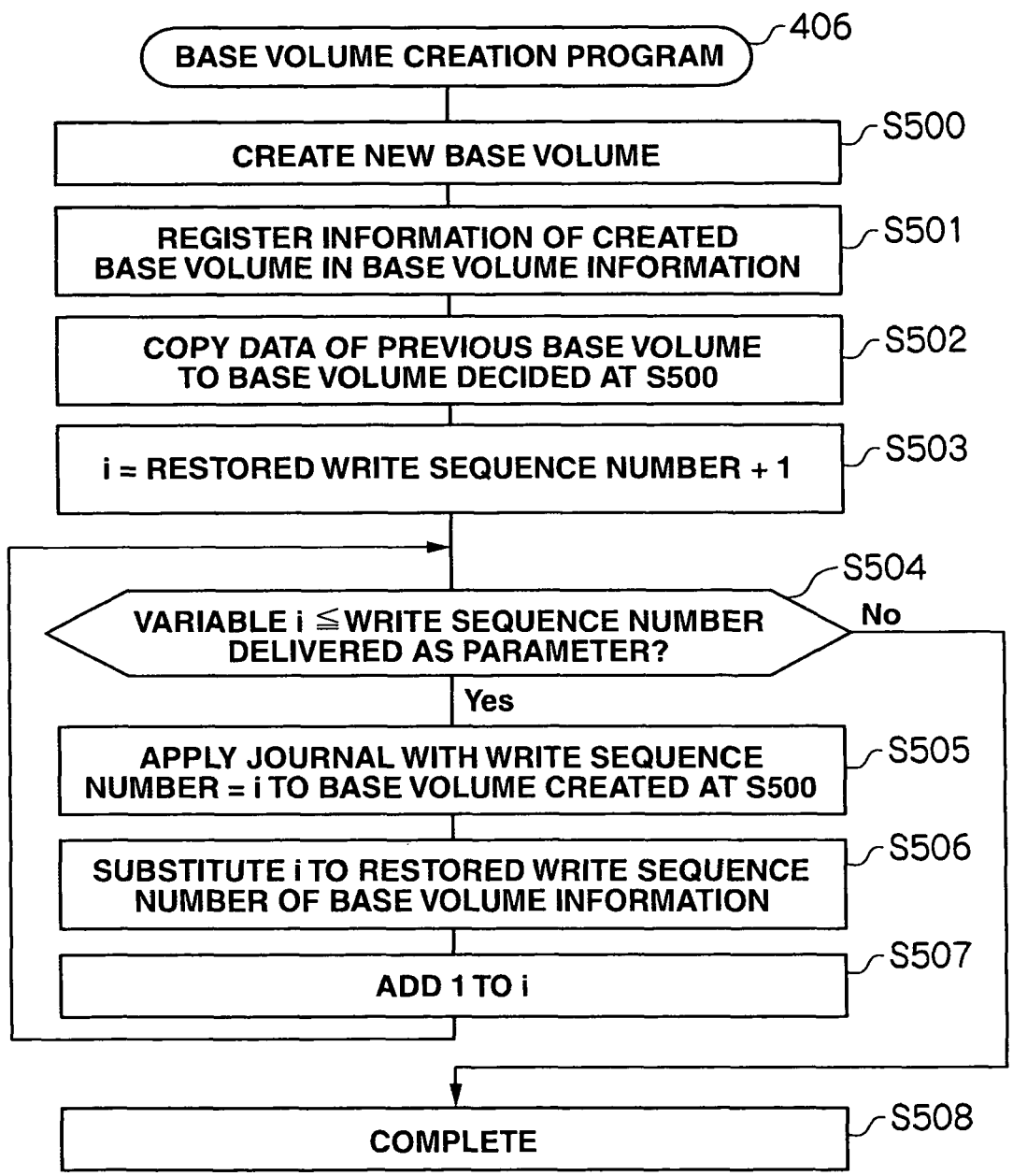
FIG. 14 is a flowchart explaining base volume creation processing.

An example of base volume creation processing for creating the base volume 302 is now explained with reference to FIG. 14. This base volume creation processing is performed by the CPU 213 of the storage system 200 executing the base volume creation program 406 (FIG. 4) stored in the memory 220.

Incidentally, the base volume creation program 406 is activated by the journal creation program 405 or the monitoring program 410 when it is determined that the present RTO exceeds the specified RTO as a result of the journal creation program 405 (FIG. 4) or the monitoring program 408 (FIG. 4) comparing the present RTO and the specified RTO. As described above, the base volume creation program 406 may also be activated when the difference between the present RTO and the specified RTO falls below a threshold value. When the journal creation program 405 or the monitoring program 408 activates the base volume creation program 406, it delivers to the base volume creation program 406 a value (write sequence number) of the write sequence number information 501 as a parameter.

Foremost, when the base volume creation program 406 creates a new base volume 302 (S500), it stores the base volume number, creation time and written write sequence number of the created base volume 302 and the volume number (FIG. 6) of the corresponding operation volume 301 in the memory 220 as the base volume information 506 of the corresponding CDP group information 400 stored in the memory 220 (S501).

Subsequently, the base volume creation program 406 copies data stored in the previous base volume 302 to the new base volume 302 (S502). The base volume creation program 406 thereafter substitutes the value obtained by adding 1 to the restored write sequence number of the previous base volume 302 (restored write sequence number+1) with the variable i (S503), and applies the journal with the delivered write sequence number (value of the write sequence number information 501 at the activation of the base volume creation program 406) from variable i as a write sequence number to the base volume 302 created at step S500.

This processing corresponds to the processing of copying the data of the base volume 302B to the base volume 302C and applying journals with write sequence numbers "4" to "7" upon creating the base volume 302C in the example of FIG. 13, and is executed at step S504 to step S508.

In other words, the base volume creation program 406 compares the variable i and the parameter value (S504), and ends the processing when the variable i is greater than the parameter value (S508). In the example of FIG. 13, when creating the base volume 302C, the base volume creation program 406 ends the processing when the variable i becomes 8. When the variable i becomes greater than the parameter value, the journal of a write sequence number i is applied to the base volume 302 by executing step S505 to step S507.

Subsequently, the base volume creation program 406 applies the journal with a write sequence number of i to the base volume 302 created at step S500 (S505), and substitutes the restored write sequence number (FIG. 6) of the base volume information 506 with the variable i (S506). Further, the base volume creation program 406 adds 1 to the variable i for the processing of the subsequent journal, and thereafter returns to step S504 (S507).

When the base volume creation program 406 completes the processing, the journal creation program 405 and the monitoring program 408 that activated the base volume creation program 406 substitute the present RTO with "0."

As described above, by created a plurality of base volumes 302, it is possible to perform data recovery satisfying the specified RTO without shortening the protection period.

The data recovery processing in a case of controlling the CDP with the second CDP control method is now explained. The data recovery method in a case of using the second CDP control method differs from the old data recovery processing in that processing for deciding which data of which base volume 302 should be used for recovering data is necessary. An example of the processing for selecting the base volume 302 to be used in data recovery is explained below.

Foremost, the host 100 specifies a time and notifies the storage system 200 to perform data recovery (step 1). The storage system 200 specifies journals less than the notified time, and decides the maximum value of the write sequence number of the specified journals (step 2).

Subsequently, the storage system 200 refers to the base volume information 506, and searches for a base volume 302 in which the restored write sequence number (FIG. 6) is smaller than the write sequence number decided at step 2 (step 3). When there are a plurality of base volumes 302, a base volume 302 with the maximum restored write sequence number is selected (step 4). In the example of FIG. 13, when the storage system 200 receives the recovery notification 770 from the host 100, it is possible to specify the base volume 302B by executing the processing of step 1 to step 4 described above.

Thereafter, data is recovered using the data of the base volume 302 decided at step 4 and the journals from the base volume 302 onward.

Explained above was a method of the user specifying the RTO (setting the specified RTO) in advance, and the storage system 200 controlling the CDP so as to guarantee the specified RTO.

Below, cases are explained where the user specifies, in addition to the RTO, the capacity (sum of capacity of the base volume 302 and capacity of the journal volume 303) to be used in the CDP and the protection period in advance, and the storage system 200 (1) controls the CDP so as to guarantee both the RTO and the capacity to be used in the CDP, (2) controls the CDP so as to guarantee both the capacity to be used in the CDP and the protection period, and (3) controls the CDP so as to guarantee both the RTO and the protection period.

Figure 15:
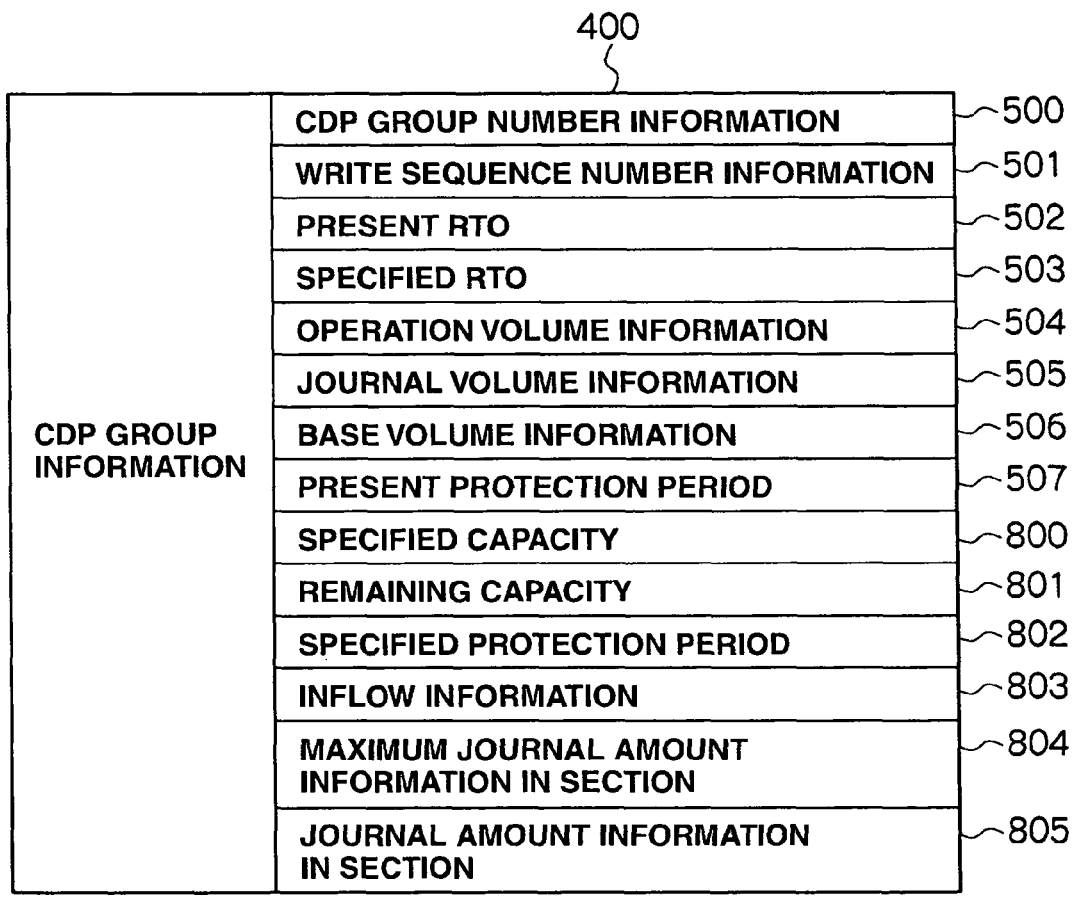
FIG. 15 is a conceptual diagram showing another example of CDP group information.

Foremost, in order to realize the foregoing control, new control information must be provided to the CDP group information 400. An example of the necessary control information is shown in FIG. 15. FIG. 15 shows a case where, in addition to the control information configuring the CDP group information 400 shown in FIG. 5, the control information of specified capacity information 800, remaining capacity 801, specified protection period 802, inflow information 803, maximum journal amount information in section 804, and journal amount information in section 805 is added.

The specified capacity information 800 is information representing the capacity allocated by the user as the capacity to be used in the CDP (hereinafter referred to as the "specified capacity"). The storage system 200 controls the CDP so that it does not exceed the specified capacity. The remaining capacity 801 is information represents a value obtained by subtracting the capacity used in the CDP from the specified capacity (hereinafter referred to as the "remaining capacity"). The specified protection period 802 is information representing the length of the protection period sought by the user (hereinafter referred to as the "specified protection period"). The inflow information 803, the maximum journal amount information in section 804 and the journal amount information in section 805 is information required for guaranteeing the specified protection period and the specified capacity, and the details thereof will be explained later.

The CDP control method of guaranteeing both the RTO and the capacity (specified capacity) to be used in the CDP is now explained. In this embodiment, the first and second CDP control methods have been explained above as CDP control methods for guaranteeing the RTO. In order to guarantee both the RTO and the specified capacity, this can be realized in the CDP control method that guarantees the RTO by creating the journal volume 303 and the base volume 302 while considering the remaining capacity. Specifically, when the remaining capacity becomes negative upon creating the journal volume 303 or the base volume 302, capacity is allocated by deleting the old base volume 302 and the old journal volume 303. Further, processing will also be required if the user changes the setting value of the specified capacity.

Figure 16:
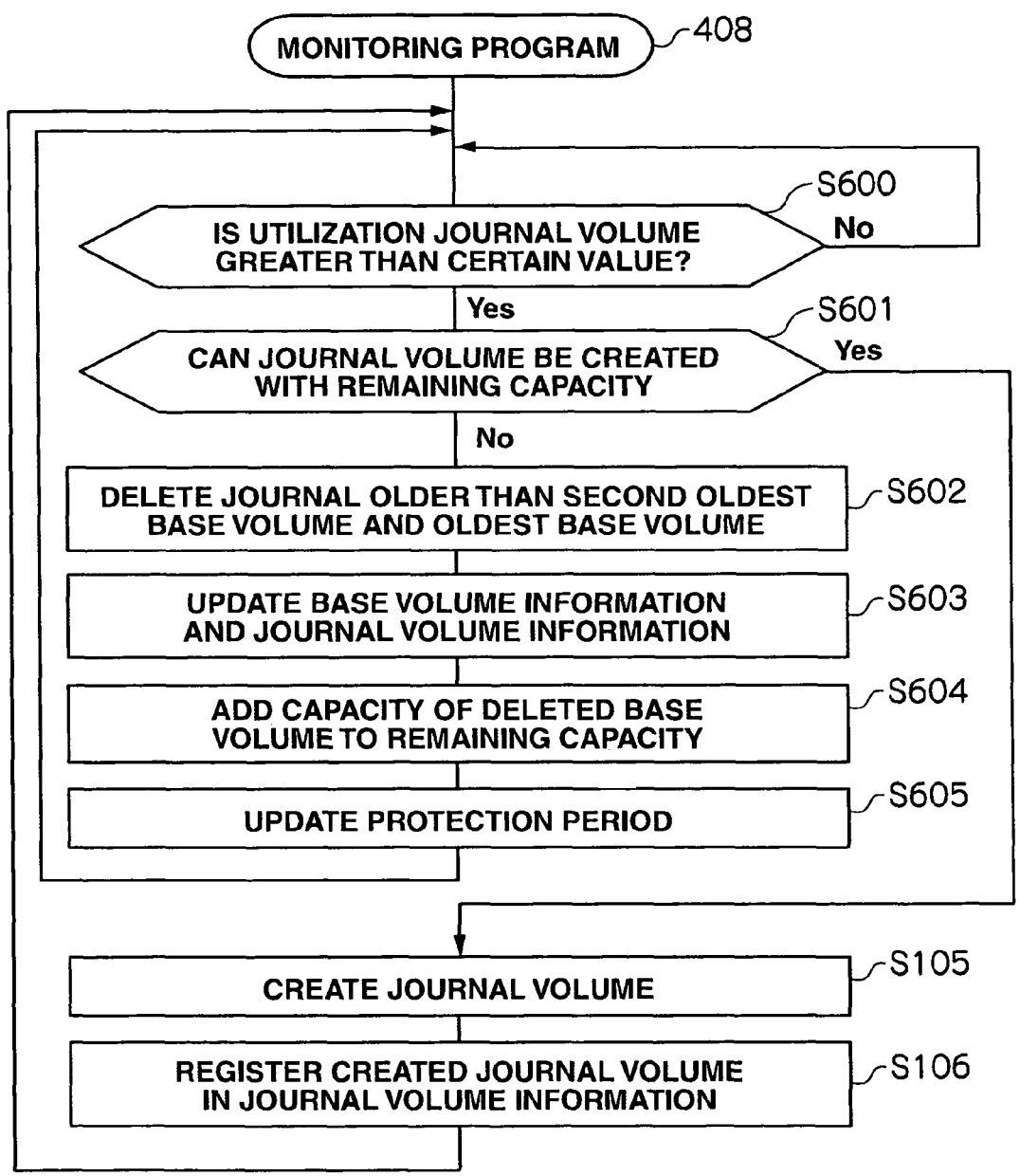
FIG. 16 is a flowchart explaining journal amount additional registration processing.

An example of processing for additionally registering a journal volume 303 based on the remaining capacity 801 when the monitoring program 408 detects insufficiency in the journal capacity is now explained with reference to FIG. 16 (hereinafter referred to as the "journal amount additional registration processing"). This journal amount additional registration processing is performed by the CPU 213 of the storage system 200 executing the monitoring program 408 stored in the memory 220. Incidentally, FIG. 16 shows the processing when the CDP control method that guarantees the RTO is a second CDP control method.

The monitoring program 408 refers to the journal volume information 505, and checks whether the overall utilization becomes greater than a certain value (S600). When the utilization of the journal volume 303 falls below a certain value, the monitoring program 408 returns to the top of the program. When the utilization of the journal volume 303 becomes greater than a certain value and it becomes necessary to additionally register a new journal volume 303, the monitoring program 408 refers to the remaining capacity 801 and checks whether a journal volume 303 can be created with the remaining capacity (S601). When a journal volume 303 can be created with the remaining capacity, the monitoring program 408 creates the journal volume 303 at step S105 and step S106, and returns to the top of the program. Incidentally, step S105 and step S106 are the same as step S105 and step S106 of the CDP beginning program 402 shown in FIG. 8.

Meanwhile, the monitoring program 408 executes step S602 to step S606 when it is not possible to create a journal volume 303 with the remaining capacity and, by deleting the old base volume 302 and old journals, secures the capacity required for creating the journal volume 303.

In other words, the monitoring program 408 refers to the base volume information 506, and deletes a journal that is older than the second oldest base volume 302, and the oldest base volume 302 (S602). Subsequently, the monitoring program 408 deletes the information of the deleted base volumes 302 from the base volume information 506, and re-calculates the overall utilization (FIG. 7) of the journal volume information 505 (S603). Since the remaining capacity will increase as a result of deleting the base volume 302, the monitoring program 410 adds the capacity of the deleted base volume 302 to the remaining capacity (S604). The monitoring program 408 thereafter updates the protection period, and returns to the top of the program (S605).

When the CDP control method that guarantees the RTO is the first CDP control method, this can be realized by executing the processing of the restoring program 407 at step S602 to step S604. Incidentally, although a case was explained where the monitoring program 408 detects insufficiency in the journal capacity and executes the deletion processing of the base volume 302 and the journal, similar processing may also be executed by the journal creation program 405 detecting insufficiency in the journal capacity during journal creation.

Figure 17:
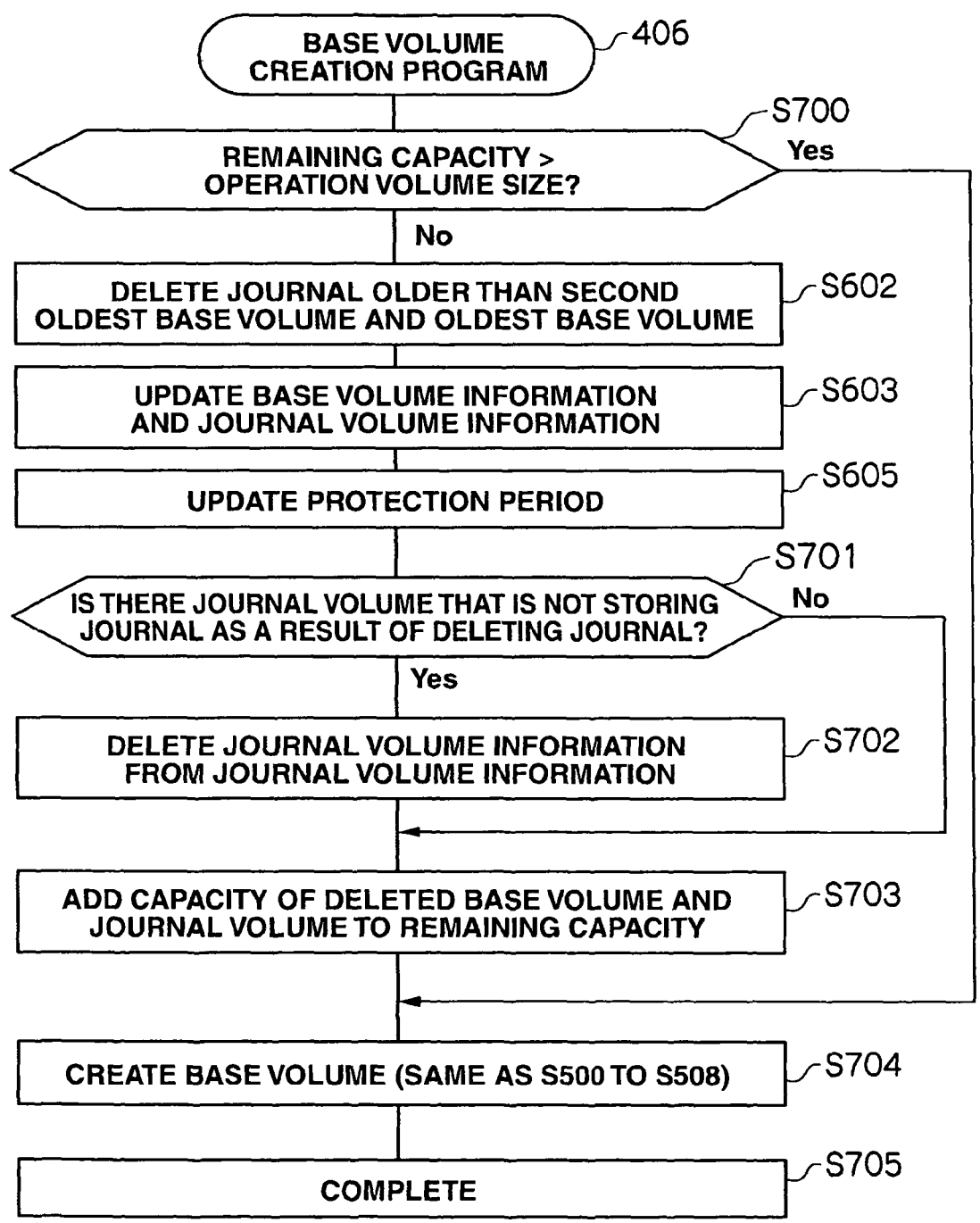
FIG. 17 is a flowchart explaining another example of base volume creation processing.

An example of the base volume creation processing creating the base volume 302 by considering the remaining capacity based on the remaining capacity 801 when the base volume creation program 406 creates a base volume 302, remaining capacity 801 is now explained with reference to FIG. 17. This base volume creation processing is performed by the CPU 213 of the storage system 200 executing the base volume creation program 406 stored in the memory 220. Incidentally, the base volume creation program 406 is activated by the journal creation program 405 or the monitoring program 410 when the present RTO exceeds the specified RTO.

The base volume creation program 406 refers to the corresponding CDP group information 400, and compares the remaining capacity and the size of the operation volume 301 (S700). When the remaining capacity is greater than the size of the operation volume 301, the base volume 302 is created since the operation volume 301 can be created (S704), and the processing is thereby ended (S705). Incidentally, the processing contents of the creation processing of the base volume 302 at step S704 are the same as step S500 to step S508 shown in FIG. 14.

When the size of the operation volume 301 is greater than the remaining capacity, the capacity for creating the base volume 302 is secured by deleting the base volume 302 and journals (S602, S603, S605). Incidentally, the deletion processing at step S602, step S603 and step S605 is the same as the deletion processing during the additional registration of the journal volume 303.

Subsequently, the base volume creation program 406 checks whether there is a journal volume 303 that does not store any journal as a result of the deletion of journals based on the journal volume information 505 in the corresponding CDP group information 400 (S701). A journal volume 303 that does not store any journal is a journal volume 303 in which the volume utilization (FIG. 7) is 0%.

When there is a journal volume 303 in which the volume utilization is 0%, the base volume creation program 406 deletes that journal volume 303 from the CDP group 300 (S702). Subsequently, the base volume creation program 406 adds the capacity of the deleted journal volume 303 and base volume 302 to the remaining capacity (S703). The base volume creation program 406 thereafter creates the base volume 302 and ends the processing (S704, S705).

Incidentally, it is not always necessary to delete the journal volume 303 in which the volume utilization is 0%. Further, the processing for deleting the journal volume 303 in which the volume utilization is 0% can also be realized with the journal deletion processing to the performed when additionally registering the journal volume 303.

In this embodiment, the journal volume 303 and the base volume 302 are created at the CDP beginning. With CDP, at least one journal volume 303 and a base volume 302 corresponding to each operation volume 301 is required. The CDP beginning program 402 refers to the remaining capacity 801 upon creating the journal volume 303 and the base volume 302 and checks the remaining capacity. When it is not possible to create even one journal volume 303, and it is not possible to create even one base volume 302 corresponding to each operation volume 301, a notice indicating that CDP beginning is impossible is sent to the host 100.

The flow of processing in a case where the user changes the setting of the specified capacity information 800 is now explained. When the storage system 200 receives a change notification of the specified capacity information 800 from the user (step 1), the storage system 200 refers to the remaining capacity 801 and the specified capacity information 800, and calculates the value obtained by subtracting the difference of the specified capacity before and after the setting change from the remaining capacity (remaining capacity—(pre-change specified capacity—post-change specified capacity)) (step 2). For example, let it be assumed that the pre-change specified capacity 800 is 100 GB, the post-change specified capacity is 70 GB, and the remaining capacity is 10 GB. The value sought in this case, as shown in the following formula, will be −20 GB.

$$10GB - (100GB - 70GB) = -20GB \qquad (1)$$

This calculation result shows the remaining capacity after the setting change of the specified capacity, and, when the remaining capacity is negative, this implies that the specified capacity is being exceeded.

When the remaining capacity after the setting change of the specified capacity is negative, the remaining capacity is secured by deleting the base volume 302 and journals (step 3). Specifically, the processing at step S602 to step S605 is repeated until the remaining capacity becomes positive.

Accordingly, it is possible to control the CDP while satisfying the specified RTO and the specified capacity. This CDP control method is effective when the user gives priority to the RTO and the storage capacity. When the user does not set the protection period or when the user notifies the storage system 200 that it will give priority to the RTO and the storage capacity rather than the protection period, the storage system 200 may also automatically execute this control method.

A CDP control method that guarantees both the capacity (specified capacity) to be used in the CDP and the protection period (specified protection period), and also keeping the RTO to a minimum is now explained. In order to guarantee the specified protection period, a journal volume 303 with a capacity capable of storing all journals in the specified protection period is required. The total journal capacity in the specified protection period can be calculated as the product of the inflow per unit time and the specified protection period. The inflow may be stored in the memory 220 of the storage system 200 in advance from the host 100, the management server (not shown), and the management terminal 270 (FIG. 2). Further, the storage system 200 may take statistics of the inflow, and store this in the memory 220.

When the capacity of the journal volume 303 is decided, the total capacity of all base volumes 302 will be "(specified capacity)−(capacity of journal volume 303)" or less.

In this embodiment, the number of base volumes 302 that can be created from the total capacity of the base volume 302 is decided, and the creation of the base volumes 302 is controlled so that the journal amount among the base volumes 302 will become equal. Thereby, it is possible to avoid the RTO become varied based on the specified recovery point.

Figure 18:
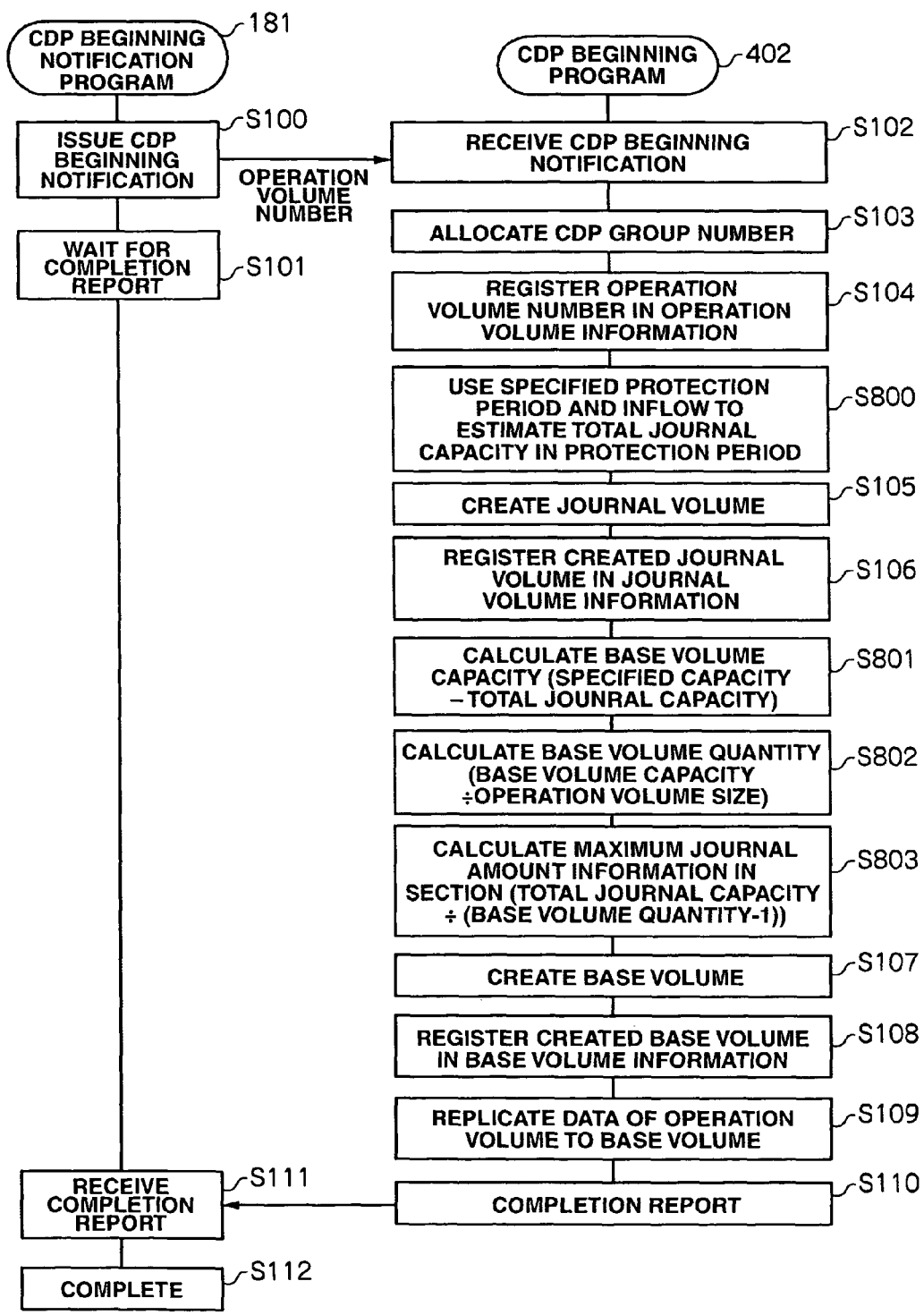
FIG. 18 is a flowchart explaining journal amount decision processing.

An example of processing for the CDP beginning program 402 to decide the size of the journal volume 303 and the size of the base volume 302 and decide the journal amount among the base volumes 302 based on the specified capacity, specified protection period and inflow is now explained with reference to FIG. 18 (hereinafter referred to as the "journal amount decision processing").

When the CDP beginning program 402 receives a CDP beginning notification and the operation volume number of the corresponding operation volume 301 from the CDP beginning notification program 181, it allocates the CDP group number 500 to the target CDP group 300, and registers the operation volume information 504. This processing is the same as step S102 to step S104 of FIG. 8.

Subsequently, the CDP beginning program 402 estimates the total journal amount in the specified protection period based on the inflow information 803 and the specified protection period 802 of the corresponding CDP group information 400 (S800). For example, if the specified protection period is 30 days, and the inflow is 1 GB/hour, 30 days×24 hours×1 GB=720 GB.

The CDP beginning program 402 creates the journal volume 303 capable of storing journals estimated at step S800, and stores the journal amount information of the journal volume 303 in the memory 220 as the journal volume information 505 of the CDP group information 400 (S105, S106). Incidentally, the processing may be such that the total capacity of a plurality of journal volumes 303 becomes the capacity estimated at step S800.

Subsequently, the CDP beginning program 402 refers to the specified capacity information 800 of the CDP group information 400, and calculates the capacity that can be used for the base volume 302 in order to guarantee the specified capacity (specified capacity−total journal amount) (S801). Further, the CDP beginning program 402 decides the number of base volumes that can be created with the calculated capacity (base volume capacity÷operation volume size) (S802).

When the CDP beginning program 402 decides the number of base volumes, it calculates the journal amount among the base volumes 302 (hereinafter referred to as the "section") in order to make the journal amount among the base volumes 302 equal (total journal amount÷(number of base volumes−1)) (S803). Further, the CDP beginning program 402 stores this calculation result in the memory 220 as the maximum journal amount information in section 804 of the CDP group information 400. Thereafter, the CDP beginning program 402 creates the base volume 302 as with the processing of FIG. 8, and then ends this journal amount decision processing (S107 to S112).

The maximum journal amount in section 804 (maximum journal amount among the base volumes 302) is decided based on the foregoing journal amount decision processing. Thus, when the journal amount among the base volumes 302 exceeds the maximum journal amount in section 804, if the new base volume 302 is created, it is possible to guarantee both the specified protection period and the specified capacity, and keep the RTO to a minimum.

The processing for creating the base volume 302 so that it will not exceed the maximum journal amount in section 804 can be realized by changing the journal creation program 405 shown in FIG. 11. Specifically, the journal creation program 405 does not calculate the RTO at step S307 and step S308 of FIG. 11, and will add the journal size to the journal amount in section 805. At step S309, instead of comparing the present RTO and the specified RTO, the journal amount in section 805 and the maximum journal amount in section 804 are compared.

When the journal amount in section 805 exceeds the maximum journal amount in section 804, the base volume creation program 406 (FIG. 4) is activated at step 310 to create a new base volume 302. After creating the base volume 302 (immediately before step 311), the journal amount information in section 805 initialized to "0." The processing contents of the base volume creation program 406 are the same as the processing contents shown in FIG. 14.

Incidentally, although the present journal amount in section 805 and the maximum journal amount in section 804 are compared when the journal is created, such comparison may be conducted at a different timing. For instance, the monitoring program 410 may periodically execute step S309 and step S310.

Based on the foregoing processing, it is possible to control the CDP while satisfying the specified capacity and the specified protection period. This CDP control method is effective when the user gives priority to the storage capacity and the protection period. When the user does not set the RTO or when the user notifies the storage system 200 that it will give priority to the storage capacity and the specified protection period rather than the RTO, the storage system 200 may also automatically execute this control method.

A CDP control method that guarantees both the RTO and the specified protection period is now explained. In this embodiment, a CDP control method that guarantees the RTO has been explained. In order to guarantee both the RTO and the specified protection period, this can be guaranteed by deleting the base volume 302 and journals while considering the specified protection period in the control method that guarantees the RTO.

Specifically, when the present protection period (value of the present protection period 507) falls below the specified protection period (value of the specified protection period 802) when the base volumes 302 or journals are deleted, deletion is suppressed. The reason the base volume 302 and journals are deleted is because the areas for creating the base volume 302 and journals are insufficient. Thus, by merely suppressing the deletion, writing from the host 100 will fill up the journal volume 303. In order to avoid this kind of circumstance, in this embodiment, the storage system 200 notifies the host 100 that areas for the CDP are insufficient, and executes processing for temporarily restricting the data writing of the host 100.

Figure 19:
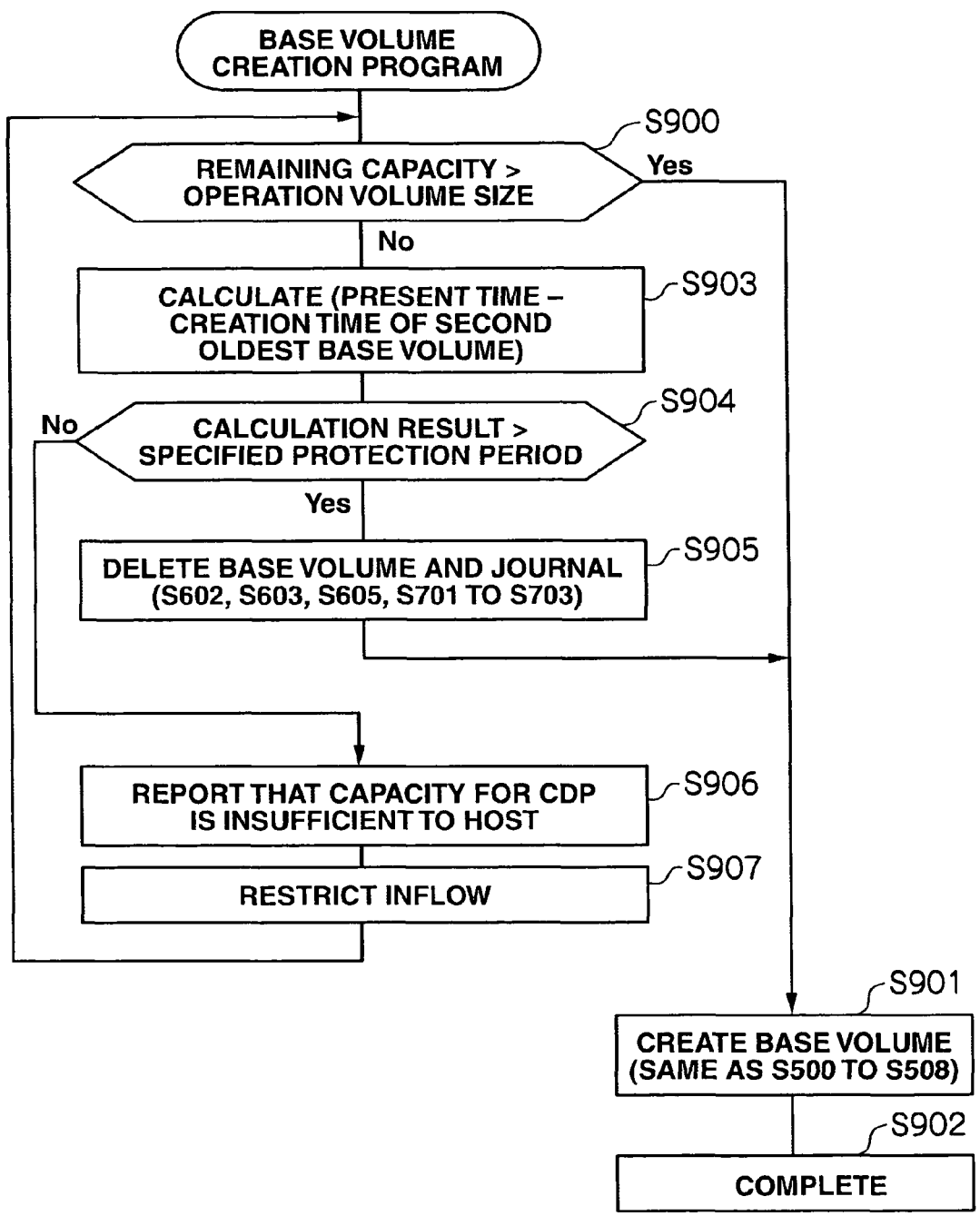
FIG. 19 is a flowchart explaining another example of base volume creation processing.

An example of base volume creation processing of calculating a protection period when the base volume creation program 406 creates a base volume 302 and deletes the old base volume 302, notifying the host 100 of insufficient capacity when the specified protection period cannot be satisfied, and temporarily restricting the writing of the host 100 is now explained with reference to FIG. 19. This base volume creation processing is performed by the CPU 213 of the storage system 200 executing the base volume creation program 406 stored in the memory 220. Incidentally, the same processing can be performed when the area of the journal volume 303 is insufficient, and additionally registering the journal volume 303.

Foremost, the base volume creation program 406 refers to the corresponding CDP group information 400, and compares the remaining capacity and the size of the operation volume 301 (S900). When the remaining capacity is larger than the size of the operation volume 301, the base volume creation program 406 creates the base volume 302 since it is possible to create the operation volume 301 (S901), and ends the processing (S902). Incidentally, the base volume creation processing at S901 is the same as the processing at step S500 to step S508 of FIG. 14.

When the size of the operation volume 301 is greater than the remaining capacity, in the processing explained with reference to FIG. 17, the capacity was secured by deleting the base volume 302 and the journal.

In order to guarantee the specified protection period, even if the base volume 302 and journals volume 303 are deleted, the present protection period needs to be greater than the specified protection period. Thus, the base volume creation program 406 calculates the protection period in a case when the base volume 302 and journals are deleted (present time–time of second oldest base volume 302) (S903).

The base volume creation program 406 compares the calculation result and the specified protection period (S904), and, when the calculation result is greater than the specified protection period, deletes the base volume 302 and journals volume 303 (S905). Since a new base volume 302 can be created by deleting the base volume 302 and the journal, the base volume creation program 406 creates the base volume 302 (S901), and ends the processing (S902). Incidentally, the deletion processing of the base volume 302 and journals is the same as the processing at step S602, step S603, step S605 and step S701 to step S703 of FIG. 17.

When the calculation result at step S903 is smaller than the specified protection period, the base volume 302 and journals cannot be deleted. Thus, the base volume creation program 406 notifies the host 100 that the capacity for the CDP is insufficient (S906), and temporarily restricts the data writing of the host 100. Here, as the method of "temporarily restricting the data writing of the host 100," a method may be considered where, when a write request is sent from the host 100, a response indicating that processing is disabled due to an error or busy to the host 100. In addition, a method of the storage system 200 ignoring the write request from the host 100 can also be considered. Further, the write request of the host 100 can be restricted with other methods.

After restricting the data writing of the host 100, the base volume creation program 406 returns to the top of the program. When the specified capacity is changed by the host 100, the management server or the management terminal 270 and it becomes possible to create the base volume 302, step S901 and step S902 are executed. Further, as the present time progresses, as a result of step S903, it may become possible to delete the base volume 302 and the journal. Incidentally, the processing for cancelling the restriction of data writing of the host 100 may performed at a timing when the specified capacity is re-set or immediately before step S901 (not shown).

As a result of the foregoing processing, it is possible to control the CDP while satisfying the RTO and the specified protection period. This CDP control method is effective when the user gives priority to the RTO and the protection period. When the user does not set the specified capacity or when the user notifies the storage system 200 that it will give priority to the RTO and the specified protection period rather than the specified capacity, the storage system 200 may also automatically execute this control method.

(2) Second Embodiment

In this embodiment, a CDP control method of eliminating redundancy among journals to reduce the RTO and reduce the journal amount is now explained.

With the CDP function, it is possible to recover data of an arbitrary time (arbitrary point) in the past specified by the user. Nevertheless, with certain software, even when data during the execution of the operation processing is recovered, there are cases when the operation processing cannot be continued with the recovered data. Thus, with CDP, the point information of the point in which the software operating in the host 100 enters a resting status is notified to the storage system 200 in advance. Then, by the storage system 200 storing this point as the recovery point, it will be possible to recover the data at such recovery point.

With the CDP function, there is a usage method of specifying the time and recovering the latest data during an operation error or HDD failure. Nevertheless, when recovering past old data, it is considered that the data of the recovery point is often recovered. If data of the recovery point is only recovered, all journals among the recovery points are not always necessary. Specifically, when data writing is conducted several times from the host 100 to the same address, the last written data will suffice.

Thus, in the foregoing case, redundant journals among the recovery points may be eliminated, and, by eliminating the redundant journals, it is possible to reduce the time required for the data recovery. Incidentally, in the ensuing explanation, since the latest data will be recovered during an operation error or HDD failure, a method of eliminating redundancy of data that is older than a certain time will be explained.

In order to explain the method of eliminating a redundant journal (hereinafter referred to as the "redundancy elimination of journals or journal redundancy elimination"), the recovery point for specifying journals to be subject to redundancy elimination is explained. With respect to this recovery point, journals before the recovery point and journals after the recovery point must be differentiated.

In this embodiment, journals before the creation of the recovery point are differentiated from journals after the creation of the recovery point by creating a special journal having a write sequence number between the journals before the creation of the recovery point and the journals after the creation of the recovery point. An example of the journal format for realizing this is shown in FIG. 20. The point that the "type" information is added to the journal format shown in FIG. 10 is different from the first embodiment. "Type" is information for differentiating normal journals from recovery points. In this embodiment, when the "type" is a "normal journal," this is a journal corresponding to the write data, and, when the "type" is a "recovery point," this is a special journal showing the recovery point.

Further, in order to facilitate the search of the recovery point information, for instance, the recovery point management table 950 shown in FIG. 21 may be stored in the control information area 221 (FIG. 2) of the storage system 200. In FIG. 21, "recovery point number" is an identification number for identifying the recovery point. Further, "write sequence number" is a write sequence number of the special journal showing the recovery point. Moreover, "CDP group number" is the CDP group number of the CDP group 300 associated with the recovery point (same as the CDP group number information 500 of FIG. 5 and FIG. 15).

Incidentally, in this embodiment, although a special journal with a write sequence number and the recovery point management table 950 were newly introduced, since the recovery point management table 950 is index information. Further, there is a method for realizing the above without creating the special journal showing the recovery point. For example, this can be realized by storing information of "recovery point exists between journal with write sequence number of '100' and journal with write sequence number of '101'" in the recovery point management table 950.

Subsequently, "journal redundancy elimination" is explained with reference to FIG. 22. FIG. 22 shows four patterns (pattern 1 to pattern 4) as the relationship of the write data contained in the journals to be subject to redundancy elimination.

In FIG. 22, "range of operation volume" conceptually represents the storage area of the operation volume 301. The left end is address 0 and top of the volume. The right end is address n and end of the volume n will differ depending on the size of volume. Further, in FIG. 22, the data 1001 in the area 1000 of the operation volume 301 shows the data written in the operation volume 301.

Moreover, with respect to the data written before the operation volume 301 (hereinafter referred to as the "precedent write data") 1002 and the data written subsequently (hereinafter referred to as the "subsequent write data") 1003, in FIG. 22 shows the relationship of the precedent write data 1002 and subsequent write data 1003, and the write range of the area 1000 of the operation volume 301.

Pattern 1 is a case when the write range of the subsequent write data 1003 is contained in the write range of the precedent write data 1002. For example, if the time the recovery point 780 was created is newer than the time the precedent write data 1002 was written and the time the subsequent write data 1003 was written, the recovery processing only needs to be performed for portions in which the precedent write data 1002 and the subsequent write data 1003 were not overwritten, and the subsequent write data 1003. Accordingly, when the subsequent write data 1003 is overwritten on the precedent write data 1002, journals can be deleted regarding portions in which the subsequent write data 1003 was overwritten among the precedent write data 1002.

Pattern 2 is a case where the write ranges of the subsequent write data 1003 and the precedent write data 1002 are partially overlapping. In this case also, journals for the data of the overlapping range can be deleted as with pattern 1.

Pattern 3 is a case where the write range of the precedent write data 1002 is contained in the write range of the subsequent write data 1003. For example, when the time that the recovery point was created is newer than the time that the precedent write data 1002 was written and the time that the subsequent write data 1003 was written, only the subsequent write data 1003 is required for the recovery processing. By destroying the precedent write data 1002, journals of the precedent write data 1002 can be deleted.

Pattern 4 is a case when the write range of the precedent write data 1002 and the write range of the subsequent write data 1003 are the same. As with pattern 3, by destroying the precedent write data 1002, journals of the precedent write data 1002 can be deleted.

Subsequently, a processing method of searching for a range surrounded by two recovery points (hereinafter referred to as the "recovery point section") that has not been subject to journal redundancy elimination, and eliminating the redundancy of journals in the recovery point section is explained. As information for searching sections that have not been subject to journal redundancy elimination, the storage system 200 retains the recovery point section information 960 as shown in FIG. 23 in the control information area 221 (FIG. 2) of the memory 220.

In FIG. 23, "section number" is an identification number for identifying the recovery point section. Further, "start recovery point" and "end recovery point" are identification numbers of the recovery point showing the start location and end location of the recovery point section, respectively, and "redundancy eliminated flag" is information showing whether the journal redundancy elimination has been implemented to the recovery point section identified by the section number.

An example of processing for searching the recover point section that has not been subject to the journal redundancy elimination, and eliminating the redundancy of journals in the recovery point section is now explained with reference to FIG. 24 and FIG. 25. This journal redundancy elimination processing is performed by the CPU 213 of the storage system 200 executing the section decision program (not shown) and the redundancy elimination program (not shown) stored in the program area 222 (FIG. 2) of the memory 220.

In the journal redundancy elimination processing, the section decision program foremost refers to the redundancy eliminated flag of the recovery point section information 960, and searches for a recovery point section that has not yet been subject to journal redundancy elimination (S1000). Incidentally, although not shown, when there is no redundancy eliminated recovery point section, the journal redundancy elimination processing shall be ended. Further, when a plurality of recovery point sections are detected at step S1000, the routine may proceed to step S1001 targeting the oldest recovery point section, or proceed to step S1001 targeting the initially discovered recovery point section. Further, the routine may also end step S1000 immediately after discovering the recovery point section, and then proceed to step S1001.

When there is a recovery point section that has not yet been subject to journal redundancy elimination, the section decision program refers to the recovery point section information 960 (FIG. 23), and substitutes the variable j with a value obtained by subtracting 1 from the write sequence number of the recovery point identified with the end recovery point number (FIG. 23) (S1001). Accordingly, the variable j will be substituted with the write sequence number of the final journal in the target section of the journal redundancy elimination. Incidentally, the variable j is temporarily stored in the local memory 214.

Subsequently, the section decision program determines whether the variable j became a value obtained by adding 1 to the write sequence number of the recovery point identified with the start recovery point number (FIG. 23) (=write sequence number of the first journal of the target section) (S1002), and, upon obtaining a positive result, ends this journal redundancy elimination processing since it determines that the target recovery point section is a section that has been subject to journal redundancy eliminated (S1005, S1006).

Contrarily, when the section decision program obtains a negative result in the determination at step S1002, the redundancy elimination program checks the relationship of the journal of the variable j and the journal in the section in which the write sequence number is less than the variable j while decrementing the variable j one by one, and performs the journal redundancy elimination as necessary (S1003, S1004). Incidentally, the variable j shall be delivered as a parameter to the redundancy elimination program.

For example, when j=100, the redundancy elimination program checks the relationship of the journal with the write sequence number of 100 and the journals with the write sequence number that is smaller than 100, and eliminates the redundant journals. Thereafter, the section decision program subtracts 1 from the variable j. As a result, this will become j=99, and the redundancy elimination program checks the relationship of the journal with the write sequence number of 99 and the journals with the write sequence number that is smaller than 99, and eliminates the redundant journals. When the variable j is 99, the reasons no comparison is mad with the journal with the write sequence number is 100 is because such comparison has already been made when the value of the variable j was 100. The journal redundancy elimination is realized by repeating this processing up to the first journal in the section.

Figure 25:
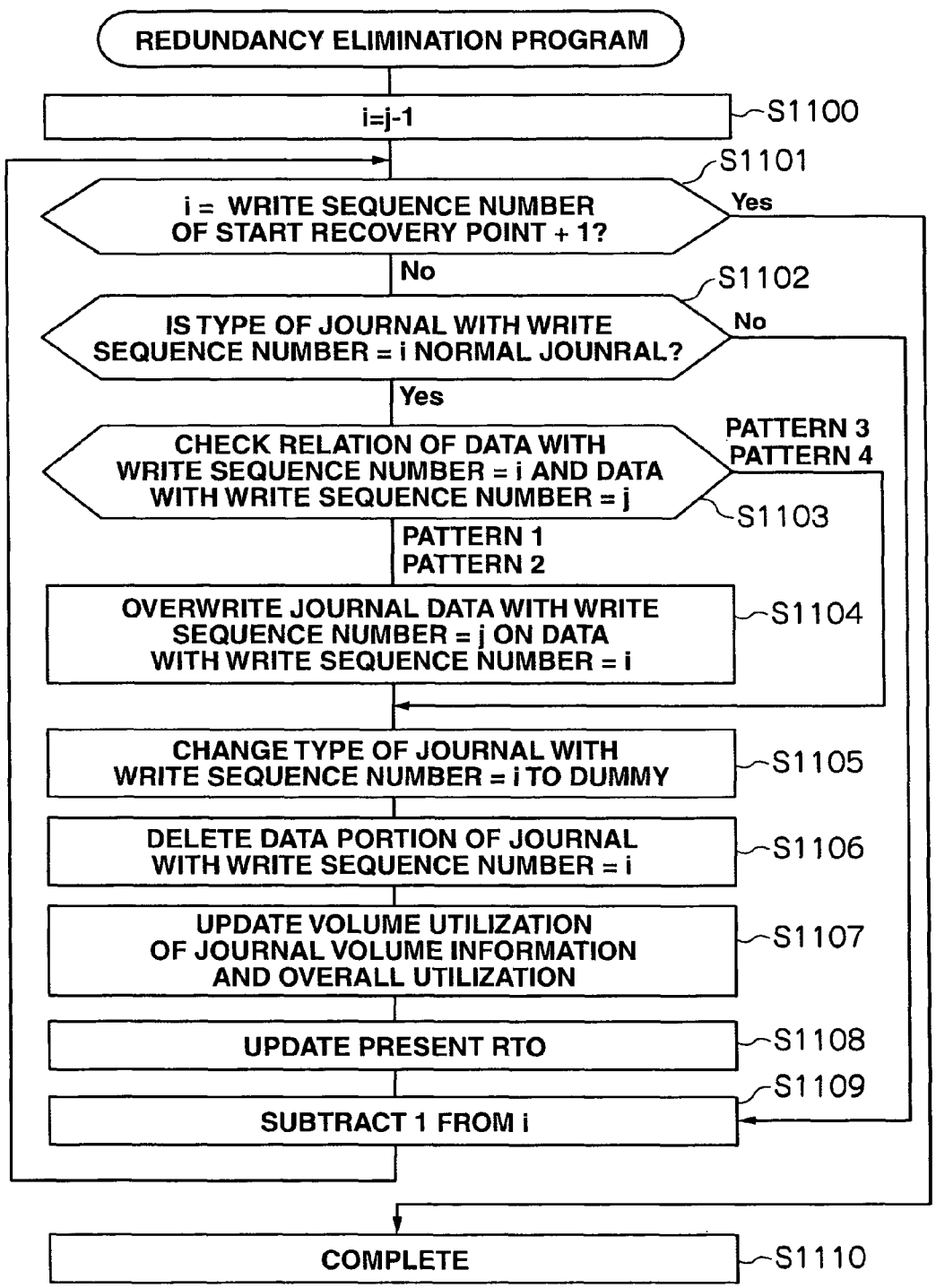
FIG. 25 is a flowchart explaining journal redundancy elimination processing according to another embodiment of the present invention.

FIG. 25 shows the specific processing contents of the redundancy elimination program activated at step S1003 of the journal redundancy elimination processing.

After the redundancy elimination program is activated, it substitutes the value obtained by subtracting 1 from the variable j delivered as the parameter with the variable i (S1100). Incidentally, the variable i shall be temporarily stored in the local memory 214. Subsequently, the redundancy elimination program compares the variable i and the value obtained by adding 1 to the write sequence number of the recovery point 780 identified with the start recovery point (S1101), and ends the processing if the compared two values are the same (S1110). With this processing, it is possible to check the redundancy relation of the journal having the write sequence number that is the same as the variable j, and all journals having a write sequence number of values less than the variable j in the recovery point section.

Meanwhile, while the variable i is greater than the value obtained by adding 1 to the write sequence number of the recovery point 780 identified with the start recovery point, the redundancy elimination program executes step S1102 to S1109, and checks the relationship among the journals and executes journal redundancy elimination.

Specifically, the redundancy elimination program foremost checks whether the type of journal of the variable i is a "normal journal" (S1102). When the type of journal is other than a "normal journal," that journal is a special journal such as a recovery point, and will not be subject to redundancy elimination. Accordingly, in this case, the redundancy elimination program proceeds to step S1109.

Contrarily, when the type of journal is a "normal journal," that journal is not a special journal, and could be a target of redundancy elimination. Thus, in this case, the redundancy elimination program foremost checks the relationship of the data range of the journal with a write sequence number that is the same as the value of the variable i, and the journal with a write sequence number that is the same as the value of the variable j. Specifically, whether the relationship of these two journals corresponds to any one of the patterns 1 to 4 described above is determined.

The redundancy elimination program proceeds to step S1104 when the relationship of the two journals corresponds to pattern 1 or pattern 2, and skips S1104 and proceeds to step S1105 when the relationship of the two journals corresponds to pattern 3 or pattern 4.

Further, when the relationship of the two journals corresponds to pattern 1 or pattern 2, the redundancy elimination program overwrites the data of the journal with a write sequence number that is the same as the value of the variable j on the data of the journal with a write sequence number that is the same as the value of the variable i (S1104). Then, by updating the data length, data portion start address and data portion end address of the write sequence number that is the same value as the variable j, the post-overwriting data is incorporated into the journal given the write sequence number that is the same as the value of the variable j.

In the foregoing case, for instance, when precedent and subsequent journals of a journal are continuously written before and after such journal with the write sequence number that is the same value as the variable j in the journal volume 303, and the data length of the post-overwriting data is greater than the data length of the pre-overwriting data, journals containing post-overwriting data (that is, new journals having the write sequence number that is the same value as the variable j) cannot be stored in the original area in the journal volume 303.

In the foregoing case, the redundancy elimination program shall re-store the new journal containing the post-overwriting data in a different area in the journal volume 303. Here, the original area in the journal volume 303 storing the journal with the write sequence number that is the same value as the variable j shall be released at step S1104. Incidentally, a method of storing only the post-overwriting data in the area newly allocated to the journal volume 303, and storing the pointer to the data in the control information part of the journal with the write sequence number that is the same value as the variable j can also be used.

With the foregoing journal redundancy elimination, since the data portion of the journal with the write sequence number that is the same value as the variable i, the redundancy elimination program changes the type of journal to "dummy" (S1105). "Dummy" means that a journal does not have a data portion as a result of the journal redundancy elimination. The reason information (write sequence number, time and so on) other than the data portion remains is to avoid errors caused by the omission of a write sequence number upon applying journals to the recovery volume 304 (FIG. 3) or the base volume 302 (FIG. 3).

Subsequently, the redundancy elimination program deletes the data portion of the journal with the write sequence number that is the same value as the variable i that is no longer required due to the data overwriting processing described above, and releases the area that was storing such data portion in the journal volume 303 (S1106).

Further, pursuant to the release of this kind of area, since the volume utilization of the journal volume 303 will decrease, the redundancy elimination program updates the volume utilization and the overall utilization (FIG. 7) of the journal volume information 505 (S1107).

Further, since the data volume that needs to be applied to the base volume 302 and the recovery volume 304 during data recovery will decrease as a result of the data portion of the journal being deleted, the redundancy elimination program updates the value of the present RTO 502 (FIG. 5) of the corresponding CDP journal information 400 to a value obtained by deducting the time required for the restoration of the deleted data portion from the present RTO obtained based on the present RTO 502 (S1108).

Subsequently, the redundancy elimination program updates the value of the variable i to a value obtained by subtracting 1 from the variable i, and thereafter returns to step S101 for processing the subsequent journal (S1109).

As a result of the processing of the redundancy elimination program, it is possible to implement journal redundancy elimination while checking the relationship (pattern 1 to pattern 4) of the journal with a write sequence number that is the same value as the variable j and journals created before such journal. Further, since the section decision program activates the redundancy elimination program regarding all journals in the target recovery point section while decrementing the value of the variable j one by one, it is possible to check all redundancy relations of journals in the recovery point section. Accordingly, the redundancy of journals in the recovery point section can be eliminated.

Incidentally, when a journal volume 303 in which the journal utilization is 0% arises by deleting the journal data portion, the journal volume 303 may also be deleted from the CDP group 300. This processing, for example, can be performed immediately before the step S1110. Further, as the processing method for checking the journal redundancy relation, various methods other than those described above can be broadly used.

In this embodiment, when the storage system 200 receives a write request from the host 100, it creates a journal containing write data. Here, since the size of the write data will differ, checking of the redundancy relation was conducted in consideration of pattern 1 to pattern 4. Nevertheless, when the storage system 200 receives a write request from the host 100, the write data may be partitioned into a plurality of fixed length data, and a journal may be created for each partitioned data.

For example, when the fixed length size is 2 KB, when the storage system 200 receives writing of 4 KB from the host 100, and two journals hold 2 KB of data are created. Further, information for associating the two journals may also be stored in the two journals. Further, when the storage system 200 receives a write data in which the fixed length is not an integral multiple, it may read the data before and after the write address and adjust such data to become an integral multiple. For example, when the write data is 5 KB, 1 KB of data is read immediately before or immediately after the write range, and this becomes data with a total volume of 6 KB.

Further, the data portion in the journal and the other information portions (write sequence number, time and so on) may be separated and stored in the journal volume 303. In this case, the address information storing the data portion of the journal may be stored in such journal.

Accordingly, it will always be possible to store the data portion of the newly created journal in an area in the journal volume 303 released by the journal redundancy elimination, and the re-use of such area can be facilitated.

In the foregoing journal redundancy elimination method, a control method of eliminating the redundancy of journals in the recovery point section was explained. Subsequently, a redundancy elimination method where the redundancy of journals from the most recent recovery point onward is eliminated when the storage system 200 receives a write request from the host 100 and creates a journal is explained. In other words, redundancy of journals of sections in which the end recovery point number of the recovery point section is undecided is eliminated.

When the journal creation program 405 of the storage system 200 receives a write request from the host 100, it creates a journal. This journal creation program 405, for example, activates the redundancy elimination program after the journal creation (immediately before step S314 (FIG. 11)), and executes journal redundancy elimination. Here, the write sequence number of the journal created at step S312 is stored in the variable j, and delivered as a parameter to the redundancy elimination program.

This kind of journal redundancy elimination method can be realized by partially changing the processing of the redundancy elimination program described with reference to FIG. 25. The modified points are as follows.

Foremost, the redundancy elimination program substitutes the variable i at step S1100 with the variable j−1 delivered as the parameter. The redundancy elimination program, at step S1101, does not compare the value obtained by adding 1 to the write sequence number of the recovery point identified with the start recovery and the value of the variable i, but rather compares the value obtained by adding 1 to the write sequence number of the recovery point identified with the latest recovery point and the value of the variable i. Thereby, it is possible to check the redundancy relation from the journal of the latest recovery point onward up to the latest journal, Incidentally, the journal creation program 405 may activate the redundancy elimination program before journal creation. In this case, at step S1101, the variable i and the value of the write sequence number information 501 are compared. Further, the journal of the variable j indicated at step S1103 and step S1104 is replaced with the write data.

With the journal redundancy elimination method explained above, only the data portion of unnecessary journals was deleted. Nevertheless, depending on the journal format, the information portion (write sequence number, time and so on) may also be deleted in addition to the journal data portion, For example, a case where the sequential relationship among the journals is being managed with a pointer will correspond to the above. In other words, a journal with a write sequence number of 5 has pointers for specifying the storage location of journals with write sequence numbers of 4 and 6 (hereinafter respectively referred to as the "Prev pointer" and "Next pointer").

The journal redundancy elimination method in a case of managing the sequential relationship among journals with a pointer is now explained. This journal redundancy elimination method can be realized by partially changing the processing of the redundancy elimination program described with reference to FIG. 25. The modified points are as follows.

Foremost, at step S1105 and step S1106, after changing the type of deletion-target journal to dummy, instead of deleting the data portion of such journal, the Next pointer of the journal immediately before that journal is substituted with the value of the Next pointer of the deletion-target journal, and the Prev pointer of the journal immediately after the deletion-target journal is substituted with the value of the Prev pointer of the deletion-target journal. Then, all deletion-target journals are deleted.

When applying journals to the base volume 302 or the recovery volume 304 (FIG. 3), journals other than the journals that were subject to redundancy elimination can be applied according to the sequence of the write sequence number if the Next pointer is applied by being referred to.

The timing of implementing the journal redundancy elimination is now explained. Above, a method of implementing the journal redundancy elimination when journals of one recovery point section are accumulated in the journal volume 303 and a method of implementing journal redundancy elimination during journal creation were explained.

By setting whether to implement the journal redundancy elimination processing from the host 100, redundant journals can be eliminated only when the setting value is "implement redundancy elimination." The setting of whether to implement the journal redundancy elimination processing can be set as with the other parameters by the parameter notification program 182 (FIG. 1) of the host 100 and the parameter reception program 403 of the storage system 200. Then, the section decision program refers to the setting value of whether to implement journal redundancy elimination immediately before step S1001, and proceeding to step S1001 only when the setting value is "implement redundancy elimination."

Further, the foregoing journal redundancy elimination processing can be implemented only to journals that are older than a certain time. The setting value of a certain time can be set as with the other parameters by the parameter notification program 182 (FIG. 1) and the parameter reception program 403 (FIG. 4).

The foregoing control can be realized by executing the following processing immediately before step S1001 (FIG. 24) of the section decision program.

Figure 24:
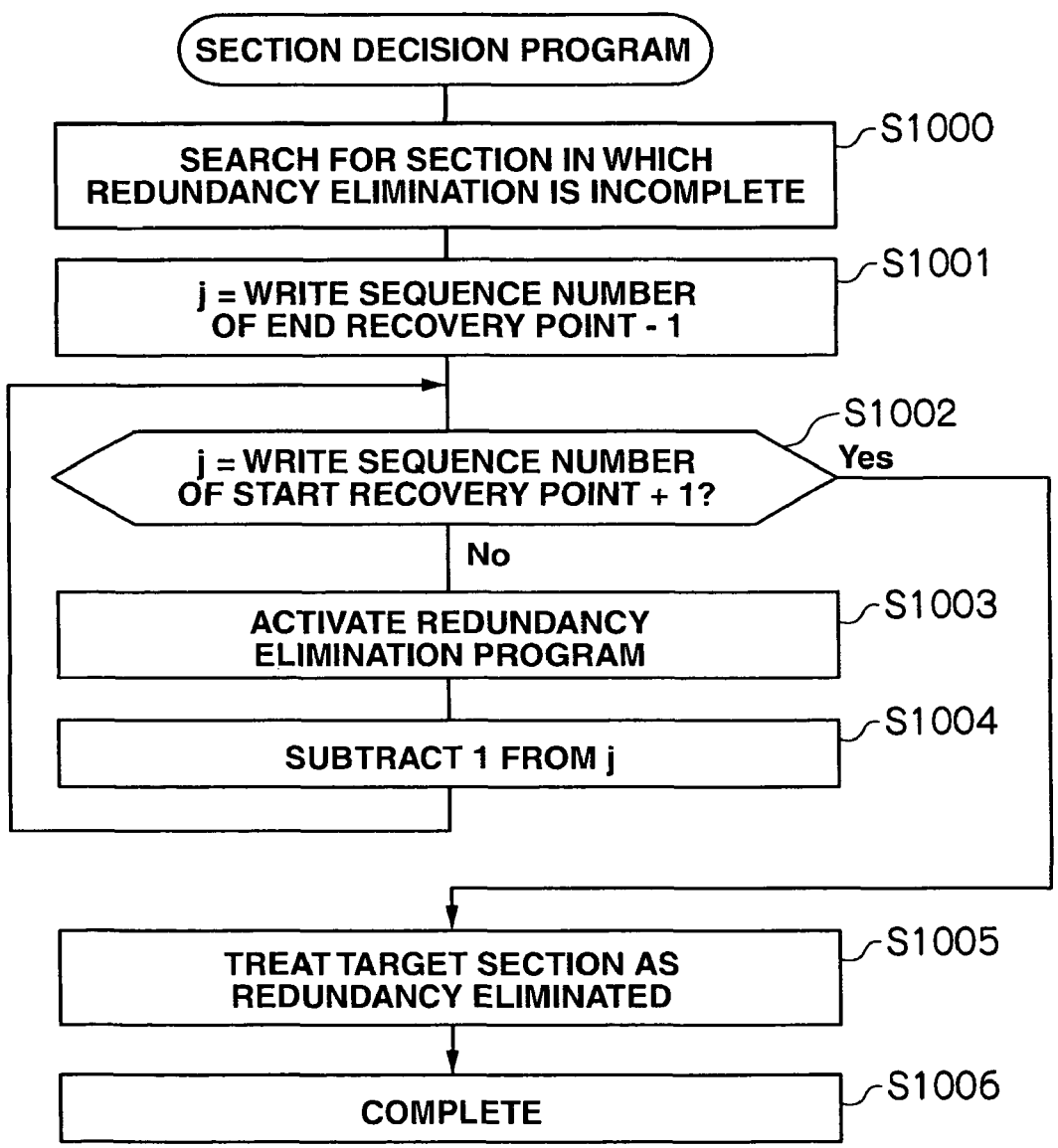
FIG. 24 is a flowchart explaining journal redundancy elimination processing according to another embodiment of the present invention.

The section decision program checks the time of the end recovery point of the recovery point section decided at step S1000 of FIG. 24 (step 1). This can be realized by searching a journal corresponding to the end recovery point, and referring to the "creation time" in the journal.

Subsequently, the section decision program checks whether the difference between the present time and the time obtained at step 1 exceeds the user's setting value (step 2), and proceeds to step S1001 only when the difference between the present time and the time obtained at step 1 exceeds the user's setting value (step 3).

Like this, the journal redundancy elimination processing is only executed to journals that become older than a certain time.

Above, when creating a journal volume 303 or a base volume 302, explained was a processing method for securing the capacity for the new base volume 302 and journals volume 303 by referring to the remaining capacity 801 of the CDP group information 400, and deleting the oldest base volume 302 or the journal when the remaining capacity is insufficient.

By using the foregoing journal redundancy elimination method, even without having to delete the oldest base volume 302 and the journal, it is possible to secure areas for the base volume 302 and journals volume 303 by implementing the journal redundancy elimination. Thereby, the protection period can made to be longer than the CDP control method explained in the first embodiment.

Subsequently, the processing of securing capacity for the journal volume 303 by implementing the journal redundancy elimination processing when additionally registering the journal volume 303 is explained with reference to FIG. 26. This can be realized by partially changing the processing contents of the monitoring program 410 shown in FIG. 16.

Figure 26:
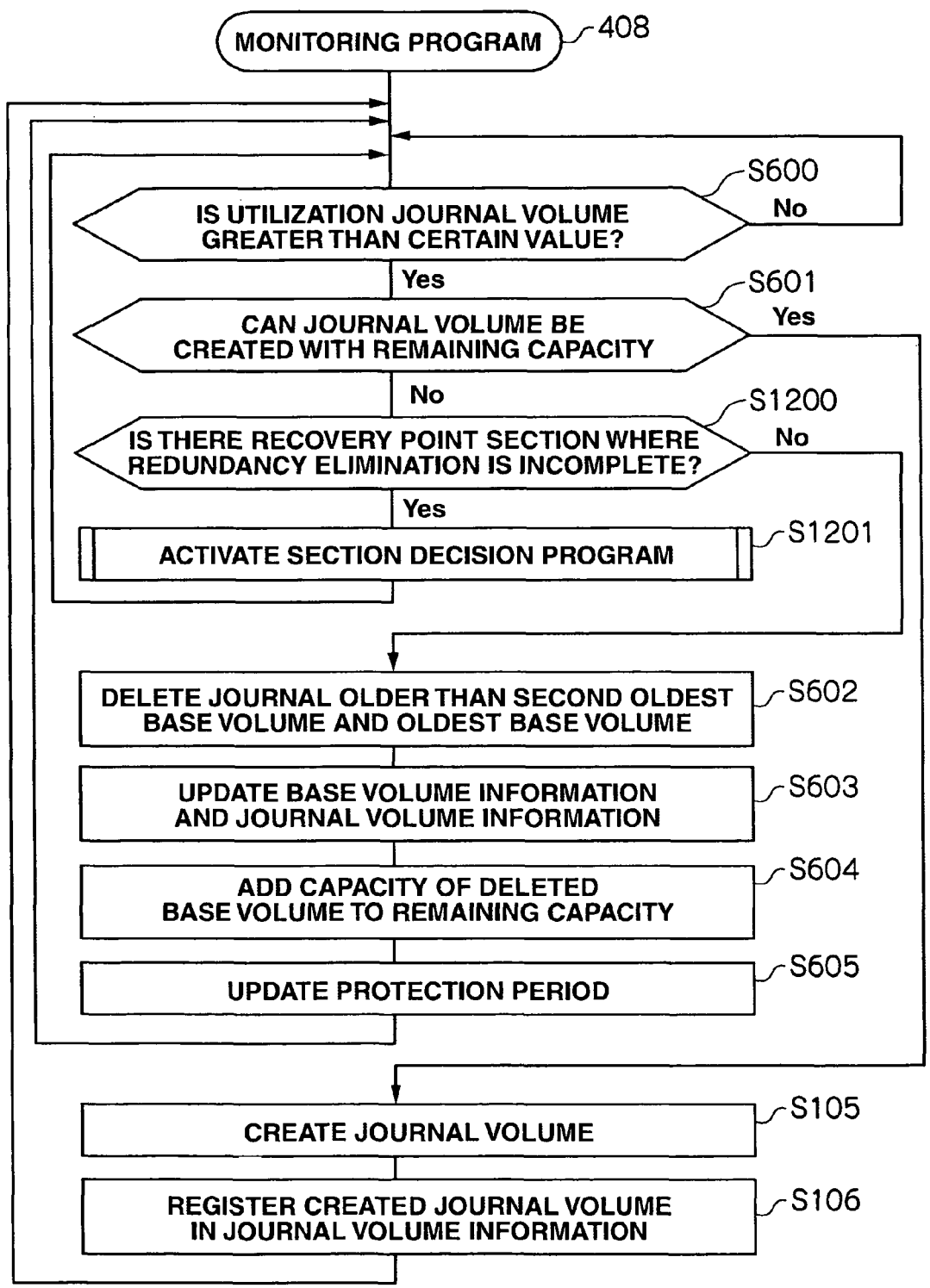
FIG. 26 is a flowchart explaining journal redundancy elimination processing according to another embodiment of the present invention.

Specifically, the processing contents of step S600 to step S605 and step S105, step S106 of FIG. 26 are the same as the corresponding steps of the FIG. 16.

At step S601, when it is not possible to create the journal volume 303 with the remaining capacity, the monitoring program 410 does not proceed to step S602, and proceeds to step S1200. Then, the monitoring program 410, at step S1200, checks whether there is a recovery point section that has not been subject to journal redundancy elimination processing.

When there is a recovery point section that has not been subject to journal redundancy elimination processing, the monitoring program 410 activates the section decision program (S1201). The section decision program activates the redundancy elimination program and performs journal redundancy elimination. After the journal redundancy elimination is complete, the monitoring program 410 returns to the top of the program.

When the volume utilization of the journal volume 303 falls below a certain value due to journal redundancy elimination, since it is not necessary to additionally register the journal volume 303, the monitoring program 410 repeatedly executes step S600.

As described above, when the remaining capacity 801 becomes insufficient, areas for storing journals can be secured by implementing the journal redundancy elimination processing.

Further, when the volume utilization of the journal volume 303 did not fall below a certain value but it becomes possible to create the journal volume 303 based on the journal redundancy elimination processing, the determination at step S601 becomes "Yes," and the monitoring program 408 creates a new journal volume 303 at step S105. This journal redundancy elimination will arise when deleting the journal volume 303 with utilization (FIG. 7) of 0% from the journal group.

As described above, when the remaining capacity becomes insufficient, areas for storing journals can be secured by implementing the journal redundancy elimination processing.

Incidentally, even when creating a base volume 302, capacity for the base volume 302 can also be secured by similarly performing the journal redundancy elimination processing. Specifically, this can be realized by adding step S1200 and step S1201 of FIG. 26 immediately after step S601 of the base volume creation program 406 shown in FIG. 17.

Above, processing was explained for reducing RTO by activating the restoring program 407 when the present RTO exceeds the specified RTO, and applying journals to the base volume 302. In this case also, it is possible to avoid the implementation of restoration by performing journal redundancy elimination and reducing the RTO. Specifically, this can be realized by the journal creation program 405 adding step S1200 and step S1201 immediately after step S309 of the processing shown in FIG. 11. Incidentally, in the foregoing case, the journal creation program 405 shall proceed to step S310 when it determines at step 1200 that there is no recovery point section which has not yet been subject to journal redundancy elimination. Further, the journal creation program 405 shall return to step S309 after executing step S1201.

Subsequently, the journal redundancy elimination processing in a case when the user changes the setting of the specified capacity information 800 (FIG. 15) among the CDP group information 400 is explained.

When the storage system 200 receives a change notification of the specified capacity information 800 from the user (step 1), based on the corresponding CDP group information 400, it calculates the value obtained by subtracting the differential of the pre-change specified capacity and the post-change specified capacity recognized based on the specified capacity information 800 from the remaining capacity (in other words, remaining capacity−(pre-change specified capacity−post-change specified capacity)) (step 2). This calculation result shows the remaining capacity after the specified capacity is changed, and, when the remaining capacity is negative, this means that the specified capacity is exceeded.

When the remaining capacity after the specified capacity is changed is negative, the storage system 200 searches for a recovery point section that has not yet been subject to journal redundancy elimination, and performs journal redundancy elimination (step 3). The storage system 200 repeats step 3 until the remaining capacity becomes positive, or there is no more recovery point sections that have not been subject to journal redundancy elimination.

Then the storage system 200 ends the processing when the remaining capacity becomes positive. Nevertheless, even if the journal redundancy elimination processing to all recovery point sections is complete, if the remaining capacity is negative, the storage system 200 deletes the oldest base volume 302 and the journal. Specifically, the storage system 200 repeats step S602 to step S605 of FIG. 26 until the remaining capacity becomes positive.

This kind of processing is performed, when it is not possible to satisfy the specified capacity, by firstly executing journal redundancy elimination, and secondly deleting the base volume 302 and journals volume 303. This is effective when the user gives priority to the protection period rather than the number of recoverable points. The user may set in advance whether to give priority to the number of recovery points or the protection period, and the storage system 200 may automatically execute foregoing processing when priority is given to the protection period. Further, when the user gives priority to the number of recoverable points, the deletion of the base volume 302 and journals volume 303 may foremost be executed.

Above, redundant journals among the journals among the recovery points were eliminated. Thus, there is a possibility that the redundancy with journals in a separate recovery point section still remains. The method of eliminating the redundancy of journals of the recovery point sections before and after the deletion-target recovery point when the storage system 200 is to deleted the unnecessary recovery points is explained.

Figure 27:
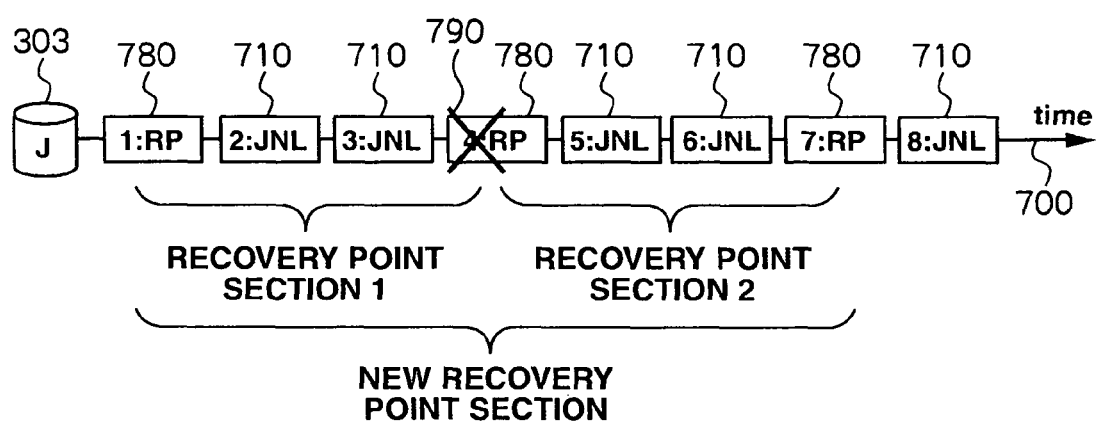
FIG. 27 is a conceptual diagram explaining journal redundancy elimination processing associated with recovery point deletion.

Outline of redundancy elimination of a journal existing in two recovery point sections is explained with reference to FIG. 27. FIG. 27 is a diagram which adds the elements of reference numerals 780 and 790 to FIG. 13. Reference numeral 780 represents a "recovery point" and "RP" is the abbreviation of recovery point. Further, reference numeral 790 shows that the recovery point 780 with a write sequence number of 4 is deleted.

In the example of FIG. 27, let it be assumed that the recovery point section 1 between the recovery point 780 with a write sequence number of 1 and the recovery point 780 with a write sequence number of 4 is a section that has already been subject to journal redundancy elimination. Further, let it be assumed that the recovery point section 2 between the recovery point 780 with a write sequence number of 4 and the recovery point 780 with a write sequence number of 7 is a section that has already been subject to journal redundancy elimination.

Here, when the recovery point 780 with a write sequence number of 4 is deleted, the redundancy of the journal in the recovery point section 1 and the journal in the recovery point section 2 can be eliminated.

When the recovery point 780 with a write sequence number of 4 is deleted, this is realized by combining the recovery point section 1 and the recovery point section 2, and registering this in the recovery point section information 960 as the recovery point section which has not yet been subject to new journal redundancy elimination. This is because if the foregoing combination is registered in the recovery point section information 960, the monitoring program 410 will discover the recovery point section which has not yet been subject to new journal redundancy elimination, and perform journal redundancy elimination.

An example of the processing of deleting the recovery point 780 and merging the previous and subsequent recovery point sections thereof is now explained with reference to FIG. 28 (hereinafter referred to as the "recovery point deletion processing"). This recovery point deletion processing is performed by the CPU 213 of the storage system 200 executing the recovery point deletion program (not shown) stored in the memory 220.

The recovery point deletion program receives a recovery point deletion command (S1300). Here, the recovery point number (FIG. 21) of the deletion-target recovery point 780 shall be received as a parameter. The recovery point deletion command is issued from the host 100, the management server or the management terminal 270.

Subsequently, the recovery point deletion program searches for the deletion-target recovery point 780 from the recovery point management table 950 (FIG. 21), and deletes it (S1301).

The recovery point deletion program confirms whether there is a recovery point section before or after the designated recovery point 780 (S1302). This can be realized by checking whether there is a recovery point section which has the recovery point number received as the parameter as its start recovery point number (FIG. 23), and a recovery point section which as such recovery point number as its end recovery point number (FIG. 23).

When the foregoing two recovery point sections do not exist, the two recovery point sections cannot be merged. Thus, in this case, the recovery point deletion program ends the recovery point deletion processing (S1305).

Contrarily, the recovery point deletion program merges the two recovery point sections when there are precedent and subsequent recovery point sections (S1303). To explain using the example of FIG. 27, the recovery point section in which the start recovery point number is the start recovery point number of the recovery point section 1 and the end recovery point number is the end recovery point number of the recovery point section 2 is added to the recovery point section information 960. Here, information concerning the recovery point section 1 and the recovery point section 2 shall be deleted from the recovery point section information 960.

Thereafter, the recovery point deletion program changes the redundancy eliminated flag of the new recovery point section created at step S1303 to the status of "redundancy not eliminated" (S1304), and ends the recovery point deletion processing (S1305).

Incidentally, there will be a base volume 302 and a journal that are no longer required as a result of deleting the recovery point 780 as described above. Below, processing for deleting the unnecessary base volume 303 and the journal during the recovery point deletion is explained (hereinafter referred to as the "unnecessary volume/journal deletion processing").

Foremost, the base volume 302 and journals that become unnecessary during the deletion of the recovery point 780 are explained with reference to FIG. 29.

Figure 29:
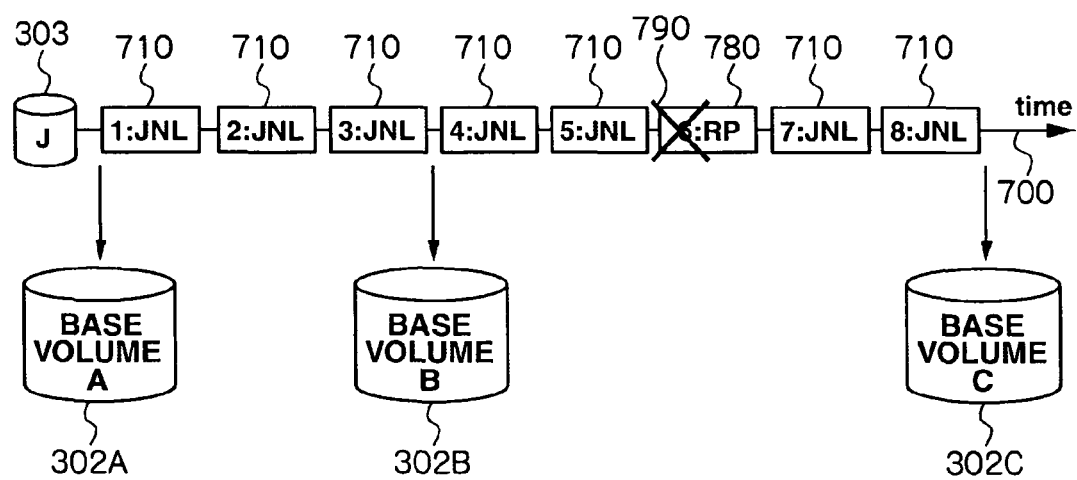
FIG. 29 is a conceptual diagram explaining unnecessary volume/journal deletion processing.

The arrow 700, journal volume 303, journal, base volume 302A, base volume 302B and base volume 302C of FIG. 29 are the same as FIG. 13. Reference numerals 780 and 790 are the same as FIG. 27.

In the status shown in FIG. 29, when the recovery point 780 is deleted, the base volume 302B and journals with the write sequence numbers of 4 to 8 will become unnecessary. This is because by deleting the journal of the recovery point 780, the recovery point between the base volume 302B and the base volume 302C will disappear, and data recovery using the base volume 302B and journals with the write sequence numbers of 4 to 8 will not be performed.

Incidentally, data recovery to a status before the creation time of the base volume 302B can be realized by the base volume 302A and journals with the write sequence numbers of 1 to 3. Similarly, data recovery from the base volume 302C onward can be realized by the base volume 302C and subsequent journals.

Figure 30:
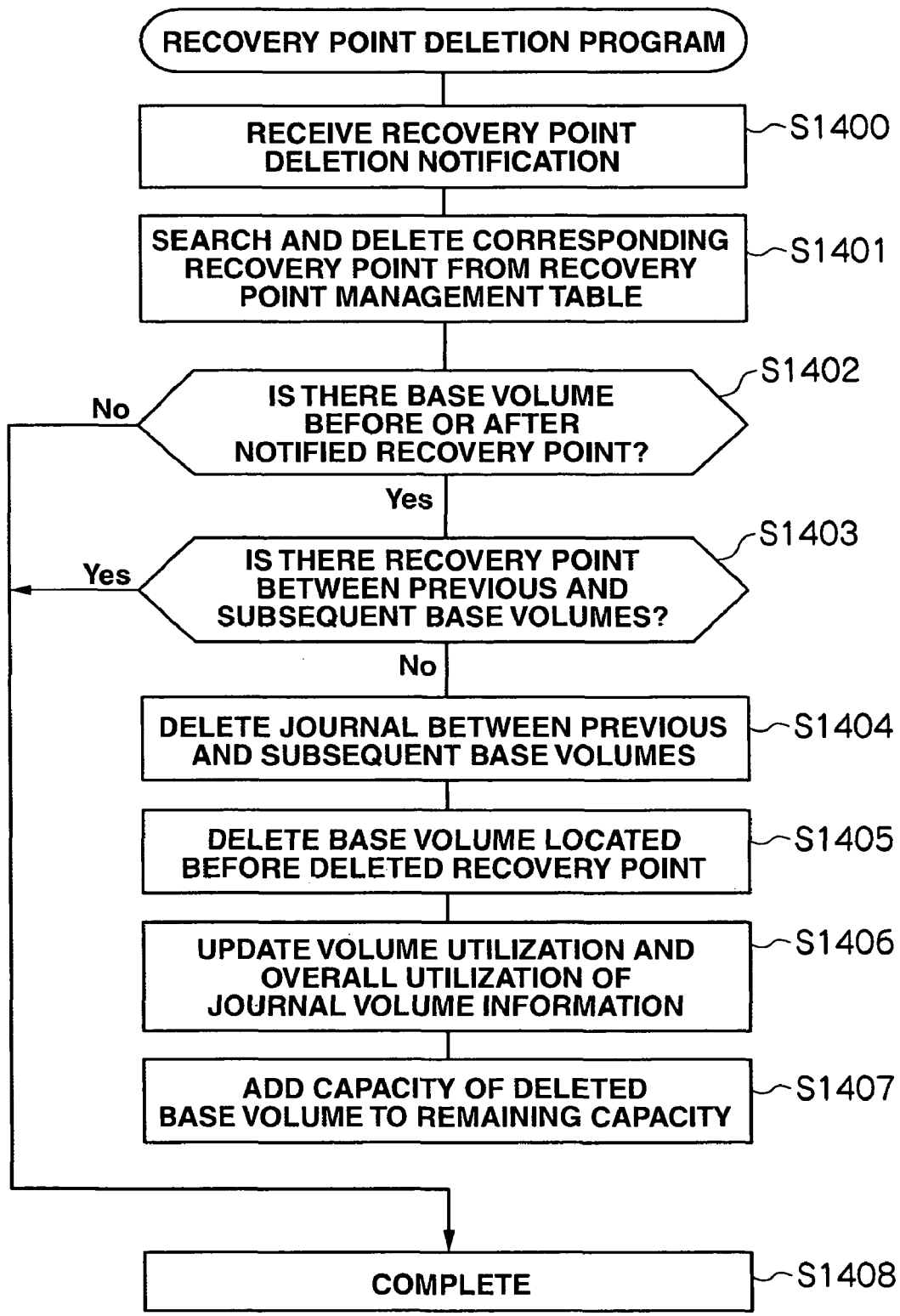
FIG. 30 is a flowchart explaining unnecessary volume/journal deletion processing.

A specific example of the unnecessary volume/journal deletion processing for deleting the base volume 302 and journals that become unnecessary as a result of the recovery point deletion program deleting the recovery point 780 is now explained with reference to FIG. 30. This processing is performed by the CPU 213 of the storage system 200 executing the recovery point deletion program (not shown) stored in the memory 220.

Figure 28:
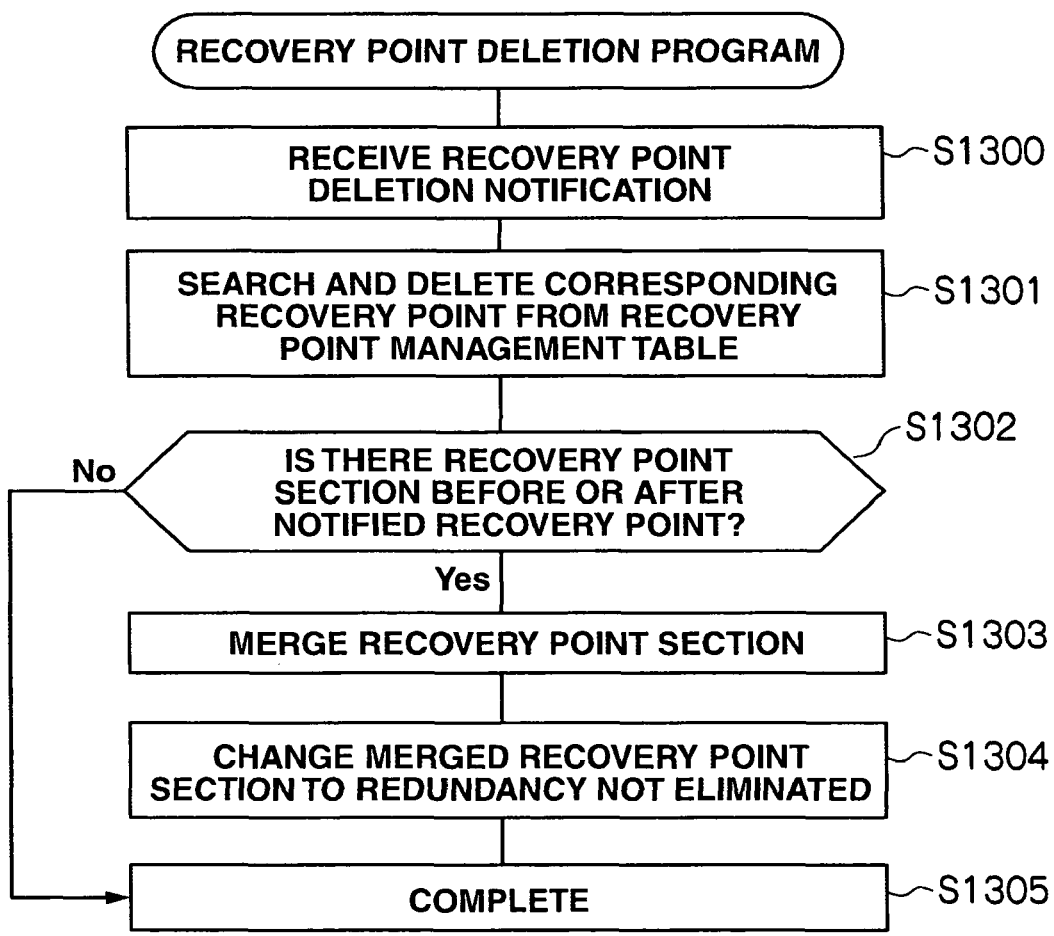
FIG. 28 is a flowchart explaining recovery point deletion processing.

The recovery point deletion program, as with the processing of the recovery point deletion program shown in FIG. 28, receives a recovery point deletion command from the host 100, the management server or the management terminal 270 (S1400), and deletes the journals of the deletion-target recovery point 780 from the recovery point management table 950.

Then the recovery point deletion program confirms whether there are base volumes 302 before and after the deletion-target recovery point 780 (S1402). This is realized by searching the recovery point management table 950 (FIG. 21), acquiring the write sequence number of the journal in the deletion-target recovery point 780, and comparing the write sequence number and the restored write sequence number (FIG. 6) of the base volume information 506 (FIG. 5, FIG. 15) of the corresponding CDP group information 400.

The recovery point deletion program ends the processing when there are no base volumes 302 before and after the deletion-target recovery point 780 (S1408). Contrarily, when there are base volumes 302 before and after the deletion-target recovery point 780, the recovery point deletion program checks whether there is a recovery point 780 between the two base volumes 302 (S1403). This can be realized by comparing the restored write sequence number of the two base volumes 302 and the write sequence number of the recovery point management table 950.

When there is a recovery point 780 between the two base volumes 302, since the base volume 302 and journals cannot be deleted, the recovery point deletion program ends the processing (S1408).

Contrarily, when there is no a recovery point 780 between the two base volumes 302, the recovery point deletion program deletes the journals between the two base volumes 302 (S1404). Subsequently, the recovery point deletion program deletes the base volume 302 before the recovery point 780 deleted at step S1401 (S1405).

Since the volume utilization of the journal volume 303 will change due to the deletion of journals, the recovery point deletion program updates the volume utilization and the overall utilization (FIG. 7) of the journal volume information 505 (FIG. 5, FIG. 15) among the corresponding CDP group information 400 (S1406). Further, since the remaining capacity will increase due to the deletion of the base volume 302, the recovery point deletion program updates the value (remaining capacity) of the remaining capacity 801 among the CDP group information 400 to a value obtained by adding the capacity of the deleted base volume 302 (S1407).

Incidentally, it is also possible to set whether to implement the journal redundancy elimination processing from the host 100, and delete the base volume 302 and journals only when the setting value "implement redundancy elimination." Further, the base volume 302 and journals may be deleted only when the setting value of the host 100 is "implement redundancy elimination" and the remaining capacity is less than a certain value.

Instead of deleting the base volume 302 and journals at the time the recovery point is deleted, the unnecessary base volume 302 and journals can also be deleted by the monitoring program 410 periodically checking the recovery point 780 between the base volumes 302.

The deletion of the base volume 302 and journals when the recovery point is deleted can also be implemented together with the merger of the recovery point section shown in FIG. 28. This can be realized, for instance, by executing step S1402 to step S1407 immediately before step S1302 of FIG. 28.

In this embodiment, a method of checking the redundancy relation of journals in the recovery point section and eliminating the redundant portions was explained. Nevertheless, when the base volume 302 exists in the recovery point section, there are cases where certain journals can be deleted unconditionally.

The unconditional deletion of journals upon executing redundancy elimination is explained with reference to FIG. 31.

Figure 31:
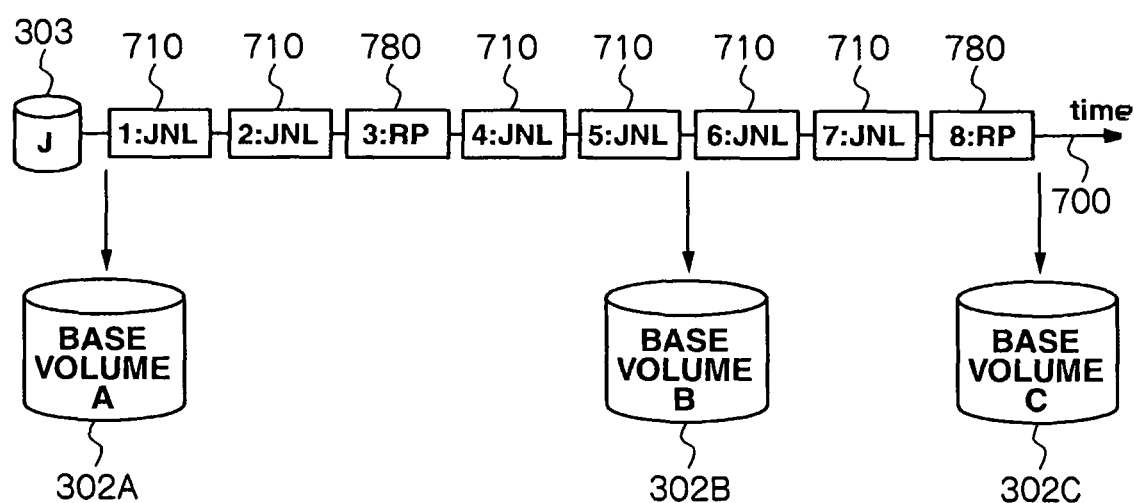
FIG. 31 is a conceptual diagram explaining journal deletion processing.

The arrow 700, journal volume 303, journal, base volume 302A, base volume 302B and base volume 302C of FIG. 31 are the same as FIG. 13. Reference numerals 780 and 790 are the same as FIG. 27.

There is a recovery point section configured from a recovery point 780 with a write sequence number of 3 and a recovery point 780 with a write sequence number of 8. When performing redundancy elimination to the journals in this recovery point section, the journals with write sequence numbers 4 and 5 can be deleted. This is because the recovery point 780 with the write sequence number of 8 can be recovered with the base volume 302B and journals with write sequence numbers of 6 and 7.

Figure 32:
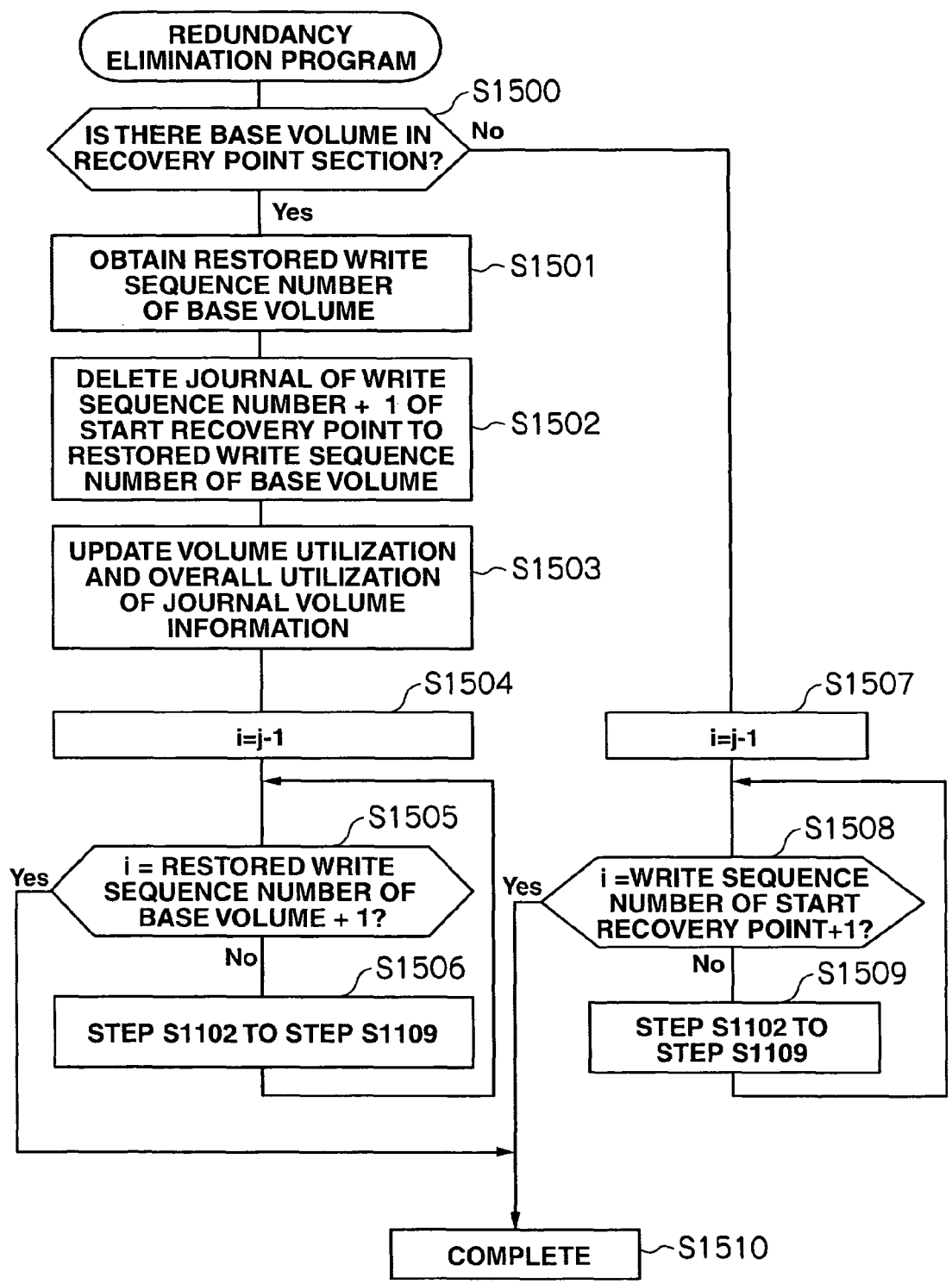
FIG. 32 is a conceptual diagram explaining journal deletion processing.

An example of processing for unconditionally deleting certain journals is explained with reference to FIG. 32 (hereinafter referred to as the "journal deletion processing"). This journal deletion processing is performed by the CPU 213 of the storage system 200 executing the redundancy elimination program (not shown) stored in the memory 220. Incidentally, the redundancy elimination program shown in FIG. 32 is a modification of FIG. 25.

Foremost, the redundancy elimination program checks whether there is a base volume 302 in the recovery point section to be subject to redundancy elimination (S1500). This processing is realized as follows. Using the recovery point section information 960 (FIG. 23) and the recovery point management table 950 (FIG. 21), the write sequence number (FIG. 21) of a journal corresponding to the start recovery point number (FIG. 23) and the write sequence number (FIG. 21) of a journal corresponding to the end recovery point number (FIG. 23) are specified.

Subsequently, the redundancy elimination program refers to the base volume information 506 among the corresponding CDP group information 400, and checks whether there is a base volume 302 in which the value of the restored write sequence number (FIG. 6) is greater than the write sequence number of the start recovery point, and smaller than the write sequence number of the end recovery point.

When there is no base volume 302 in the recovery point section, the redundancy elimination program executes step S1507 to step S1510 and ends the processing. This processing is the same as the processing at step S1100 to step S1109 of FIG. 25. In other words, this is the same as the redundancy elimination processing explained with reference to FIG. 25.

Meanwhile, when there is a base volume 302 in the recovery point section, the redundancy elimination program executes step S1501 to step S1506 and step S1510.

Foremost, the redundancy elimination program obtains the restored write sequence number (FIG. 6) of the base volume 302 discovered at step S1500 based on the base volume information 505 (FIG. 5, FIG. 15) among the corresponding CDP group information 400 (S1501).

Subsequently, the redundancy elimination program deletes journals having a write sequence number from the value obtained by adding 1 to the write sequence number corresponding to the start recovery point number (FIG. 23) of the recovery point section information 960 to the restored write sequence number (FIG. 6) of the base volume 302 (S1502). Since the utilization of the journal volume 303 will change due to the deletion of journals, the redundancy elimination program updates the volume utilization and the overall utilization (FIG. 7) of the journal volume information 505 (S1503).

Subsequently, the redundancy elimination program substitutes the value of the variable i with a value obtained by subtracting 1 from the variable j, and then proceeds to step S1505 (S1504). Then, step S1102 to S1109 are repeated until the variable i becomes a value obtained by adding 1 to the restored write sequence number of the base volume 302 obtained at step S1501 (S1505, S1506). Incidentally, step S1102 to step S1109 are the same as the processing shown in FIG. 25. When the variable i becomes a value obtained by adding 1 to the restored write sequence number of the base volume 302, by ending the redundancy elimination processing, the journals deleted at step S1502 can be exempt from redundancy elimination.

Although not shown, the section decision program also proceeds to step S1005 when, at step S1002, the variable j becomes a value obtained by adding 1 to the restored write sequence number of the base volume 302.

Incidentally, the processing for searching the base volume 302 in the recovery point section is executed by either the section decision program or the redundancy elimination program, and information of the searched base volume 302 may be shared via the memory 220 or the like, or it may be executed by both the section decision program and the redundancy elimination program.

(3) Third Embodiment (3-1) Journal Duplication Removal Processing Method of Third Embodiment In the field of storage systems, there is technology of allocating a storage area from a common area (hereinafter referred to as the "pool") as necessary to the volume. In this embodiment, journal redundancy elimination processing in the case of allocating areas from the pool to the journal volume 303 as necessary is explained.

Figure 33:
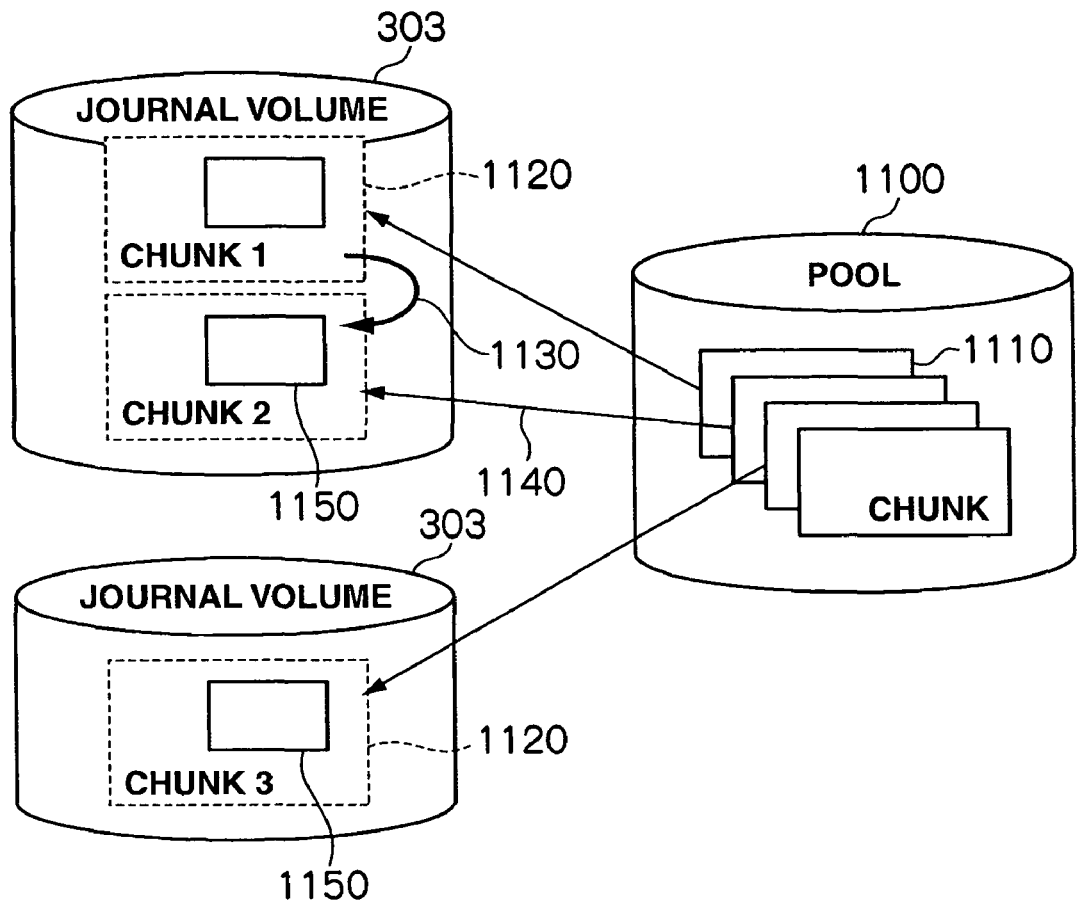
FIG. 33 is a conceptual diagram explaining a journal amount using a pool.

Foremost, the configuration is explained with reference to FIG. 33. The pool 1100 is a storage area associated with a real area. When the journal volume 303 needs an area, a necessary capacity is allocated from the pool 1100 to the journal volume 303. The area of the pool 1100 is configured from a comparatively small area referred to as a chunk 1110. Allocation of areas to the journal volume 303 is realized by allocating the chunk 1110. There are one or more chunks 1110 in the pool 1100, and let it be assumed that there are chunks with various capacities.

Incidentally, the pool 1100 does not need to exist for each CDP group, and chunks 1110 can be allocated from one pool 1100 to the journal volume 303 of a plurality of CDP groups.

The journal volume 303 is now explained. The journal volume 303 of FIG. 33 is an area that does not involve a real area. When storing data, a necessary amount of area is allocated from the pool 1100 and stored. The chunk 1120 is an area allocated from the pool 1100 to the journal volume 303. One or more journals 1150 are stored from the front in one chunk 1120.

In order to efficiently search for journals in the ascending order of the write sequence number, the chunk 1120 has a pointer 1130 showing the subsequent chunk 1120. For example, when referring to the subsequent journal of a journal stored at the end of the chunk 1, the pointer 1130 is used to refer to the journal at the top of the subsequent chunk 1120.

Incidentally, data of the journal volume 303 is physically stored in the pool 1100. The arrow 1140 shows that the area is being allocated from the pool 1100 to the journal volume 303.

The advantages of configuring the journal volume 303 using the pool 1100 are now explained. By using the using pool 1100, even when the capacity of the journal volume 303 becomes insufficient, the area can be increased by allocating the chunk 1110. In other words, the processing of searching for an unused volume and formatting the searched volume will no longer be required.

Further, since only the capacity required by the journal volume 303 will be allocated from the pool 1100, the usability of the physical area will be favorable.

In this embodiment, the journal redundancy elimination processing method where areas are allocated from the pool 1100 in chunk 1110 units is explained.

Prior to explaining the journal redundancy elimination processing method, the pool 1100, the chunk 1110, and the management information of the journal volume 303 using the pool 1100 are explained.

Figure 34:
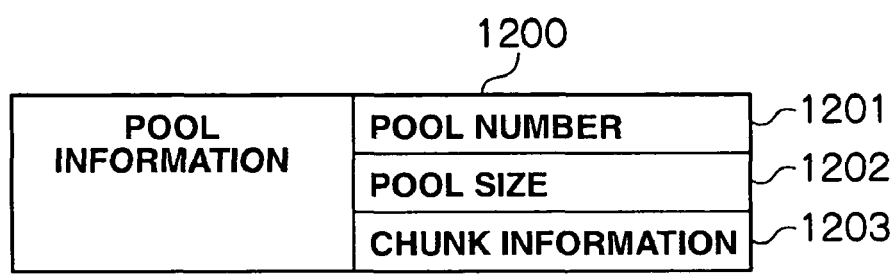
FIG. 34 is a conceptual diagram explaining pool information.

FIG. 34 is an example of the management information of the pool 1100 (hereinafter referred to as the "pool information 1200"). The pool information 1200 is configured from a pool number 1201, a pool size 1202 and chunk information 1203. The pool number 1201 is a number for uniquely identifying the pool 110 in the storage system 200. The pool size 1202 shows the storage capacity of the pool 1100. Further, the chunk information 1203 is information of the chunks 1110 configuring the pool 1100.

FIG. 35 shows an example of the chunk information 1203. The chunk information 1203 exists for each pool 1100. The chunk information 1203 is configured from information representing a chunk number, a chunk size, a start address, an end address, a status, and an allocation destination.

The chunk number is an identification number for uniquely identifying the chunks 1110 in the pool 1100, and the chunk size represents the size of the chunk 1110. The total volume of the chunk size in the chunk information 1203 will be the size of the pool 1100. Further, the start address and the end address are the start address and the end address of the corresponding locations of the chunks 1110 in the pool 1100, respectively. Numbers are given from the top to the end of the pool 1100, and the range of the chunks 1110 is associated based on these numbers.

The status represents whether the chunk 1110 has been allocated to the journal volume 303, and the allocation destination represents the volume number of the volume to which the chunk 1110 was allocated. When the "status" is "unallocated," nothing is stored in the allocation destination (indicated with '-' in FIG. 35).

The journal volume information 1300 in the case of using the pool 110 is now explained with reference to FIG. 36. The journal volume number, size, volume utilization and overall utilization are the same as the journal volume information 505 explained with reference to FIG. 7.

A chunk number represents the chunk number of the chunk 1110 allocated to the journal volume 303. In the example of FIG. 36, chunk 2 and chunk 3 are allocated to the journal volume 1. The "subsequent chunk" is the pointer 1130 shown in FIG. 33.

Figure 37:
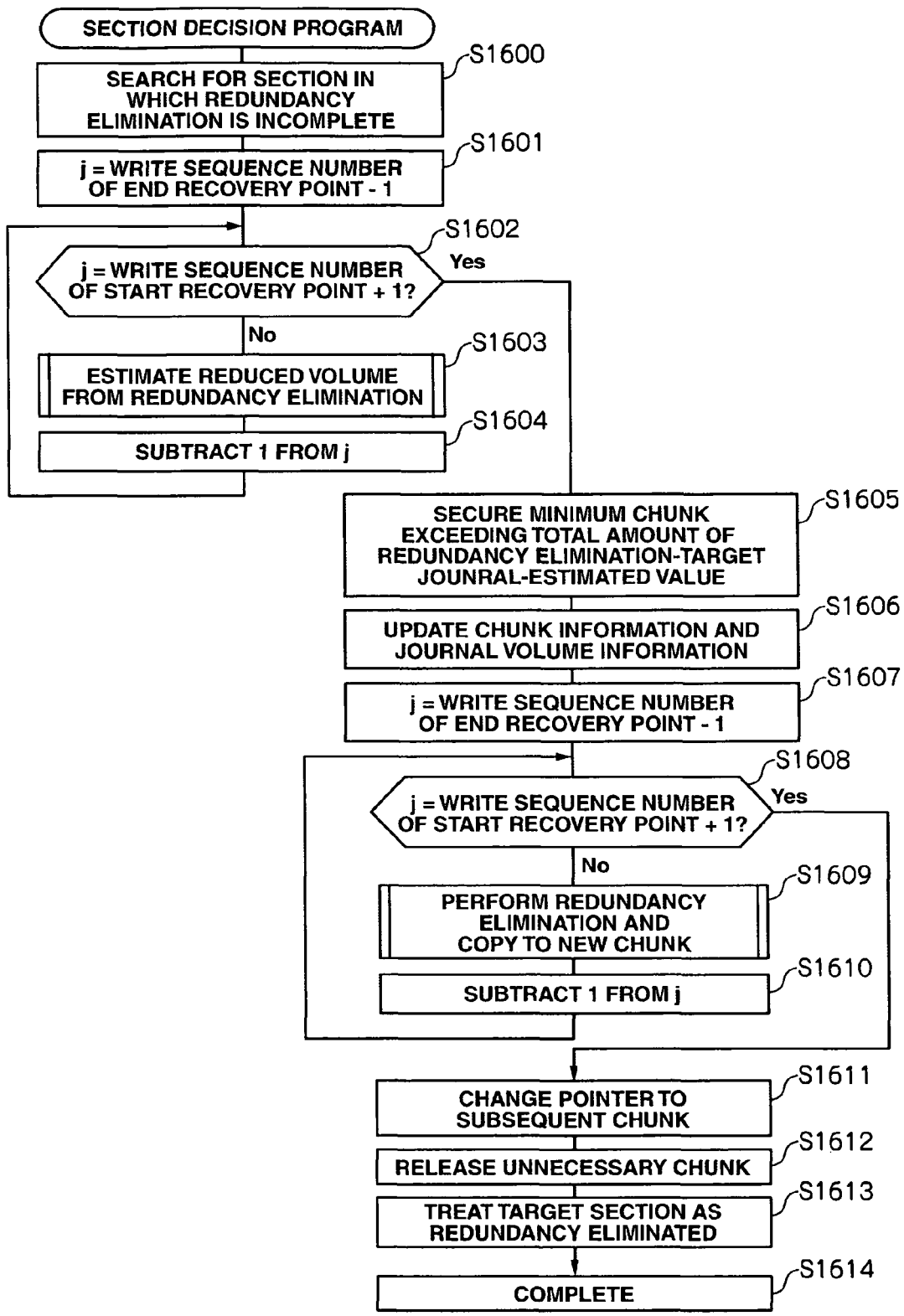
FIG. 37 is a flowchart explaining journal redundancy elimination processing according to yet another embodiment of the present invention.

An example of the processing for eliminating the redundancy of journals stored in the journal volume 303 mapped to the pool 1100 is now explained with reference to FIG. 37. This processing is performed by the CPU 213 of the storage system 200 executing the section decision program stored in the memory 220. Incidentally, the section decision program shown in FIG. 37 is a modification of FIG. 24.

Foremost, the section decision program, as with the journal redundancy elimination processing of FIG. 24, searches for a section that has not yet been subject to journal redundancy elimination, and substitutes the variable j with a write sequence number of the last journal of the section ("normal" type journal) (S1600, S1601).

Subsequently, the section decision program estimates the journal reduced volume based on the journal redundancy elimination by checking the redundancy relation of a journal with a write sequence number that is the same as the variable j and another journal in the same recovery point section while decrementing the value of the variable j one by one (S1602 to S1604). Specifically, the section decision program, at step S1603, executes processing that is approximately the same as the redundancy elimination program of FIG. 25. However, step S1104 to S1108 of FIG. 25 are not executed, and only the reduced volume based on journal redundancy elimination is estimated.

When the value of the variable j becomes the write sequence number of the first journal of the recovery point section to be subject to the journal redundancy elimination, the section decision program ends the estimation of the reduced volume based on journal redundancy elimination, and proceeds to step S1605. The section decision program thereafter uses the estimated value to allocate the minimum chunk 1110 capable of storing the journal after journal redundancy elimination from the pool 1100 (S1605). Nevertheless, there is no need to allocate all journals after journal redundancy elimination to one chunk 1110. The total value of the plurality of chunks 1110 merely needs to be greater than the size of the journal after journal redundancy elimination.

Subsequently, the section decision program updates the value of the chunk information 1203 and journal volume information 1300 pursuant to the allocation of the chunk 1110 (S1606). With respect to the chunk information 1203, the "status" of the newly allocated chunk 1110 is changed to "allocated," and the volume number of the allocation destination journal volume 303 is registered in the "allocation destination." Then, in relation to the journal volume information 1300, the volume utilization, overall utilization, chunk number and subsequent chunk (FIG. 36) are updated pursuant to the allocation of chunks 1110.

Subsequently, the section decision program substitutes the variable j with the write sequence number of the last journal of the target recovery point section ("normal" type journal) (S1607). Further, the section decision program, as with the processing of FIG. 25, activates the redundancy elimination program for each journal while decrementing the value of the variable j one by one, and makes it check the journal redundancy relation and perform journal redundancy elimination (S1608 to S1610).

The redundancy elimination program, as with FIG. 25, checks the redundancy relation of the journal with a write sequence number that is the same value as the variable j, and another journal in the same recovery point section, and eliminates redundant journal. However, data after the journal redundancy elimination shall be stored in the newly allocated chunk 1110. Further, step S1107 of FIG. 25 shall not be executed. This is because the utilization of the journal volume 303 will be executed at step S1606 and step S1612 in accordance with the allocation and release processing of the chunk 1110.

When the value of the variable j becomes the write sequence number of the first journal of the recovery point section to be subject to journal redundancy elimination, the section decision program ends activation of the redundancy elimination program, and proceeds to step S1611.

At step S1611, the section decision program updates the "subsequent chunk" of the journal volume information 1300 (S1611). For example, when journals stored in chunk 2, chunk 3, chunk 4 are subject to redundancy elimination and stored in chunk 8, the value of the "subsequent chunk" of chunk 1 is changed to chunk 8, and the value of the "subsequent chunk" of chunk 8 is changed to chunk 5.

However, when the recovery point section to be subject to journal redundancy elimination is started midway in chunk 2, and is ended midway in chunk 4, journals of different recovery points will be stored in the first half of chunk 2 and the last half of chunk 4. Thus, the section decision program at such time will change the value of the "subsequent chunk" of chunk 2 to chunk 8, and change the value of the "subsequent chunk" of chunk 8 to chunk 4.

Subsequently, the section decision program releases the chunks 1110 that are no longer necessary due to journal redundancy elimination, and updates the chunk information 1203 and the journal volume information 1300 (S1612). In the journal volume information 1300, the volume utilization and the overall utilization (FIG. 36) are updated due to the release of the chunks 1110. In the chunk information 1203, the "status" of the released chunk 1110 is changed to "not allocated," and the contents of the "allocation destination" are initialized.

Finally, the section decision program sets the section to be subject to journal redundancy elimination as having been subject to journal redundancy elimination, and then ends the processing (S1613, S1614).

Incidentally, if the result of the journal redundancy elimination immediately before step S1605 is less than a certain value, a branching step may be added so that the processing is ended without executing step S1605 to step S1613.

Further, in this embodiment, although the journal amount after journal redundancy elimination is estimated at step S1602 to step S1604, journal redundancy elimination may be implemented without performing such estimation. In such a case, a chunk 1110 having the same capacity as before the journal redundancy elimination is allocated at step S1605, or an unused area of the chunk 1110 is checked at the step of storing the journal after journal redundancy elimination and allocating a new chunk 1110 when the unused area is insufficient.

In the foregoing journal redundancy elimination method, if a chunk 1110 having the same capacity as the journal amount after journal redundancy elimination does not exist in the pool 1100, a minimum chunk 1110 capable of storing the journal after journal redundancy elimination is allocated. Further, if the start or end of the recovery point section is midway in the chunk 1110, only the redundant journals in the chunk 1110 are migrated to the new chunk 1110.

As a result of the foregoing processing, there is a possibility that an unused area will arise in the chunk 1110. Thus, below, a processing of storing the journal after journal redundancy elimination in an unused area of the previous and subsequent chunks 1110 and in the newly allocated chunk 1110 is explained. In order to realize this, the journal amount information 1400 will have the utilization in the chunk 1110 (not shown).

Incidentally, previous and subsequent chunks 1110 are the chunks 1110 that are before and after the chunk 1110 that was released due to the journal redundancy elimination processing. When there are chunk 1, chunk 2, chunk 3 and chunk 4, and the recovery point section to be subject to journal redundancy elimination starts from midway in chunk 1, and ends midway in chunk 4, chunk 2 and chunk 3 are released. Here, chunk 1 will be the previous chunk, and chunk 4 will be the subsequent chunk.

Figure 38:
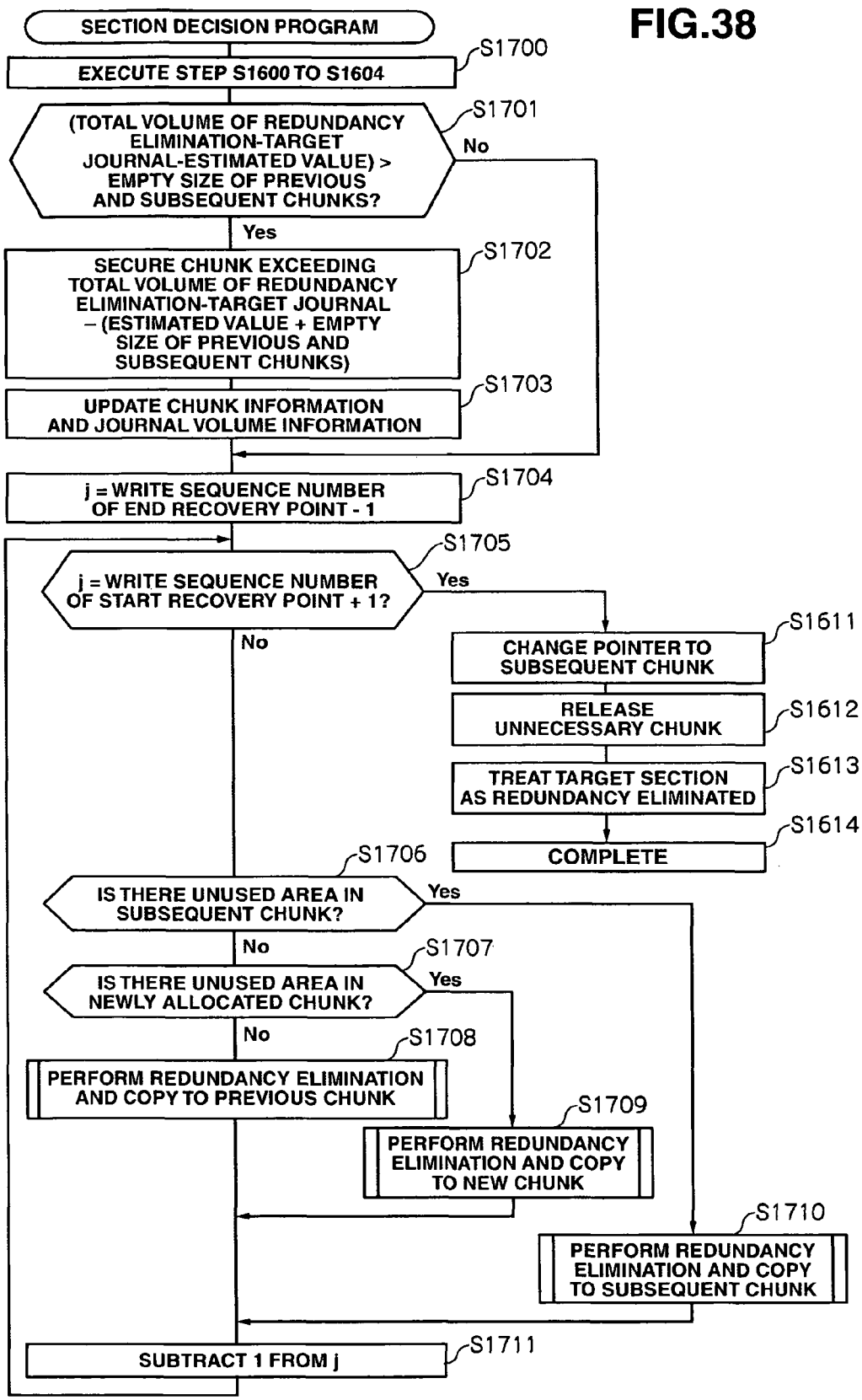
FIG. 38 is a flowchart explaining journal redundancy elimination processing according to yet another embodiment of the present invention.

An example of processing where the section decision program stores the journal after journal redundancy elimination in an unused area of the previous and subsequent chunks 1110 and in the newly allocated chunk 1110 is explained with reference to FIG. 38. This processing is performed by the CPU 213 of the storage system 200 executing the section decision program stored in the memory 220. Incidentally, the section decision program shown in FIG. 38 is a modification of FIG. 37.

The section decision program executes the same processing as step S1600 to step S1604 of the section decision program shown in FIG. 37 at step S1700. In other words, this is the processing of estimating the reduced volume of the journal based on journal redundancy elimination.

Subsequently, the section decision program checks the relation of the value obtained by deducting the estimated volume from the total data volume of the redundancy elimination-target journal (total volume of redundancy elimination-target journal−estimated value) and the unused area of the previous and subsequent chunks 1110 (S1701).

When the value obtained by deducting the estimated volume from the total data volume of the redundancy elimination-target journal is greater than the unused area of the previous and subsequent chunks 1110, all journals after journal redundancy elimination cannot be stored in the previous and subsequent chunks 1110. Thereby, the section decision program allocates the minimum chunk 1110 from the pool 110 exceeding the capacity obtained by deducting the capacity of the unused area of the previous and subsequent chunks 1110 and the reduced volume of the journal based on journal redundancy elimination from the total capacity of the redundancy elimination-target journal (S1702). Contrarily, when the value obtained by subtracting the estimated volume from the total volume of the redundancy elimination-target journal is less than the unused area of the chunk 1100, since it is not necessary to allocate a new chunk 1100, the section decision program proceeds to step S1704.

Subsequently, the section decision program, as with step S1606 and step S1607 of FIG. 37, updates the values of the chunk information 1203 and the journal volume information 1300 (S1703), and substitutes the variable j with the write sequence number of the last journal of the target recovery point section ("normal" type journal) (S1704).

Subsequently, the section decision program compares the write sequence number of the start recovery point of the recovery point section to be subject to redundancy elimination and the variable j. When the value of the variable j and the value of the write sequence number are the same, the section decision program executes step S1611 to step S1614 shown in FIG. 37, and ends the processing. Contrarily, when the value of the variable j and the value of the write sequence number are different, the section decision program, as with the processing shown in FIG. 37, activates the redundancy elimination program for each journal while decrementing the value of the variable j one by one, and makes its check the journal redundancy relation and perform journal redundancy elimination (S1705 to S1711).

Foremost, the section decision program checks whether there is an unused area in the subsequent chunk 1110 (S1706), and, when there is an unused area, proceeds to step S1710. At step 1710, the section decision program specifies the subsequent chunk 1110 as the chunk 1110 to store the journal after redundancy elimination, and activates the redundancy elimination program.

Meanwhile, when there is no unused area, the section decision program proceeds to step S1707, and checks whether there is an unused area in the chunk 1110 secured at step S1702 (S1707). When there is an unused area, the section decision program specifies the check 1110 secured at step S1702 as the chunk 1110 for storing the journal after redundancy elimination, and activates the redundancy elimination program.

Meanwhile, when there is no unused are, the section decision program specifies the previous chunk 1110 as the chunk 1110 for storing the journal after redundancy elimination, and activates the redundancy elimination program.

The redundancy elimination program activated by the section decision program stores the journal after redundancy elimination in the chunk 1110 specified by the section decision program. Thereby, the journal after redundancy elimination can be stored in an unused area of the previous or subsequent chunk 1110.

(3-2) GUI Screen Concerning CDP Control

Finally, a GUI (Graphical User Interface) screen to be provided to the user by the management software 180 of the host 100 relating to the CDP control is now explained. FIG. 39 shows an example of the GUI screen 1500 to be displayed on the display of the host 100 by the user making prescribed operations. This GUI screen 1500 is broadly configured from a CDP parameter setting screen 1510, a CDP information display screen 1520, a recovery point creation screen 1530, and a recovery point deletion screen 1540.

The CDP parameter setting screen 1510 is a screen for setting various types of parameters concerning the CDP. In actuality, the CDP parameter setting screen 1510 comprises input fields 1511 to 1514 for specifying and inputting a CDP group number ("CDP group number"), a specified RTO ("specified RTO"), a specified protection period ("specified protection period") and a specified capacity ("specified capacity"), radio buttons 1515A, 1515B for selecting whether to execute the journal redundancy elimination processing, input fields 1516A to 1516C for specifying and inputting the priority of various types of parameters, and an execute button 1517.

In the example of FIG. 39, "1" as the CDP group number, "30 minutes" as the specified RTO, "10 days" as the specified protection period, and "300 GB" as the specified capacity are input to the respective text fields 1511 to 1514, and "execute" is selected regarding the journal redundancy elimination processing. Further, in the example of FIG. 39, priority is set in the sequence of specified RTO, specified capacity, and specified protection period.

After the user sets necessary parameters such as the CDP group number in the CDP parameter setting screen 1510 of the GUI screen 1500, the user clicks the execute button 1517 and notifies these parameters to the storage system 200. Specifically, when the user clicks the execute button 1517, the parameter notification program 182 is executed, and the various types of parameters set in the CDP parameter setting screen 1510 are notified to the storage system 200. When the storage system 200 is notified of these parameters, it registers these parameters in the corresponding areas in the memory 220, and executes the corresponding processing.

Meanwhile, the CDP information display screen 1520 is a screen for displaying the operational status of the current CDP. The CDP information display screen 1520 comprises the input field 1521 for specifying the CDP group number. When this CDP group number is input, the present RTO, present protection period and the present used capacity in relation to the CDP group 300 are displayed respectively on the corresponding areas 1522 to 1524.

The recovery point creation screen 1530 is a screen for the user to notify the creation of the recovery point to the storage system 200. The recovery point creation screen 1530 comprises a CDP group number input field 1531 and an execute button 1532. In the recovery point creation screen 1530, it is possible to specify the CDP group 300 to become the recovery point creation target by using the CDP group number input field 1531.

After the user inputs the CDP group number of the CDP group 300 to become the recovery point creation target in the CDP group number input field 1531 of the recovery point creation screen 1530, the user clicks the execute button 1532 and issues a recovery point creation notification to the storage system 200.

The recovery point deletion screen 1540 is a screen for the user to notify the recovery point deletion to the storage system 200. The recovery point deletion screen 1540 comprises a CDP group number input field 1541, a recovery point number input field 1542, and an execute button 1534. In this recovery point deletion screen 1540, by using the CDP group number input field 1541, it is possible to specify the CDP group 300 having the recovery point of the deletion target, and, by using the recovery point number input field 1542, it is possible to specify the deletion-target recovery point.

After the user inputs the CDP group number of the CDP group 300 to which the deletion-target recovery point belongs in the CDP group number input field 1541 and the recovery point number of the deletion-target recovery point in the recovery point number input field 1542 of the recovery point deletion screen 1540, the user clicks the execute button 1543 and issues a recovery point deletion command to the storage system 200.

(4) Other Embodiments

Incidentally, in the foregoing embodiments, although a case was explained of applying the present invention to the information processing system 1 configured as shown in FIG. 1 and FIG. 2, the present invention is not limited thereto, and can be broadly applied to information processing systems of various other configurations.

Further, in the foregoing embodiments, although a case was explained where data was recovered with the operation volume unit 301, but the present invention is not limited thereto, and a replication may be created at the write data portion stored in the operation volume 301, and data may be recovered at the write data portion using the replication and the journal.

Further, in the foregoing embodiments, although a case was explained where the replication creation unit for creating a replication of the write data written from the host 100 into the operation volume 301 as necessary, a journal creation unit for creating a journal containing the write data and control information concerning the writing of the write data in the operation volume 301 each time the write data is written in the operation volume 301, and a recovery unit for recovering a past status of the write data based on the replication of write data and the journal are configured with the CPU 213 governing the operational control of the overall storage system 200 and the corresponding programs stored in the memory 220, the present invention is not limited thereto, and the replication creation unit, the journal creation unit and/or the recovery unit may be configured from dedicated hardware.

Further, in the foregoing embodiments, although a case was explained where the creation and management unit for creating and managing information representing a recovery point (data recovery candidate point) as a candidate of a point in time for recovering the write data were configured with the CPU 213 governing the operational control of the overall storage system 200 and the corresponding programs stored in the memory 220, the present invention is not limited thereto, and the creation and management unit may be configured from dedicated hardware.

Further, in the foregoing embodiments, although a case was explained where an redundancy elimination unit for executing the redundancy elimination processing of merging a plurality of base volumes 302 (replication of write data) and a plurality of journals into a single base volume 302 or a journal was configured with the CPU 213 governing the operational control of the overall storage system 200 and the corresponding programs stored in the memory 220, the present invention is not limited thereto, and the redundancy elimination unit may be configured from dedicated hardware.

Further, in the foregoing embodiments, although a case was explained where the memory 220 was applied as the storage unit for storing a target data recovery time required for recovering a predetermined past status of the write data, a retention period of a predetermined target journal, and a target capacity to be used in data recovery processing for recovering a predetermined past status of the write data, the present invention is not limited thereto, and various other mediums such as other discoid storage mediums (for instance, a hard disk) may be broadly applied.

Further, in the foregoing embodiments, although a case was explained where the write data recovery unit for recovering the past status of write data based on the base volume 302 and journals for guaranteeing at least one among target data recovery time, target journal retention period and target capacity was configured with the CPU 213 governing the operational control of the overall storage system 200 and the corresponding programs stored in the memory 220, the present invention is not limited thereto, and the write data recovery unit may be configured from dedicated hardware.

The present invention can be broadly applied to storage systems of various configurations equipped with the CDP function.

What is claimed is:

1. A storage system, comprising:
a processor;
a replication creation unit configured to create a replication of write data written from a computer into a volume as necessary;
a journal creation unit configured to create a journal containing said write data and control information concerning the writing of said write data in said volume each time said write data is written in said volume;
a recovery unit configured to recover a past status of said write data based on said replication of write data and said journal;
a creation and management unit configured to create and managing information representing a data recovery candidate point as a candidate of a point in time for recovering said write data; and
a redundancy elimination unit configured to use one or more data recovery candidate points and specifying a section containing said journal and said replication of write data, to check a redundancy relation of a write range in said volume of write data written from computer into said volume contained in said journal regarding one or more said journals in said section, and to execute redundancy elimination processing of merging a plurality of said replications of write data or a plurality of said journals into a single replication of write data or a single journal based on the check result;

wherein said redundancy elimination unit checks whether or not said redundancy relation of said write range matches at least one of the following patterns:
- a first pattern in which said write data includes precedent write data written before said one or more journals and said write data includes subsequent write data written subsequent to said one or more journals, and an address range of said subsequent write data is contained within an address range of said precedent write data;
- a second pattern in which said address range of said precedent write data partially overlaps with said address range of said subsequent write data;
- a third pattern in which said address range of said precedent write data is contained within said address range of said subsequent write data;
- a fourth pattern in which said address range of said precedent write data is the same as said address range of said subsequent write data.

2. The storage system according to claim 1, wherein said redundancy elimination unit executes said redundancy elimination processing regarding said section specified by said computer.

3. The storage system according to claim 1, wherein said redundancy elimination unit executes said redundancy elimination processing to one or more journals in a section specified based on said data recovery candidate point that is older than the time notified by said computer.

4. The storage system according to claim 1, wherein said redundancy elimination unit specifies a section containing said replication of write data and said journal created after the latest data recovery candidate point when said data write request for writing data in said volume is issued from said computer; and
- checks the relation of said write data respectively contained in one or more said journals in said section and a write range in said volume of write data provided together with said data write request, and creates a journal merging write data contained in said journal and write data provided together with said data write request based on said check result.

5. The storage system according to claim 1, wherein said redundancy elimination unit checks the remaining capacity of capacity to be used in data recovery processing for recovering said write data to a predetermined past status upon creating a base volume for storing said replication of write data or a journal volume for storing said journal, and executes said redundancy elimination processing when said capacity is insufficient.

6. The storage system according to claim 5, wherein said redundancy elimination unit checks the remaining capacity of said capacity when the setting value of a predetermined target capacity to be used in said data recovery processing is changed.

7. The storage system according to claim 1, wherein said redundancy elimination unit calculates the data recovery time required for recovering said past status of write data based on the total data size of a corresponding journal or the number of said journals, and executes said redundancy elimination processing when said data recovery time exceeds a predetermined target data recovery time.

8. The storage system according to claim 1, wherein for a detected first pattern or second pattern, said redundancy elimination unit deletes one or more journals of said precedent write data having an address common with an address of said subsequent write data; and for a detected third pattern for fourth pattern, said redundancy elimination unit deletes one or more journals of said precedent write data.

9. A data recovery method, comprising:
- creating a replication of write data written from a computer into a volume as necessary;
- creating a journal containing said write data and control information concerning the writing of said write data in said volume each time said write data is written in said volume;
- recovering a past status of said write data based on said replication of write data and said journal;
- creating and managing information representing a data recovery candidate point as a candidate of a point in time for recovering said write data; and
- using one or more data recovery candidate points and specifying a section containing said journal and said replication of write data, checking a redundancy relation of a write range in said volume of write data written from computer into said volume contained in said journal regarding one or more said journals in said section, and executing redundancy elimination processing of merging a plurality of said replications of write data or a plurality of said journals into a single replication of write data or a single journal based on the check result;

wherein checking a redundancy relation includes checking whether or not said redundancy relation of said write range matches at least one of the following patterns:
- a first pattern in which said write data includes precedent write data written before said one or more journals and said write data includes subsequent write data written subsequent to said one or more journals, and an address range of said subsequent write data is contained within an address range of said precedent write data;
- a second pattern in which said address range of said precedent write data partially overlaps with said address range of said subsequent write data;
- a third pattern in which said address range of said precedent write data is contained within said address range of said subsequent write data;
- a fourth pattern in which said address range of said precedent write data is the same as said address range of said subsequent write data.

10. The data recovery method according to claim 9, wherein at said second step, said redundancy elimination processing is executed only regarding said section specified by said computer.

11. The data recovery method according to claim 9, wherein at said second step, said redundancy elimination processing is executed to one or more journals in a section specified based on said data recovery candidate point that is older than the time notified by said computer.

12. The data recovery method according to claim 9, wherein at said second step, a section containing from said replication of write data and said journal created after the latest data recovery candidate point is specified when said data write request for writing data in said volume is issued from said computer; and
- the relation of said write data respectively contained in one or more said journals in said section and a write range in said volume of write data provided together with said data write request is checked, and a journal merging write data contained in said journal and write data provided together with said data write request is created based on said check result.

13. The data recovery method according to claim 9, wherein at said second step, the remaining capacity of capacity to be used in data recovery processing for recovering said write data to a predetermined past status is checked upon creating a base volume for storing said replication of write data or a journal volume for storing said journal, and said redundancy elimination processing is executed when said capacity is insufficient.

14. The data recovery method according to claim 13, wherein at said second step, the remaining capacity of said capacity is checked when the setting value of a predetermined target capacity to be used in said data recovery processing is changed.

15. The data recovery method according to claim 9, wherein at said second step, the data recovery time required for recovering said past status of write data is calculated based on the total data size of a corresponding journal or the number of said journals, and said redundancy elimination processing is executed when said data recovery time exceeds a predetermined target data recovery time.

\* \* \* \* \*

UNITED STATES PATENT AND TRADEMARK OFFICE
CERTIFICATE OF CORRECTION

PATENT NO. : 8,060,468 B2  
APPLICATION NO. : 12/007585  
DATED : November 15, 2011  
INVENTOR(S) : Deguchi et al.

Page 1 of 1

It is certified that error appears in the above-identified patent and that said Letters Patent is hereby corrected as shown below:

In claim 10, at column 48, line 42, after the word "wherein", delete "at said second step,".

In claim 11, at column 48, line 46, after the word "wherein", delete "at said second step,".

In claim 12, at column 48, line 51, after the word "wherein", delete "at said second step,".

In claim 13, at column 48, line 63, after the word "wherein", delete "at said second step,".

In claim 14, at column 49, line 4, after the word "wherein", delete "at said second step,".

In claim 15, at column 49, line 9, after the word "wherein", delete "at said second step,".

Signed and Sealed this  
Twentieth Day of November, 2012

David J. Kappos  
*Director of the United States Patent and Trademark Office*